United States Patent
Iizumi et al.

(10) Patent No.: US 10,662,332 B2
(45) Date of Patent: May 26, 2020

(54) COMPOUND, COLORING COMPOSITION FOR DYEING OR TEXTILE PRINTING, INK FOR INK JET TEXTILE PRINTING, METHOD OF PRINTING ON FABRIC, AND DYED OR PRINTED FABRIC

(71) Applicant: FUJIFILM Corporation, Tokyo (JP)

(72) Inventors: Takashi Iizumi, Kanagawa (JP); Kazunari Yagi, Kanagawa (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 224 days.

(21) Appl. No.: 15/934,365

(22) Filed: Mar. 23, 2018

(65) Prior Publication Data

US 2018/0208773 A1    Jul. 26, 2018

Related U.S. Application Data

(63) Continuation of application No. PCT/JP2016/078303, filed on Sep. 26, 2016.

(30) Foreign Application Priority Data

Sep. 28, 2015   (JP) .................. 2015-190473

(51) Int. Cl.
  *C09B 11/14*   (2006.01)
  *C09D 11/328*  (2014.01)
  (Continued)

(52) U.S. Cl.
  CPC .............. *C09B 11/14* (2013.01); *C09B 11/12* (2013.01); *C09B 11/20* (2013.01); *C09B 11/26* (2013.01); *C09B 69/06* (2013.01); *C09D 11/328* (2013.01); *D06P 1/40* (2013.01); *D06P 3/24* (2013.01); *D06P 3/241* (2013.01); *D06P 5/00* (2013.01); *D06P 5/30* (2013.01)

(58) Field of Classification Search
  CPC ......... C09B 11/14; C09B 11/20; C09B 11/12; C09B 69/103; C09B 11/26; C09D 11/328; D06P 5/00; D06P 5/30
  See application file for complete search history.

(56) References Cited

U.S. PATENT DOCUMENTS 3,538,105 A   11/1970   Yamaya et al.
6,485,551 B1  11/2002   Kohsaka et al.
(Continued)

FOREIGN PATENT DOCUMENTS

FR   2094135 A1   2/1972
GB   1351945 A    5/1974
(Continued)

OTHER PUBLICATIONS

Communication dated Jun. 29, 2018, from the European Patent Office in counterpart European Application No. 16851461.0.
(Continued)

*Primary Examiner* — Eisa B Elhilo
(74) *Attorney, Agent, or Firm* — Sughrue Mion, PLLC

(57) ABSTRACT

Provided are a compound represented by any one of Formulae (1) to (3) described in the specification, a coloring composition for dyeing or textile printing including the compound, an ink for ink jet textile printing, a method of printing on fabric, and a dyed or printed fabric.

10 Claims, 1 Drawing Sheet

(51) Int. Cl.
  *C09B 11/12* (2006.01)
  *C09B 11/20* (2006.01)
  *D06P 3/24* (2006.01)
  *D06P 5/00* (2006.01)
  *C09B 11/26* (2006.01)
  *C09B 69/06* (2006.01)
  *D06P 1/40* (2006.01)
  *D06P 5/30* (2006.01)

(56) References Cited

U.S. PATENT DOCUMENTS

2006/0183046 A1   8/2006   Murai et al.
2008/0184910 A1*  8/2008   Banning ................. C09B 11/14
                                                106/31.29

FOREIGN PATENT DOCUMENTS

| JP | 55-99954 A | 7/1980 |
|---|---|---|
| JP | 60-107654 A | 6/1985 |
| JP | 04295861 A | 10/1992 |
| JP | 2001-131882 A | 5/2001 |
| JP | 2003-73358 A | 3/2003 |
| JP | 2005-2328 A | 1/2005 |
| JP | 2013-253147 A | 12/2013 |
| WO | 2015045622 A1 | 4/2015 |

OTHER PUBLICATIONS

International Search Report (PCT/ISA/210), issued by International Searching Authority in corresponding International Application No. PCT/JP/2016/078303, dated Nov. 1, 2016.

ISR issued Nov. 1, 2016 by the International Searching Authority in International Patent Application No. PCT/JP2016/078303. (PCT/ISA/237).

Communication dated Feb. 25, 2019, issued by the Chinese Patent Office in counterpart Chinese Application No. 201680055089.9.

International Preliminary Report on Patentability dated Apr. 3, 2018 by the International Searching Authority in International Patent Application No. PCT/JP2016/078303. (PCT/IB/373).

Written Opinion dated Nov. 1, 2016 by the International Searching Authority in International Patent Application No. PCT/JP2016/078303. (PCT/ISA/237).

Communication dated Sep. 5, 2019 issued by the State Intellectual Property Office of P.R. China in counterpart Chinese Application No. 201680055089.9.

* cited by examiner

COMPOUND, COLORING COMPOSITION FOR DYEING OR TEXTILE PRINTING, INK FOR INK JET TEXTILE PRINTING, METHOD OF PRINTING ON FABRIC, AND DYED OR PRINTED FABRIC

CROSS REFERENCE TO RELATED APPLICATIONS

This is a continuation of International Application No. PCT/JP2016/078303 filed on Sep. 28, 2016, and claims priority from Japanese Patent Application No. 2015-190473 filed on Sep. 28, 2015, the entire disclosures of which are incorporated herein by reference.

BACKGROUND OF THE INVENTION

1. Field of the Invention

The present invention relates to a novel compound, a coloring composition for dyeing or textile printing, an ink for ink jet textile printing, a method of printing on fabric, and a dyed or printed fabric.

2. Description of the Related Art

A technique for dyeing fabric using a triarylmethane dye has been studied in the related art. For example, in order to dye a polyamide such as silk or nylon, Acid Blue 7 (AB7) or Acid Blue 9 (AB9) has been used.

As an industrial dyeing method for dyeing fabric, for example, screen printing, roller printing, or transfer printing has been used until now. These methods are dyeing techniques in which a series of steps including, for example, a step of planning a design pattern, an engraving or plate-making step, a step of preparing a printing paste, and a step of preparing a textile are integrated.

On the other hand, ink jet textile printing in which an ink jet method capable of directly supplying a dye to fabric is used has been proposed. Ink jet textile printing has advantageous effects in that, unlike textile printing of the related art, it is not necessary to make a plate and an image having excellent tone characteristics can be rapidly formed. Therefore, there are merits in that, for example, the delivery time can be reduced, many kinds in small quantities can be produced, and a plate-making step is unnecessary. Further, in ink jet textile printing, only an amount of ink required for forming an image is used. Therefore, it can be said that ink jet textile printing is an image forming method having excellent environmental friendliness in that, for example, the amount of waste liquid is less than that in a method of the related art.

On the other hand, JP2003-73358A describes a triarylmethane compound having a heterocycle, in which an image is formed on paper by ink jet printing using a coloring composition including this compound, and the color, light fastness, and the like of the image are discussed.

In addition, FR2094135B, JP1985-107654A (JP-S60-107654A), and JP1980-099954A (JP-S55-099954A) describe various triarylmethane compounds.

SUMMARY OF THE INVENTION

However, AB7 or AB9 has a problem in that light fastness is insufficient.

In addition, the triarylmethane compound having a heterocycle described in JP2003-73358A has light fastness. However, in JP2003-73358A, issues (in particular, light fastness) arising in a case where the triarylmethane compound having a heterocycle is used for dyeing fabric are not discussed.

Further, in particular, as a compound for printing on fabric, excellent washing fastness and perspiration fastness are also important.

An object of the present invention is to provide a compound having excellent light fastness, washing fastness, and perspiration fastness, a coloring composition for dyeing or textile printing including the compound, an ink for ink jet textile printing, a method of printing on fabric, and a dyed or printed fabric.

That is, the present invention is as follows.

[1] A compound represented by any one of the following Formulae (1) to (3),

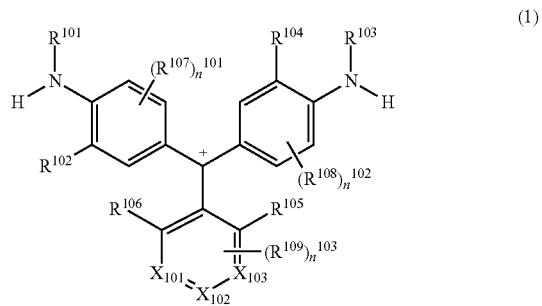

in Formula (1), $R^{101}$ and $R^{103}$ each independently represent a hydrogen atom, an alkyl group, an aryl group, or a heterocyclic group, $R^{102}$ and $R^{104}$ each independently represent a substituent represented by any one of the following Formulae (X1) to (X4), $R^{105}$ and $R^{106}$ each independently represent an alkyl group, a cyano group, a nitro group, an alkoxy group, an acyloxy group, a carbamoyloxy group, an alkoxycarbonyloxy group, an amino group, an acylamino group, an aminocarbonylamino group, an alkoxycarbonylamino group, a sulfamoylamino group, an alkylsulfonylamino group, an alkylthio group, a sulfamoyl group, an alkylsulfinyl group, an alkylsulfonyl group, an acyl group, an alkoxycarbonyl group, a carbamoyl group, an imido group, or a sulfo group, $R^{107}$, $R^{108}$, and $R^{109}$ each independently represent a substituent, $X_{101}$, $X_{102}$, and $X_{103}$ each independently represent CH or a nitrogen atom, at least one of $X_{101}$, $X_{102}$, or $X_{103}$ represents CH, in a case where $X_{101}$ to $X_{103}$ represent CH, $R^{109}$ may be bonded after a hydrogen atom is removed, $n^{101}$, $n^{102}$, and $n^{103}$ each independently represent an integer of 0 to 3, in a case where $n^{101}$, $n^{102}$, and $n^{103}$ each independently represent an integer of 2 or more, plural $R^{107}$'s $R^{108}$'s, and $R^{109}$'s may be the same as or different from each other, $R^{107}$ and $R^{108}$ may be bonded to each other to form a ring, and a compound represented by Formula (1) has a counter anion in a molecule,

-continued

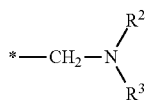
(X3)

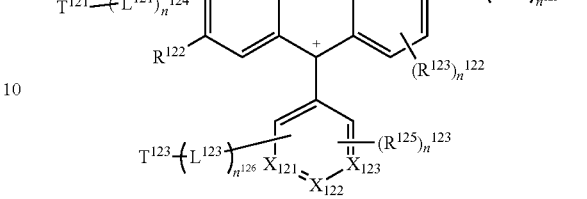
(3)

(X4)

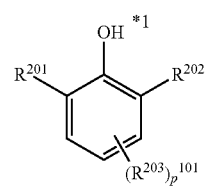
(T-1)

M¹ represents a hydrogen atom, an alkyl group, an aryl group, or a cation, M² represents a hydrogen atom, an alkyl group, or an aryl group, R¹ represents an alkyl group, an aryl group, or NR⁴R⁵, R⁴ and R⁵ each independently represent a hydrogen atom, an alkyl group, or an aryl group, R² and R³ each independently represent a hydrogen atom, an alkyl group, or an aryl group, and * represents a direct bond to a carbon atom,

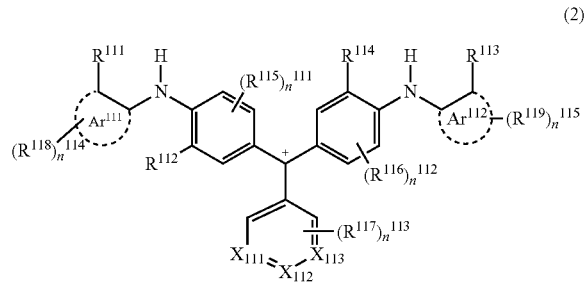
(2)

in Formula (3), $L^{121}$, $L^{122}$, and $L^{123}$ each independently represent a divalent linking group, $T^{121}$, $T^{122}$, and $T^{123}$ each independently represent a hydrogen atom or a group represented by any one of the following Formulae (T-1) to (T-8), at least one of $T^{121}$, $T^{122}$, or $T^{123}$ represents a group represented by any one of Formulae (T-1) to (T-8), $R^{121}$, $R^{123}$, and $R^{125}$ each independently represent a substituent, $R^{122}$ and $R^{124}$ each independently represent a substituent represented by any one of Formulae (X1) to (X4), $X_{121}$, $X_{122}$, and $X_{123}$ each independently represent CH or a nitrogen atom, at least one of $X_{121}$, $X_{122}$, or $X_{123}$ represents CH, in a case where $X_{121}$ to $X_{123}$ represent CH, $R^{125}$ or $(L^{123})$ $n^{126}$-$T^{123}$ may be bonded after a hydrogen atom is removed, $n^{121}$ and $n^{122}$ each independently represent an integer of 0 to 3, $n^{123}$ represents an integer of 0 to 5, $n^{124}$, $n^{125}$, and $n^{126}$ each independently represent 0 or 1, in a case where $n^{121}$, $n^{122}$, and $n^{123}$ each independently represent an integer of 2 or more, plural $R^{121}$'s, $R^{123}$'s, and $R^{125}$'s may be the same as or different from each other, $R^{121}$ and $R^{123}$ may be bonded to each other to form a ring, and a compound represented by Formula (3) has a counter anion in a molecule, and in Formula (2), $R^{111}$ and $R^{113}$ each independently represent a halogen atom, an alkyl group, a cyano group, a nitro group, an alkoxy group, an acyloxy group, a carbamoyloxy group, an alkoxycarbonyloxy group, an amino group, an acylamino group, an aminocarbonylamino group, an alkoxycarbonylamino group, a sulfamoylamino group, an alkylsulfonylamino group, an alkylthio group, a sulfamoyl group, an alkylsulfinyl group, an alkylsulfonyl group, an acyl group, an alkoxycarbonyl group, a carbamoyl group, an imido group, or a sulfo group, $R^{112}$ and $R^{114}$ each independently represent a substituent represented by any one of Formulae (X1) to (X4), $R^{115}$, $R^{116}$, $R^{117}$, $R^{118}$, and $R^{119}$ each independently represent a substituent, $X_{111}$, $X_{112}$, and $X_{113}$ each independently represent CH or a nitrogen atom, at least one of $X_{111}$, $X_{112}$, or $X_{113}$ represents CH, in a case where $X_{111}$ to $X_{113}$ represent CH, $R^{117}$ may be bonded after a hydrogen atom is removed, $Ar^{111}$ and $Ar^{112}$ each independently represent a benzene ring, a naphthalene ring, or a heterocycle, $n^{111}$ and $n^{112}$ each independently represent an integer of 0 to 3, $n^{113}$ represents an integer of 0 to 5, $n^{114}$ and $n^{115}$ each independently represent an integer of 0 or more, in a case where $n^{111}$, $n^{112}$, $n^{113}$, $n^{114}$, and $n^{115}$ each independently represent an integer of 2 or more, plural $R^{115}$'s $R^{116}$'s $R^{117}$'s, $R^{118}$'s, and $R^{119}$'s may be the same as or different from each other, $R^{115}$ and $R^{116}$ may be bonded to each other to form a ring, and a compound represented by Formula (2) has a counter anion in a molecule,

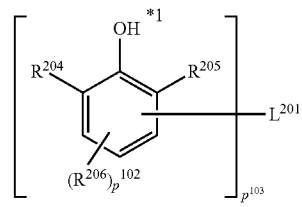
(T-2)

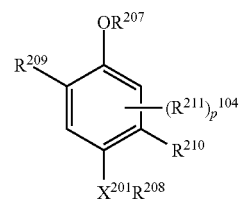
(T-3)

-continued

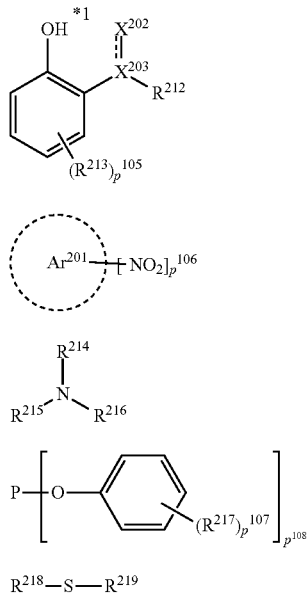

(T-4)

(T-5)

(T-6)

(T-7)

(T-8)

R²⁰¹, R²⁰², R²⁰⁴, and R²⁰⁷ each independently represent an alkyl group, R²⁰⁵ and R²⁰⁸ each independently represent a hydrogen atom or an alkyl group, R²⁰⁹ represents a hydrogen atom, an ionic hydrophilic group, an alkyl group, or an alkoxy group, R²¹⁰ represents a hydrogen atom, an alkyl group, or an alkoxy group, R²⁰³, R²⁰⁶, R²¹¹, R²¹³, and R²¹⁷ each independently represent a substituent, R²¹⁴ represents a hydrogen atom, an oxygen radical, a hydroxy group, an alkyl group, or an alkoxy group, R²¹⁵ and R²¹⁶ each independently represent an alkyl group, R²¹⁸ and R²¹⁹ each independently represent a hydrogen atom, an alkyl group, an aryl group, or a heterocyclic group, R²¹⁸ and R²¹⁹ may be bonded to each other to form a ring, L²⁰¹ represents a $p^{103}$-valent linking group, X²⁰² represents an oxygen atom or a nitrogen atom, X²⁰³ represents a carbon atom or a nitrogen atom, in a case where X²⁰³ represents a carbon atom, a bond between X²⁰² and X²⁰³ is a double bond, in a case where X²⁰³ represents a nitrogen atom, a bond between X²⁰² and X²⁰³ is a single bond, R²¹² represents an aryl group, a heterocyclic group, or a group which is linked to X²⁰² to form a heterocyclic group, Ar²⁰¹ represents an aryl group or a heterocyclic group, $p^{101}$ represents 0 to 3, $p^{102}$ and $p^{104}$ each independently represent 0 to 2, $p^{103}$ represents 2 or 3, $p^{106}$ represents 1 to 3, $p^{105}$ and $p^{107}$ each independently represent 0 to 4, $p^{108}$ represents 2 or 3, X²⁰¹ represents an oxygen atom or NR²²⁰, R²²⁰ represents a hydrogen atom or an alkyl group, in a case where X²⁰¹ represents NH, at least one of R²⁰⁹ or R²¹⁰ represents an alkyl group or an alkoxy group, in a case where $p^{101}$, $p^{102}$, $p^{104}$, $p^{105}$, and $p^{107}$ each independently represent a number of 2 or more, plural R²⁰³'s R²⁰⁶'s R²¹¹'s, R²¹³'s, and R²¹⁷'s may be the same as or different from each other, and a group represented by any one of Formulae (T-1) to (T-8) is bonded to L¹²¹, L¹²², or L¹²³ after any one of hydrogen atoms in the formula is removed, a hydrogen atom represented by *1 is not removed and bonded, and in a case where R²¹⁴ in Formula (T-6) represents a hydrogen atom, the hydrogen atom is not removed and bonded.

[2] The compound according to [1],
in which the compound is a compound represented by any one of Formulae (1) to (3), and R¹⁰² and R¹⁰⁴, R¹¹² and R¹¹⁴, or R¹²² and R¹²⁴ each independently represent a substituent represented by any one of Formulae (X1) to (X3).

[3] The compound according to [2],
in which M¹ represents a hydrogen atom, an alkyl group, or an alkali metal ion,
M² represents a hydrogen atom or an alkyl group,
R¹ represents NR⁴R⁵, and
R⁴ and R⁵ each independently represent a hydrogen atom, an alkyl group, or an aryl group.

[4] The compound according to any one of [1] to [3],
in which the compound is a compound represented by Formula (3), and
at least one of T¹²¹, T¹²², or T¹²³ represents a group represented by Formula (T-1), (T-3), (T-4), (T-5), or (T-6).

[5] A coloring composition for dyeing or textile printing comprising the compound according to any one of [1] to [4].

[6] An ink for ink jet textile printing comprising the compound according to any one of [1] to [4].

[7] A textile printing method of printing the ink for ink jet textile printing according to [6] on fabric using an ink jet method.

[8] The textile printing method according to [7],
in which the fabric includes polyamide.

[9] A fabric which is dyed or printed using the coloring composition for dyeing or textile printing according to [5].

[10] A fabric which is printed using the method according to [7].

According to the present invention, a compound having excellent light fastness, washing fastness, and perspiration fastness, a coloring composition for dyeing or textile printing including the compound, an ink for ink jet textile printing, a method of printing on fabric, and a dyed or printed fabric can be provided.

DESCRIPTION OF THE PREFERRED EMBODIMENTS

Figure 1:
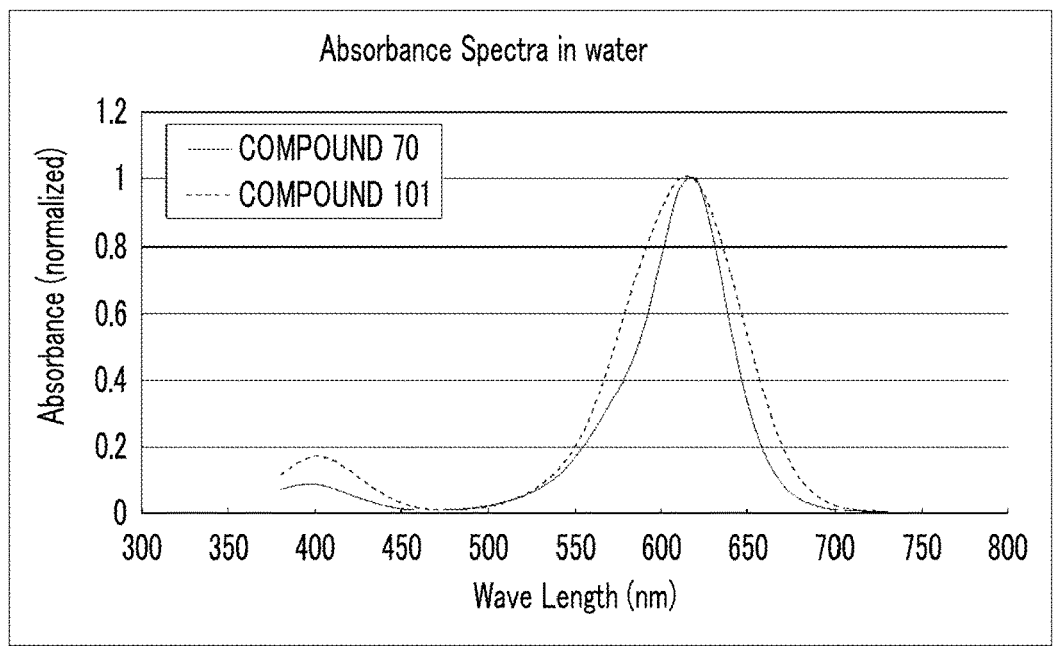
FIG. 1 is a diagram showing aqueous solution absorbance spectra of Compound 70 and Compound 101.
Figure 2:
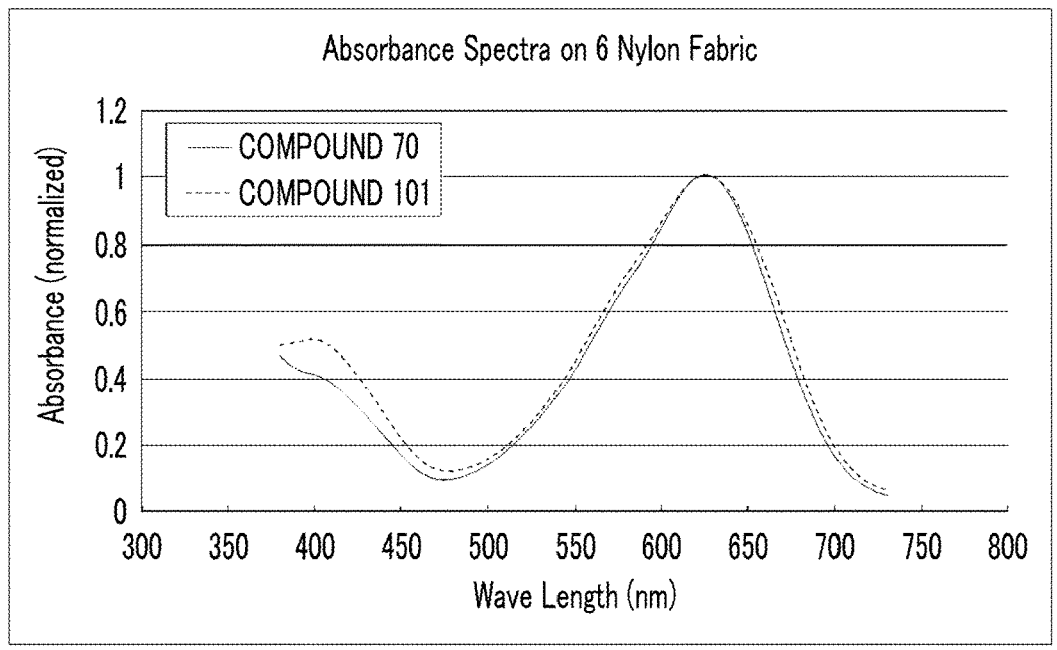
FIG. 2 is a diagram showing absorbance spectra of 6 nylon fabrics dyed with Compound 70 and Compound 101.

Hereinafter, the present invention will be described in detail.

First, specific examples of a substituent in the present invention are defined as a substituent group A.

(Substituent Group A)

Examples of the substituent group A include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a silyl group, and an ionic hydrophilic group. These substituents may further have a substituent, and examples of this substituent include a group selected from the above-described substituent group A.

Examples of the halogen atom include a fluorine atom, a chlorine atom, a bromine atom, and an iodine atom.

Examples of the alkyl group include a linear, branched, or cyclic substituted or unsubstituted alkyl group. In addition, a cycloalkyl group, a bicycloalkyl group, a tricycloalkyl structure and the like having many ring structures are also included. Alkyl groups (for example, an alkoxy group or an alkylthio group) in substituents described below are also included in the examples of the above-described alkyl group.

As the alkyl group, an alkyl group having 1 to 30 carbon atoms is preferable, and examples thereof include a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group. As the cycloalkyl group, a substituted or unsubstituted cycloalkyl group having 3 to 30 carbon atoms is preferable, and examples thereof include a cyclohexyl group, a cyclopentyl group, and a 4-n-dodecylcyclohexyl group. As the bicycloalkyl group, a substituted or unsubstituted bicycloalkyl group having 5 to 30 carbon atoms is preferable, that is, a monovalent group obtained by removing one hydrogen atom from bicycloalkane having 5 to 30 carbon atoms is preferable, and examples thereof include a bicyclo[1,2,2]heptan-2-yl group and a bicyclo[2,2,2]octan-3-yl group.

Examples of the aralkyl group include a substituted or unsubstituted aralkyl group. As the substituted or unsubstituted aralkyl group, an aralkyl group having 7 to 30 carbon atoms is preferable, and examples thereof include a benzyl group and a 2-phenethyl group.

Examples of the alkenyl group include a linear, branched, or cyclic substituted or unsubstituted alkenyl group. In addition, a cycloalkenyl group and a bicycloalkenyl group are also included.

As the alkenyl group, a substituted or unsubstituted alkenyl group having 2 to 30 carbon atoms is preferable, and examples thereof include a vinyl group, an allyl group, a prenyl group, a geranyl group, and an oleyl group. As the cycloalkenyl group, a substituted or unsubstituted cycloalkenyl group having 3 to 30 carbon atoms is preferable, that is, a monovalent group obtained by removing one hydrogen atom from cycloalkene having 3 to 30 carbon atoms is preferable, and examples thereof include a 2-cyclopenten-1-yl group and a 2-cyclohexen-1-yl group. As the bicycloalkenyl group, a substituted or unsubstituted bicycloalkenyl group can be used. A substituted or unsubstituted bicycloalkenyl group having 5 to 30 carbon atoms is preferable, that is, a monovalent group obtained by removing one hydrogen atom from bicycloalkene having one double bond is preferable, and examples thereof include a bicyclo[2,2,1]hept-2-en-1-yl group and a bicyclo[2,2,2]oct-2-en-4-yl group.

As the alkynyl group, a substituted or unsubstituted alkynyl group having 2 to 30 carbon atoms is preferable, and examples thereof include an ethynyl group, a propargyl group, and a trimethylsilylethynyl group.

As the aryl group, a substituted or unsubstituted aryl group having 6 to 30 carbon atoms is preferable, and examples thereof include a phenyl group, a p-tolyl group, a naphthyl group, an m-chlorophenyl group, an o-hexadecanoylaminophenyl group.

As the heterocyclic group, a monovalent group obtained by removing one hydrogen atom from a 5- or 6-membered substituted or unsubstituted aromatic or nonaromatic heterocyclic compound is preferable, and a 5- or 6-membered aromatic heterocyclic group having 3 to 30 carbon atoms is more preferable, and examples thereof include a 2-furyl group, a 2-thienyl group, a 2-pyrimidinyl group, and a 2-benzothiazolyl group. Examples of the nonaromatic heterocyclic group include a morpholinyl group.

As the alkoxy group, a substituted or unsubstituted alkoxy group alkoxy group having 1 to 30 carbon atoms is preferable, and examples thereof include a methoxy group, an ethoxy group, an isopropoxy group, a t-butoxy group, an n-octyloxy group, and a 2-methoxyethoxy group.

As the aryloxy group, a substituted or unsubstituted aryloxy group having 6 to 30 carbon atoms is preferable, and examples thereof include a phenoxy group, a 2-methylphenoxy group, a 4-t-butylphenoxy group, a 3-nitrophenoxy group, and a 2-tetradecanoylaminophenoxy group.

As the silyloxy group, a substituted or unsubstituted silyloxy group having 0 to 20 carbon atoms is preferable, and examples thereof include a trimethylsilyloxy group and a diphenylmethylsilyloxy group.

As the heterocyclic oxy group, a substituted or unsubstituted heterocyclic oxy group having 2 to 30 carbon atoms is preferable, and examples thereof include a 1-phenyltetrazole-5-oxy group and a 2-tetrahydropyranyloxy group.

As the acyloxy group, a formyloxy group, a substituted or unsubstituted alkylcarbonyloxy group having 2 to 30 carbon atoms, or a substituted or unsubstituted arylcarbonyloxy group having 6 to 30 carbon atoms is preferable, and examples thereof include an acetyloxy group, a pivaloyloxy group, a stearoyloxy group, a benzoyloxy group, and a p-methoxyphenylcarbonyloxy group.

As the carbamoyloxy group, a substituted or unsubstituted carbamoyloxy group having 1 to 30 carbon atoms is preferable, and examples thereof include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

As the alkoxycarbonyloxy group, a substituted or unsubstituted alkoxycarbonyloxy group having 2 to 30 carbon atoms is preferable, and examples thereof include a methoxycarbonyloxy group, an ethoxycarbonyloxy group, a t-butoxycarbonyloxy group, and an n-octylcarbonyloxy group.

As the aryloxycarbonyloxy group, a substituted or unsubstituted aryloxycarbonyloxy group having 7 to 30 carbon atoms is preferable, and examples thereof include a phenoxycarbonyloxy group, a p-methoxyphenoxycarbonyloxy group, and a p-n-hexadecyloxyphenoxycarbonyloxy group.

Examples of the amino group include an alkylamino group, an arylamino group, and a heterocyclic amino group. As the amino group, an amino group, a substituted or unsubstituted alkylamino group having 1 to 30 carbon atoms, a substituted or unsubstituted anilino group having 6 to 30 carbon atoms is preferable, and examples thereof include a methylamino group, a dimethylamino group, an anilino group, an N-methyl-anilino group, a diphenylamino group, and a triazinylamino group.

As the acylamino group, a formylamino group, a substituted or unsubstituted alkylcarbonylamino group having 1 to 30 carbon atoms, or a substituted or unsubstituted arylcarbonylamino group having 6 to 30 carbon atoms is preferable, and examples thereof include an acetylamino group, a pivaloylamino group, a lauroylamino group, a benzoylamino group, and a 3,4,5-tri-n-octyloxyphenylcarbonylamino group.

As the aminocarbonylamino group, a substituted or unsubstituted aminocarbonylamino group having 1 to 30 carbon atoms is preferable, and examples thereof include a carbamoylamino group, an N,N-dimethylaminocarbonylamino group, an N,N-diethylaminocarbonylamino group, and a morpholinocarbonylamino group.

As the alkoxycarbonylamino group, a substituted or unsubstituted alkoxycarbonylamino group having 2 to 30 carbon atoms is preferable, and examples thereof include a methoxycarbonylamino group, an ethoxycarbonylamino group, a t-butoxycarbonylamino group, an n-octadecyloxycarbonylamino group, and an N-methyl-methoxycarbonylamino group.

As the aryloxycarbonylamino group, a substituted or unsubstituted aryloxycarbonylamino group having 7 to 30 carbon atoms is preferable, and examples thereof include a phenoxycarbonylamino group, a p-chlorophenoxycarbonylamino group, and an m-n-octyloxyphenoxycarbonylamino group.

As the sulfamoylamino group, a substituted or unsubstituted sulfamoylamino group having 0 to 30 carbon atoms is preferable, and examples thereof include a sulfamoylamino group, an N,N-dimethylaminosulfonylamino group, and an N-n-octylaminosulfonylamino group.

As the alkyl- or aryl-sulfonylamino group, a substituted or unsubstituted alkylsulfonylamino group having 1 to 30 carbon atoms or a substituted or unsubstituted arylsulfonylamino group having 6 to 30 carbon atoms is preferable, and examples thereof include a methylsulfonylamino group, a butylsulfonylamino group, a phenylsulfonylamino group, a 2,3,5-trichlorophenylsulfonylamino group, and a p-methylphenylsulfonylamino group.

As the alkylthio group, a substituted or unsubstituted alkylthio group having 1 to 30 carbon atoms is preferable, and examples thereof include a methylthio group, an ethylthio group, and an n-hexadecylthio group.

As the arylthio group, a substituted or unsubstituted arylthio group having 6 to 30 carbon atoms is preferable, and examples thereof include a phenylthio group, a p-chlorophenylthio group, and an m-methoxyphenylthio group.

As the heterocyclic thio group, a substituted or unsubstituted heterocyclic thio group having 2 to 30 carbon atoms is preferable, and examples thereof include a 2-benzothiazolylthio group and a 1-phenyltetrazole-5-ylthio group.

As the sulfamoyl group, a substituted or unsubstituted sulfamoyl group having 0 to 30 carbon atoms is preferable, and examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group.

As the alkyl- or aryl-sulfinyl group, a substituted or unsubstituted alkylsulfinyl group having 1 to 30 carbon atoms or a substituted or unsubstituted arylsulfinyl group having 6 to 30 carbon atoms is preferable, and examples thereof include a methylsulfinyl group, an ethylsulfinyl group, a phenylsulfinyl group, and a p-methylphenylsulfinyl group.

As the alkyl- or aryl-sulfonyl group, a substituted or unsubstituted alkylsulfonyl group having 1 to 30 carbon atoms or a substituted or unsubstituted arylsulfonyl group having 6 to 30 carbon atoms is preferable, and examples thereof include a methylsulfonyl group, an ethylsulfonyl group, a phenylsulfonyl group, and a p-methylphenylsulfonyl group.

As the acyl group, a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms and being bonded to a carbonyl group through a carbon atom is preferable, and examples thereof include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

As the aryloxycarbonyl group, a substituted or unsubstituted aryloxycarbonyl group having 7 to 30 carbon atoms is preferable, and examples thereof include a phenoxycarbonyl group, an o-chlorophenoxycarbonyl group, an m-nitrophenoxycarbonyl group, and a p-t-butylphenoxycarbonyl group.

As the alkoxycarbonyl group, a substituted or unsubstituted alkoxycarbonyl group having 2 to 30 carbon atoms is preferable, and examples thereof include a methoxycarbonyl group, an ethoxycarbonyl group, a t-butoxycarbonyl group, and an n-octadecyloxycarbonyl group.

As the carbamoyl group, a substituted or unsubstituted carbamoyl group having 1 to 30 carbon atoms is preferable, and examples thereof include a carbamoyl group, an N-methylcarbamoyl group, an N,N-dimethylcarbamoyl group, an N,N-di-n-octylcarbamoyl group, and an N-(methylsulfonyl)carbamoyl group.

As the aryl- or heterocyclic azo group, a substituted or unsubstituted aryl azo group having 6 to 30 carbon atoms or a substituted or unsubstituted heterocyclic azo group having 3 to 30 carbon atoms is preferable, and examples thereof include a phenylazo group, a p-chlorophenylazo group, and a 5-ethylthio-1,3,4-thiadiazol-2-ylazo group.

As the imido group, for example, an N-succinimido group or an N-phthalimido group is preferable.

As the phosphino group, a substituted or unsubstituted phosphino group having 0 to 30 carbon atoms is preferable, and examples thereof include a dimethylphosphino group, a diphenylphosphino group, and a methylphenoxyphosphino group.

As the phosphinyl group, a substituted or unsubstituted phosphinyl group having 0 to 30 carbon atoms is preferable, and examples thereof include a phosphinyl group, a dioctyloxyphosphinyl group, and a diethoxyphosphinyl group.

As the phosphinyloxy group, a substituted or unsubstituted phosphinyloxy group having 0 to 30 carbon atoms is preferable, and examples thereof include a diphenoxyphosphinyloxy group and a dioctyloxyphosphinyloxy group.

As the phosphinylamino group, a substituted or unsubstituted phosphinylamino group having 0 to 30 carbon atoms is preferable, and examples thereof include a dimethoxyphosphinylamino group and a dimethylaminophosphinylamino group.

As the silyl group, a substituted or unsubstituted silyl group having 0 to 30 carbon atoms is preferable, and examples thereof include a trimethylsilyl group, a t-butyldimethylsilyl group, and a phenyldimethylsilyl group.

Examples of the ionic hydrophilic group include a sulfo group, a carboxyl group, a thiocarboxyl group, a sulfino group, a phosphono group, a dihydroxyphosphino group, and a quaternary ammonium group. Among these a sulfo group or a carboxyl group is more preferable. In addition, the ionic hydrophilic group may be in a foiui including a cation or an anion (also referred to as "form of a salt"). In addition, the carboxyl group, the phosphono group, or the sulfo group may be in the form of a salt, and examples of a cation which forms a salt with the carboxyl group, the phosphono group, or the sulfo group include an ammonium ion, an alkali metal ion (for example, a lithium ion, a sodium ion, or a potassium ion), and an organic cation (for example, a tetramethylammonium ion, a tetramethylguanidium ion, or tetramethylphosphonium). Among these, a lithium ion, a sodium ion, a potassium ion, an ammonium ion is preferable, a lithium ion or a sodium ion is more preferable, and a sodium ion is most preferable. In addition, the ionic hydrophilic group may include a plurality of cations. In a case where the ionic hydrophilic group includes a plurality of cations, it is preferable that the content of a sodium ion is the highest.

In the present invention, in a case where a compound is a salt, the salt is dissociated and present in a water-soluble ink in the form of ions.

[Compound Represented by Any One of Formulae (1) to (3)]

In a case where a compound represented by any one of Formulae (1) to (3) is used as a coloring composition for dyeing or textile printing, fabrics dyed in various colors including cyan to blue can be obtained. In a colored portion of the dyed fabrics, the improvement of light fastness, washing fastness, and perspiration fastness is verified. The action mechanism is not clear but is presumed to be that, by introducing a substituent represented by any one of Formulae (X1) to (X4) into the ortho position of an amino group of a triarylmethane compound having the amino group at a specific site such that the substituent and a hydrogen atom of the amino group form a hydrogen bond, removal of the hydrogen atom is suppressed, and light fastness, washing fastness, and perspiration fastness are excellent.

First, the compound represented by Formula (1) will be described.

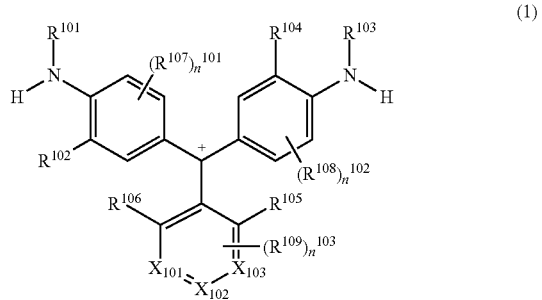

(1)

In Formula (1), $R^{101}$ and $R^{103}$ each independently represent a hydrogen atom, an alkyl group, an aryl group, or a heterocyclic group. $R^{102}$ and $R^{104}$ each independently represent a substituent represented by any one of the following Formulae (X1) to (X4). $R^{105}$ and $R^{106}$ each independently represent an alkyl group, a cyano group, a nitro group, an alkoxy group, an acyloxy group, a carbamoyloxy group, an alkoxycarbonyloxy group, an amino group, an acylamino group, an aminocarbonylamino group, an alkoxycarbonylamino group, a sulfamoylamino group, an alkylsulfonylamino group, an alkylthio group, a sulfamoyl group, an alkylsulfinyl group, an alkylsulfonyl group, an acyl group, an alkoxycarbonyl group, a carbamoyl group, an imido group, or a sulfo group. $R^{107}$, $R^{108}$, and $R^{109}$ each independently represent a substituent, and $X_{101}$, $X_{102}$, and $X_{103}$ each independently represent CH or a nitrogen atom. At least one of $X_{101}$, $X_{102}$, or $X_{103}$ represents CH. In a case where $X_{101}$ to $X_{103}$ represent CH, $R^{109}$ may be bonded after a hydrogen atom is removed. $n^{101}$, $n^{102}$, and $n^{103}$ each independently represent an integer of 0 to 3. In a case where $n^{101}$, $n^{102}$, and $n^{103}$ each independently represent an integer of 2 or more, plural $R^{107}$'s, $R^{108}$'s, and $R^{109}$'s may be the same as or different from each other. $R^{107}$ and $R^{108}$ may be bonded to each other to form a ring. A compound represented by Formula (1) has a counter anion in a molecule.

(X1)

(X2)

(X3)

(X4)

$M^1$ represents a hydrogen atom, an alkyl group, an aryl group, or a cation. $M^2$ represents a hydrogen atom, an alkyl group, or an aryl group. $R^1$ represents an alkyl group, an aryl group, or $NR^4R^5$. $R^4$ and $R^5$ each independently represent a hydrogen atom, an alkyl group, or an aryl group. $R^2$ and $R^3$ each independently represent a hydrogen atom, an alkyl group, or an aryl group. * represents a direct bond to a carbon atom.

In a case where $R^{101}$ and $R^{103}$ in Formula (1) represent an alkyl group, an aryl group, or a heterocyclic group, these groups may have a substituent.

In a case where $R^{105}$ and $R^{106}$ each independently represent an alkyl group, an alkoxy group, an acyloxy group, a carbamoyloxy group, an alkoxycarbonyloxy group, an amino group, an acylamino group, an aminocarbonylamino group, an alkoxycarbonylamino group, a sulfamoylamino group, an alkylsulfonylamino group, an alkylthio group, a sulfamoyl group, an alkylsulfinyl group, an alkylsulfonyl group, an acyl group, an alkoxycarbonyl group, a carbamoyl group, or an imido group, these groups may have a substituent.

In a case where each group has a substituent, the substituent may be selected from, for example, the substituent group A.

$R^{101}$ and $R^{103}$ represent preferably a hydrogen atom, an alkyl group which may have a substituent, or an aryl group which may have a substituent.

As the alkyl group represented by $R^{101}$ and $R^{103}$, an alkyl group having 1 to 6 carbon atoms is preferable, an alkyl group having 1 to 3 carbon atoms is more preferable, and a methyl group or an ethyl group is still more preferable. In a case where $R^{101}$ and $R^{103}$ represent an alkyl group, a methyl group which is substituted with a phenyl group is preferable. The methyl group which is substituted with a phenyl group may further have a substituent.

As the aryl group represented by $R^{101}$ and $R^{103}$, a phenyl group or a naphthyl group is preferable, and a phenyl group is more preferable.

It is preferable that $R^{105}$ and $R^{106}$ represent an alkyl group which may have a substituent, an alkoxy group which may have a substituent, an acyloxy group which may have a substituent, a sulfamoyl group which may have a substituent, an acyl group which may have a substituent, an alkoxycarbonyl group which may have a substituent, or a sulfo group.

It is more preferable that $R^{105}$ and $R^{106}$ represent an alkyl group which may have a substituent, a sulfamoyl group which may have a substituent, or a sulfo group.

The substituent represented by $R^{107}$, $R^{108}$, and $R^{109}$ may be selected from, for example, the substituent group A. As the substituent, an alkyl group, a sulfo group, a sulfamoyl group which may have a substituent, a halogen atom, an alkoxy group which may have a substituent, an aryloxy group which may have a substituent, a heterocyclic oxy group which may have a substituent, an acyloxy group which may have a substituent, an alkylamino group which may have a substituent, an arylamino group which may have a substituent, a heterocyclic amino group which may have a substituent, an acylamino group which may have a substituent, an aminocarbonylamino group which may have a substituent, an alkoxycarbonylamino group which may have a substituent, an aryloxycarbonylamino group which may have a substituent, or an alkyl- or aryl-sulfonylamino group which may have a substituent is preferable, and an alkyl group, a sulfo group, or an alkylamino group which may have a substituent, or an arylamino group which may have a substituent is more preferable.

It is preferable that $n^{101}$ and $n^{102}$ represent 0 to 2. It is preferable that $n^{103}$ represents 0 or 1.

$X_{101}$, $X_{102}$, and $X_{103}$ each independently represent CH or a nitrogen atom and preferably CH. In a case where $X_{101}$, $X_{102}$, and $X_{103}$ represent CH, $R^{109}$ may be bonded after a hydrogen atom is removed.

$R^{102}$ and $R^{104}$ each independently represent a substituent represented by any one of Formulae (X1) to (X4), and preferably a substituent represented by any one of Formulae (X1) to (X3).

In Formula (X1), $M^1$ represents a hydrogen atom, an alkyl group, an aryl group, or a cation.

As the alkyl group represented by $M^1$, an alkyl group having 1 to 6 carbon atoms is preferable, an alkyl group having 1 to 3 carbon atoms is more preferable, and a methyl group or an ethyl group is still more preferable. In addition, the alkyl group may have a substituent, and examples of the substituent include the substituent group A.

As the aryl group represented by $M^1$, a phenyl group or a naphthyl group is preferable, and a phenyl group is more preferable. In addition, the aryl group may have a substituent, and examples of the substituent include the substituent group A.

Examples of the cation represented by $M^1$ include an ammonium ion, an alkali metal ion (for example, a lithium ion, a sodium ion, or a potassium ion), and an organic cation (for example, a tetramethylammonium ion, a tetramethylguanidium ion, or tetramethylphosphonium). Among these, an alkali metal ion is preferable, a lithium ion or a sodium ion is more preferable, and a sodium ion is still more preferable.

$M^1$ represents preferably a hydrogen atom, an alkyl group, or an alkali metal ion and more preferably a hydrogen atom.

In Formula (X2), $R^1$ represents an alkyl group, an aryl group, or $NR^4R^5$. $R^4$ and $R^5$ each independently represent a hydrogen atom, an alkyl group, or an aryl group.

As the alkyl group represented by $R^1$, an alkyl group having 1 to 6 carbon atoms is preferable, an alkyl group having 1 to 3 carbon atoms is more preferable, and a methyl group or an ethyl group is still more preferable. In addition, the alkyl group may have a substituent, and examples of the substituent include the substituent group A.

As the aryl group represented by $R^1$, a phenyl group or a naphthyl group is preferable, and a phenyl group is more preferable. In addition, the aryl group may have a substituent, and examples of the substituent include the substituent group A.

Examples of the alkyl group represented by $R^4$ and $R^3$ are the same as those of the alkyl group represented by $R^1$.

Examples of the aryl group represented by $R^4$ and $R^5$ are the same as those of the aryl group represented by $R^1$.

It is preferable that $R^1$ represents $NR^4R^5$ and $R^4$ and $R^5$ each independently represent a hydrogen atom or an aryl group.

In Formula (X3), M2 represents a hydrogen atom, an alkyl group, or an aryl group, and the alkyl group and the aryl group have the same preferable ranges as those of $M^1$ in Formula (X1). $M^2$ represents preferably a hydrogen atom or an alkyl group, and more preferably a hydrogen atom.

$R^2$ and $R^3$ in Formula (X4) have the same definitions and the same preferable ranges as $R^4$ and $R^5$ described above.

In general, a triphenylmethane compound is an ionic compound and has a resonance structure. Therefore, for example, regarding Acid Blue 7, the following (A) to (C) represent the same compound.

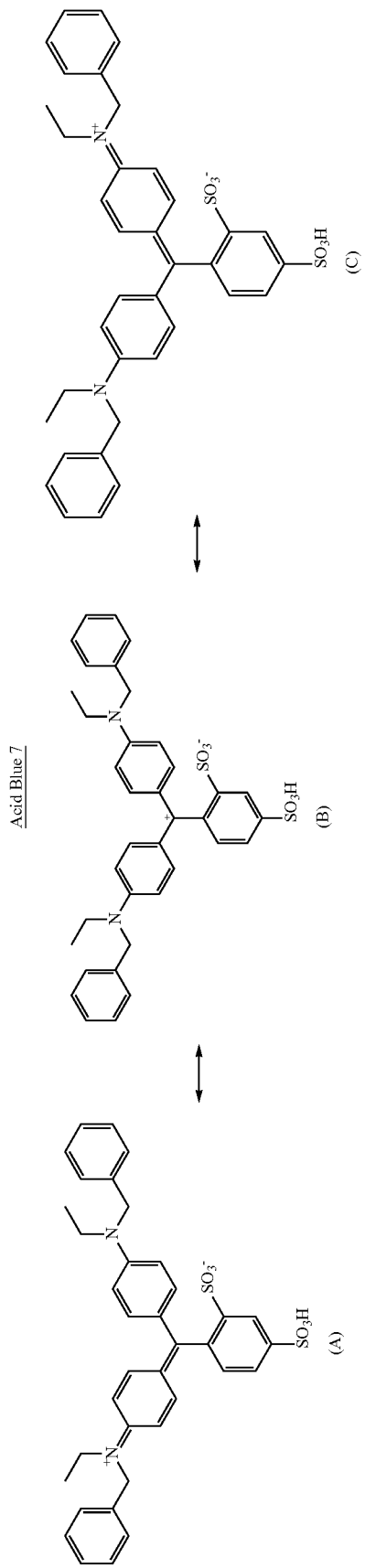

Next, the compound represented by Formula (2) will be described.

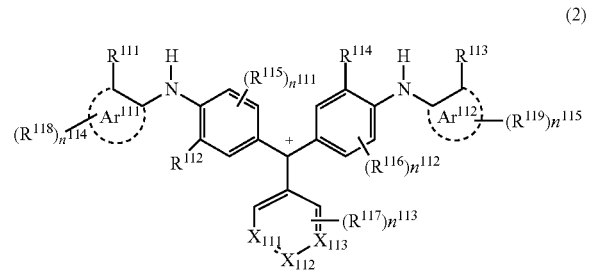

(2)

In Formula (2), $R^{111}$ and $R^{113}$ each independently represent a halogen atom, an alkyl group, a cyano group, a nitro group, an alkoxy group, an acyloxy group, a carbamoyloxy group, an alkoxycarbonyloxy group, an amino group, an acylamino group, an aminocarbonylamino group, an alkoxycarbonylamino group, a sulfamoylamino group, an alkylsulfonylamino group, an alkylthio group, a sulfamoyl group, an alkylsulfinyl group, an alkylsulfonyl group, an acyl group, an alkoxycarbonyl group, a carbamoyl group, an imido group, or a sulfo group. $R^{112}$ and $R^{114}$ each independently represent a substituent represented by any one of Formulae (X1) to (X4). $R^{115}$, $R^{116}$, $R^{117}$, $R^{118}$, and $R^{119}$ each independently represent a substituent, and $X_{111}$, $X_{112}$, and $X_{113}$ each independently represent CH or a nitrogen atom. At least one of $X_{111}$, $X_{112}$, or $X_{113}$ represents CH. In a case where $X_{111}$ to $X_{113}$ represent CH, $R^{117}$ may be bonded after a hydrogen atom is removed. $Ar^{111}$ and $Ar^{112}$ each independently represent a benzene ring, a naphthalene ring, or a heterocycle. $n^{111}$ and $n^{112}$ each independently represent an integer of 0 to 3, and $n^{113}$ represents an integer of 0 to 5. $n^{114}$ and $n^{115}$ each independently represent an integer of 0 or more. In a case where $n^{111}$, $n^{112}$, $n^{113}$, $n^{114}$, and $n^{115}$ each independently represent an integer of 2 or more, plural $R^{115}$'s $R^{116}$'s $R^{117}$'s, $R^{118}$∝s and $R^{119}$'s may be the same as or different from each other. $R^{115}$ and $R^{116}$ may be bonded to each other to form a ring. A compound represented by Formula (2) has a counter anion in a molecule.

In a case where $R^{111}$ and $R^{113}$ each independently represent an alkyl group, an alkoxy group, an acyloxy group, a carbamoyloxy group, an alkoxycarbonyloxy group, an amino group, an acylamino group, an aminocarbonylamino group, an alkoxycarbonylamino group, a sulfamoylamino group, an alkylsulfonylamino group, an alkylthio group, a sulfamoyl group, an alkylsulfinyl group, an alkylsulfonyl group, an acyl group, an alkoxycarbonyl group, a carbamoyl group, or an imido group, these groups may have a substituent.

In a case where each group has a substituent, the substituent may be selected from, for example, the substituent group A.

$R^{111}$ and $R^{113}$ represent preferably a halogen atom, an alkyl group which may have a substituent, an alkoxy group which may have a substituent, an acyloxy group which may have a substituent, a sulfamoyl group which may have a substituent, an acyl group which may have a substituent, an alkoxycarbonyl group which may have a substituent, a carbamoyl group, or a sulfo group, and more preferably an alkyl group which may have a substituent or a halogen atom. As the halogen atom, a chloro group is preferable.

As the alkyl group represented by $R^{111}$ and $R^{113}$, an alkyl group having 1 to 6 carbon atoms is preferable, an alkyl group having 1 to 3 carbon atoms is more preferable, a methyl group or an ethyl group is still more preferable, and a methyl group is even still more preferable.

The substituent represented by $R^{115}$, $R^{116}$, $R^{117}$, $R^{118}$, and $R^{119}$ may be selected from, for example, the substituent group A. As the substituent, an alkyl group, a sulfo group, a sulfamoyl group which may have a substituent, a halogen atom, an alkoxy group which may have a substituent, an aryloxy group which may have a substituent, a heterocyclic oxy group which may have a substituent, an acyloxy group which may have a substituent, an amino group which may have a substituent, an alkylamino group which may have a substituent, an arylamino group which may have a substituent, a heterocyclic amino group which may have a substituent, an acylamino group which may have a substituent, an aminocarbonylamino group which may have a substituent, an alkoxycarbonylamino group which may have a substituent, an aryloxycarbonylamino group which may have a substituent, an alkyl- or aryl-sulfonylamino group which may have a substituent, an alkylthio group which may have a substituent, an alkylsulfonyl group which may have a substituent, or an alkylaminocarbonyl group which may have a substituent is preferable, and an alkyl group, a sulfo group, an alkylamino group which may have a substituent, or an arylamino group which may have a substituent is more preferable. In addition, in a case where the alkylamino group and the arylamino group have a substituent, the substituent is selected from, for example, the substituent group A. As the substituent, an alkyl group, a halogen atom, an alkoxycarbonyl group, or a sulfo group is preferable.

As the alkyl group represented by $R^{115}$, $R^{116}$, $R^{117}$, $R^{118}$, and $R^{119}$, an alkyl group having 1 to 10 carbon atoms is preferable, an alkyl group having 1 to 6 carbon atoms is more preferable, and a methyl group, an ethyl group, an isopropyl group, or a tert-butyl group is still more preferable. From the viewpoint of light fastness, an ethyl group is more preferable rather than a methyl group, and an isopropyl group is more preferable rather than an ethyl group.

As a substitution site in an aromatic ring of $R^{115}$ and $R^{116}$, an ortho position from a nitrogen atom is preferable.

It is more preferable that $R^{117}$ represents a sulfo group. As a substitution site in an aromatic ring of $R^{117}$, an ortho position from a carbon atom bonded to a carbon atom indicated by +, or $X_{112}$ is preferable.

$Ar^{111}$ and $Ar^{112}$ represent preferably a benzene ring or a naphthalene ring, and more preferably a benzene ring.

It is preferable that $n^{111}$ and $n^{112}$ represent 0 to 2. It is preferable that $n^{113}$ represents 0 to 3. It is preferable that $n^{114}$ and $R^{115}$ represent 0 to 5.

$X_{111}$, $X_{112}$, and $X_{113}$ each independently represent CH or a nitrogen atom and preferably CH. In a case where $X_{111}$, $X_{112}$, and $X_{113}$ represent CH, $R^{117}$ may be bonded after a hydrogen atom is removed.

$R^{112}$ and $R^{114}$ in Formula (1) have the same definitions and the same preferable ranges as $R^{102}$ and $R^{104}$ described above.

Next, the compound represented by Formula (3) will be described.

(3)

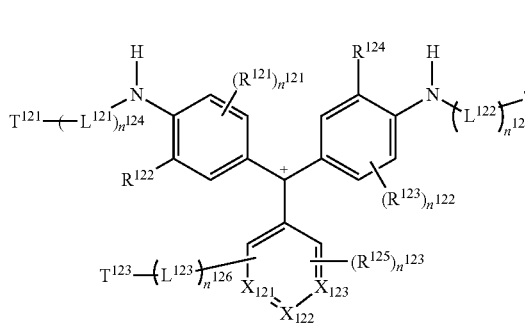

In Formula (3), $L^{121}$, $L^{122}$, and $L^{123}$ each independently represent a divalent linking group, and $T^{121}$, $T^{122}$, and $T^{123}$ each independently represent a hydrogen atom or a group represented by any one of the following Formulae (T-1) to (T-8). At least one of $T^{121}$, $T^{122}$, or $T^{123}$ represents a group represented by any one of Formulae (T-1) to (T-8). $R^{121}$, $R^{123}$, and $R^{125}$ each independently represent a substituent. $R^{122}$ and $R^{124}$ each independently represent a substituent represented by any one of Formulae (X1) to (X4). $X_{121}$, $X_{122}$, and $X_{123}$ each independently represent CH or a nitrogen atom. At least one of $X_{121}$, $X_{122}$, or $X_{123}$ represents CH. In a case where $X_{121}$ to $X_{123}$ represent CH, $R^{125}$ or ($L^{123}$)$_{n^{126}}$-$T^{123}$ may be bonded after a hydrogen atom is removed. $n^{121}$ and $n^{122}$ each independently represent an integer of 0 to 3, $n^{123}$ represents an integer of 0 to 5, and $n^{124}$, $n^{125}$, and $n^{126}$ each independently represent 0 or 1. In a case where $n^{121}$, $n^{122}$, and $n^{123}$ each independently represent an integer of 2 or more, plural $R^{121}$'s, $R^{123}$'s, and $R^{125}$'s may be the same as or different from each other. $R^{121}$ and $R^{123}$ may be bonded to each other to form a ring. A compound represented by Formula (3) has a counter anion in a molecule.

(T-1)

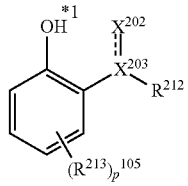

(T-2)

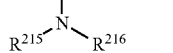

(T-3)

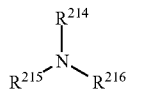

(T-4)

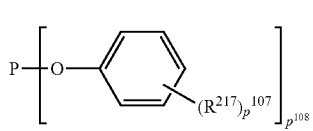

(T-5)

(T-6)

(T-7)

(T-8)

$R^{201}$, $R^{202}$, $R^{204}$, and $R^{207}$ each independently represent an alkyl group. $R^{205}$ and $R^{208}$ each independently represent a hydrogen atom or an alkyl group. $R^{209}$ represents a hydrogen atom, an ionic hydrophilic group, an alkyl group, or an alkoxy group. $R^{210}$ represents a hydrogen atom, an alkyl group, or an alkoxy group. $R^{203}$, $R^{206}$, $R^{211}$, $R^{213}$, and $R^{217}$ each independently represent a substituent. $R^{214}$ represents a hydrogen atom, an oxygen radical (represented by *—O., in which * represents a direct bond, and . represents an unpaired electron), a hydroxy group, an alkyl group, or an alkoxy group, $R^{215}$ and $R^{216}$ each independently represent an alkyl group. $R^{218}$ and $R^{219}$ each independently represent a hydrogen atom, an alkyl group, an aryl group, or a heterocyclic group. $R^{218}$ and $R^{219}$ may be bonded to each other to form a ring. $L^{201}$ represents a $p^{103}$-valent linking group. $X^{202}$ represents an oxygen atom or a nitrogen atom. $X^{203}$ represents a carbon atom or a nitrogen atom. In a case where $X^{203}$ represents a carbon atom, a bond between $X^{202}$ and $X^{203}$ is a double bond, and in a case where $X^{203}$ represents a nitrogen atom, a bond between $X^{202}$ and $X^{203}$ is a single bond. $R^{212}$ represents an aryl group, a heterocyclic group, or a group which is linked to $X^{202}$ to form a heterocyclic group. $Ar^{201}$ represents an aryl group or a heterocyclic group. $p^{101}$ represents 0 to 3, $p^{102}$ and $p^{104}$ each independently represent 0 to 2, $p^{103}$ represents 2 or 3, and $p^{106}$ represents 1 to 3. $p^{105}$ and $p^{107}$ each independently represent 0 to 4. $p^{108}$ represents 2 to 3. $X^{201}$ represents an oxygen atom or $NR^{220}$, and $R^{220}$ represents a hydrogen atom or an alkyl group. In a case where $X^{201}$ represents NH, at least one of $R^{209}$ or $R^{210}$ represents an alkyl group or an alkoxy group. In a case where $p^{101}$, $p^{102}$, $p^{104}$, $p^{105}$, and $p^{107}$ each independently represent a number of 2 or more, plural $R^{203}$'s $R^{206}$'s $R^{211}$'s $R^{213}$'s, and $R^{217}$'s may be the same as or different from each other.

A group represented by any one of Formulae (T-1) to (T-8) is bonded to $L^{121}$, $L^{122}$, or $L^{123}$ after any one of hydrogen atoms in the formula is removed. A hydrogen atom represented by *1 is not removed and bonded, and in a case where $R^{214}$ in Formula (T-6) represents a hydrogen atom, the hydrogen atom is not removed and bonded.

In a case where $L^{121}$, $L^{122}$, and $L^{123}$ represent a divalent linking group, examples of the divalent linking group include an alkylene group, an arylene group, a heteryl group, an ether bond, —NH—, a thioether bond, a carbonyl group, a sulfonyl group, and a divalent linking group obtained by combining at least two of the above-described groups. These linking groups may have a substituent. In a case where each group has a substituent, the substituent may be selected from, for example, the substituent group A.

It is preferable that one or two of $T^{121}$, $T^{122}$, or $T^{123}$ represents a group represented by any one of Formulae (T-1) to (T-8). As the number of groups represented by any one of Formulae (T-1) to (T-8) increases, an effect of improving light fastness is likely to be obtained.

The substituent represented by $R^{121}$, $R^{123}$, and $R^{125}$ may be selected from, for example, the substituent group A. As the substituent, an alkyl group, a sulfo group, a sulfamoyl group which may have a substituent, a halogen atom, an alkoxy group which may have a substituent, an aryloxy group which may have a substituent, a heterocyclic oxy group which may have a substituent, an acyloxy group which may have a substituent, an alkylamino group which may have a substituent, an arylamino group which may have a substituent, a heterocyclic amino group which may have a substituent, an acylamino group which may have a substituent, an aminocarbonylamino group which may have a substituent, an alkoxycarbonylamino group which may have a substituent, an aryloxycarbonylamino group which may have a substituent, or an alkyl- or aryl-sulfonylamino group which may have a substituent is preferable. Among these, an alkyl group, a sulfo group, an alkylamino group which may have a substituent, or an arylamino group which may have a substituent is more preferable.

It is more preferable that $R^{125}$ represents a sulfo group. As a substitution site in an aromatic ring of $R^{125}$, an ortho position from a carbon atom bonded to a carbon atom indicated by +, or $X^{122}$ is preferable.

It is preferable that $n^{121}$ and $n^{122}$ represent 0 to 2. It is preferable that $n^{123}$ represents 0 to 3.

$n^{124}$, $n^{125}$, and $n^{126}$ each independently represent 0 or 1. A group represented by any one of Formulae (T-1) to (T-8) is bonded to $L^{121}$, $L^{122}$, or $L^{123}$ after any one of hydrogen atoms in the formula is removed. In a case where $n^{124}$, $n^{125}$, and $n^{126}$ represent 0, the group represented by any one of Formulae (T-1) to (T-8) is bonded to a nitrogen atom.

$X_{121}$, $X_{122}$, and $X_{123}$ each independently represent CH or a nitrogen atom and preferably CH. In a case where $X_{121}$, $X_{122}$, and $X_{123}$ represent CH, $R^{125}$ or $(L^{123})n^{126}$-$T^{123}$ may be bonded after a hydrogen atom is removed.

$R^{122}$ and $R^{124}$ in Formula (1) have the same definitions and the same preferable ranges as $R^{102}$ and $R^{104}$ described above.

In Fonnulae (T-1) to (T-3), in a case where $R^{201}$, $R^{202}$, $R^{204}$, $R^{205}$, $R^{207}$ and $R^{208}$ represent an alkyl group, the alkyl group may have a substituent.

In a case where $R^{209}$ and $R^{210}$ represent an alkyl group or an alkoxy group, these groups may have a substituent.

In a case where each group has a substituent, the substituent may be selected from, for example, the substituent group A.

$X^{201}$ represents an oxygen atom or $NR^{220}$, and $R^{220}$ represents a hydrogen atom or an alkyl group which may have a substituent. As the alkyl group represented by $R^{220}$, an alkyl group having 1 to 6 carbon atoms is preferable, an alkyl group having 1 to 4 carbon atoms is more preferable, and specific examples thereof include a methyl group, an ethyl group, and a propyl group.

As the alkyl group represented by $R^{201}$, $R^{202}$, $R^{204}$, $R^{205}$, $R^{209}$, and $R^{210}$, an alkyl group having 1 to 6 carbon atoms is preferable, an alkyl group having 1 to 4 carbon atoms is more preferable, and a methyl group, an ethyl group, an isopropyl group, or a tert-butyl group is still more preferable.

In a case where $X^{201}$ represents NH, at least one of $R^{209}$ or $R^{210}$ represents an alkyl group or an alkoxy group.

As the alkyl group represented by $R^{207}$ and $R^{208}$, an alkyl group having 1 to 10 carbon atoms is preferable, an alkyl group having 1 to 6 carbon atoms is more preferable, and a methyl group, an ethyl group, a propyl group, a butyl group, an isobutyl group, or a hexyl group is still more preferable.

As the alkoxy group represented by $R^{209}$ and $R^{210}$, an alkoxy group having 1 to 6 carbon atoms is preferable, an alkoxy group having 1 to 3 carbon atoms is more preferable, and a methoxy group or an ethoxy group is still more preferable.

Examples of the divalent linking group represented by $L^{201}$ include those of $L^{121}$, $L^{122}$, and $L^{123}$. Examples of the trivalent linking group include a triazine linking group and a cyanuric acid linking group. It is preferable that $L^{201}$ represents a divalent linking group.

The substituent represented by $R^{203}$, $R^{206}$, and $R^{211}$ may be selected from, for example, the substituent group A.

$p^{101}$ represents 0 to 3 and preferably 0 or 1. $p^{102}$ and $p^{104}$ represent 0 to 2 and preferably 0 or 1.

Preferable forms where the compounds represented by Formulae (T-1) and (T-3) are linked are as follows. In the preferable forms, the compound is bonded to $L^{121}$, $L^{122}$, or $L^{123}$ through *.

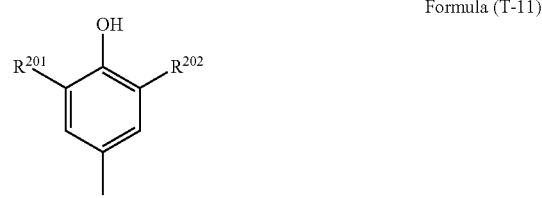

Formula (T-11)

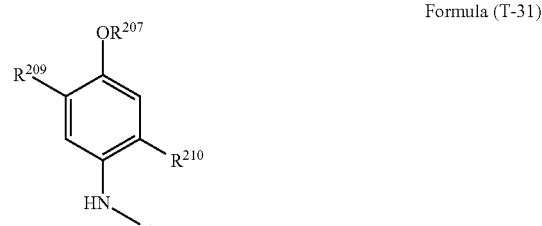

Formula (T-31)

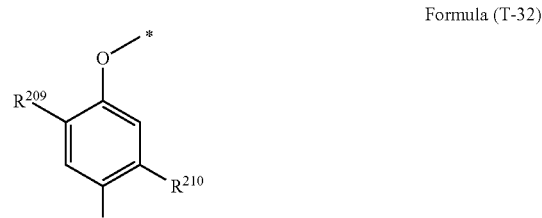

Formula (T-32)

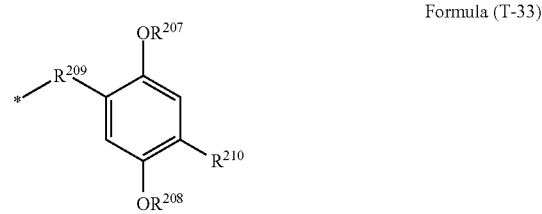

Formula (T-33)

In Formula (T-4), the aryl group and the heterocyclic group represented by $R^{212}$, and the aryl group or the heterocyclic group which is formed by $R^{212}$ linking to $X^{202}$ may have a substituent.

In a case where each group has a substituent, the substituent may be selected from, for example, the substituent group A.

It is preferable that $R^{212}$ represents an aryl group. Examples of the aryl group represented by $R^{212}$ include a phenyl group and a naphthyl group. Among these, a phenyl group is preferable.

It is also preferable that $R^{212}$ is linked to $X^{202}$ to form a heterocyclic group. Examples of the formed heterocycle include a benzotriazole ring, a triazole ring, a triazine ring, and a pyrimidine ring.

The substituent of $R^{213}$ may be selected from, for example, the substituent group A. $p^{105}$ represents 0 to 4 and preferably 0 to 2.

It is preferable that Formula (T-4) is represented by Formula (T-41), (T-42), or (T-43). A hydrogen atom represented by *1 is not removed and bonded to $L^{121}$, $L^{122}$, or $L^{123}$.

Formula (T-41)

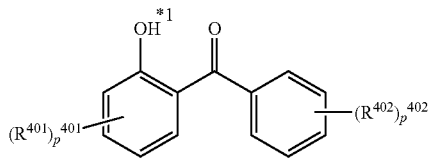

Formula (T-42)

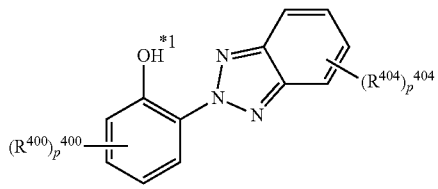

Formula (T-43)

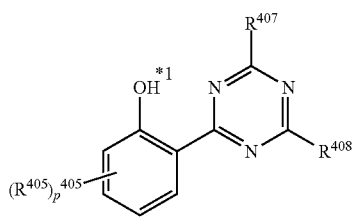

$R^{401}$, $R^{402}$, $R^{403}$, $R^{404}$, and $R^{405}$ each independently represent a substituent. $R^{406}$ and $R^{407}$ each independently represent an aryl group or a heterocyclic group. $p^{401}$, $p^{403}$, $p^{404}$, and $p^{405}$ each independently represent 0 to 4, and $p^{402}$ represents 0 to 5. In a case where $p^{401}$, $p^{402}$, $p^{403}$, $p^{404}$, and $p^{405}$ each independently represent a number of 2 or more, plural $R^{401}$'s, $R^{402}$'s, $R^{403}$'s, $R^{404}$'s and $R^{405}$'s may be the same as or different from each other.

$R^{401}$, $R^{402}$, $R^{403}$, $R^{404}$, and $R^{405}$ each independently represent a substituent. The substituent may be selected from, for example, the substituent group A.

$R^{406}$ and $R^{407}$ each independently represent an aryl group or a heterocyclic group. It is preferable that $R^{406}$ and $R^{407}$ represent a phenyl group.

$p^{401}$, $p^{403}$, $p^{404}$, and $p^{405}$ each independently represent preferably 0 to 2. It is preferable that $p^{402}$ represents 0 to 2.

Preferable forms where the compound represented by Formula (T-4) is linked are as follows. In the preferable forms, the compound is bonded to $L^{121}$, $L^{122}$, or $L^{123}$ through *.

Formula (T-411)

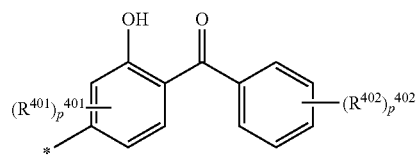

Formula (T-412)

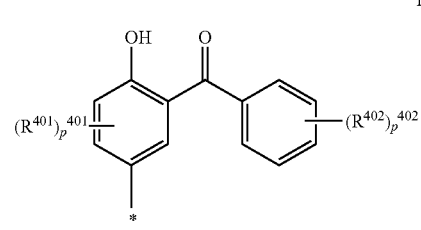

Formula (T-421)

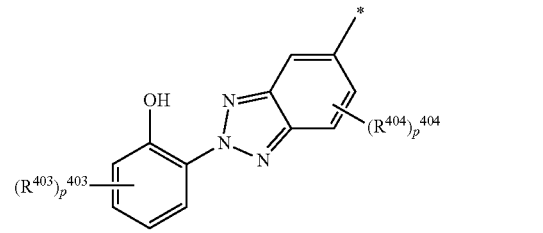

Formula (T-422)

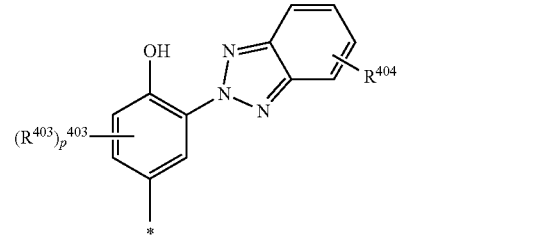

Formula (T-431)

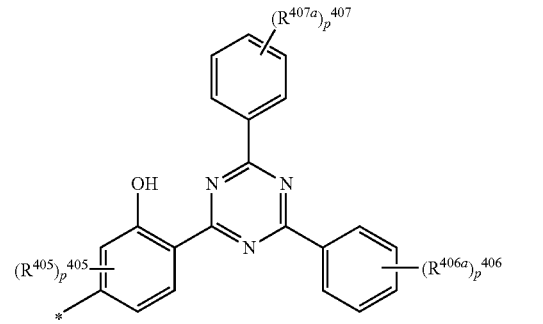

$R^{406a}$ and $R^{407a}$ each independently represent a substituent. $R^{406a}$ and $R^{407a}$ have the same preferable range as that of $R^{405}$. $p^{406}$ and $p^{407}$ each independently represent 0 to 5. In a case where $p^{406}$ and $p^{407}$ each independently represent a number of 2 or more, plural $R^{406a}$'s and $R^{407a}$'s may be the same as or different from each other.

In Formula (T-5), the aryl group or the heterocyclic group represented by $Ar^{201}$ may have a substituent. In a case where each group has a substituent, the substituent may be selected from, for example, the substituent group A.

It is preferable that $Ar^{201}$ represents an aryl group. Examples of the aryl group represented by $Ar^{201}$ include a phenyl group and a naphthyl group. Among these, a phenyl group is preferable.

$p^{106}$ represents 1 to 3 and preferably 1 to 2.

Preferable forms where the compound represented by Formula (T-5) is linked are as follows. In the preferable forms, the compound is bonded to $L^{121}$, $L^{122}$, or $L^{123}$ through *.

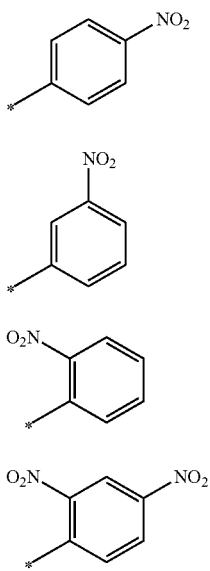

Formula (T-51)

Formula (T-52)

Formula (T-53)

Formula (T-54)

In Formula (T-6), the alkyl group and the alkoxy group represented by $R^{214}$ and the alkyl group represented by $R^{215}$ may have a substituent. In a case where each group has a substituent, the substituent may be selected from, for example, the substituent group A.

It is preferable that $R^{214}$ represents a hydrogen atom or an alkyl group. As the alkyl group represented by $R^{214}$, an alkyl group having 1 to 6 carbon atoms is preferable, an alkyl group having 1 to 4 carbon atoms is more preferable, and a methyl group, an ethyl group, a propyl group, or a butyl group is still more preferable.

As the alkyl group represented by $R^{215}$ and $R^{216}$, a branched alkyl group is preferable, and a secondary alkyl group having 1 to 10 carbon atoms or a tertiary alkyl group having 1 to 10 carbon atoms is more preferable. Specific examples of the secondary alkyl group include an isopropyl group, an s-butyl group, and a cyclohexyl group. Specific examples of the tertiary alkyl group include a tert-butyl group and a tert-amyl group. $R^{215}$ and $R^{216}$ may be bonded to each other to form a ring. In a case where the ring is formed, the number of carbon atoms in the formed ring is preferably 2 to 20 and more preferably 2 to 10. Examples of the formed ring include an aziridine ring, a piperidine ring, and a pyrrolidine ring. In particular, it is preferable that $R^{215}$ and $R^{216}$ represent a tertiary alkyl group and are bonded to each other to form a piperidine ring.

It is preferable that Formula (T-6) is represented by Formula (T-61).

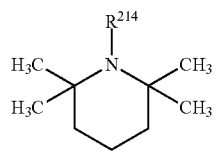

Formula (T-61)

A preferable form where the compound represented by Formula (T-6) is linked is as follows. In the preferable forms, the compound is bonded to $L^{121}$, $L^{122}$, or $L^{123}$ through *.

Formula (T-611)

In Formula (T-7), the substituent of $R^{217}$ may be selected from, for example, the substituent group A.

$p^{107}$ represents 0 to 4 and preferably 0 to 2. $p^{108}$ represents 2 to 3.

In Formula (T-8), the alkyl group, the aryl group, and the heterocyclic group represented by $R^{218}$ and $R^{219}$ may have a substituent.

It is preferable that $R^{218}$ and $R^{219}$ represent a hydrogen atom, an alkyl group, or an aryl group. As the alkyl group represented by $R^{218}$ and $R^{219}$, an alkyl group having 1 to 6 carbon atoms is preferable, an alkyl group having 1 to 4 carbon atoms is more preferable, and a methyl group, an ethyl group, a propyl group, or a butyl group is still more preferable. Specific examples of the aryl group represented by $R^{218}$ and $R^{219}$ include a phenyl group and a naphthyl group. Among these, a phenyl group is preferable.

$R^{218}$ and $R^{219}$ may be bonded to each other to form a ring, and this ring may include a heteroatom such as a nitrogen atom.

Preferable forms where the compound represented by Formula (T-8) is linked are as follows. In the preferable forms, the compound is bonded to $L^{121}$, $L^{122}$, or $L^{123}$ through *.

*—S—$R^{219}$  Formula (T-81)

*—$R^{218}$—S—$R^{219}$  Formula (T-82)

It is preferable that at least one of $T^{121}$, $T^{122}$, or $T^{123}$ represents a group represented by Formula (T-1), (T-3), (T-4), (T-5), or (T-6).

It is preferable that the compound represented by any one of Formulae (1) to (3) has at least one sulfo group.

It is preferable that a counter anion of a cation in any one of Formulae (1) to (3) is a sulfo group ($—SO_3^-$) present in a molecule.

Hereinafter, specific examples of the compound represented by any one of Formulae (1) to (3) will be shown. However, the present invention is not limited to these specific examples. Me represents a methyl group, Et represents an ethyl group, iPr represents an isopropyl group, $^t$Bu represents a t-butyl group, Ph represents a phenyl group, and Ac represents an acetyl group.

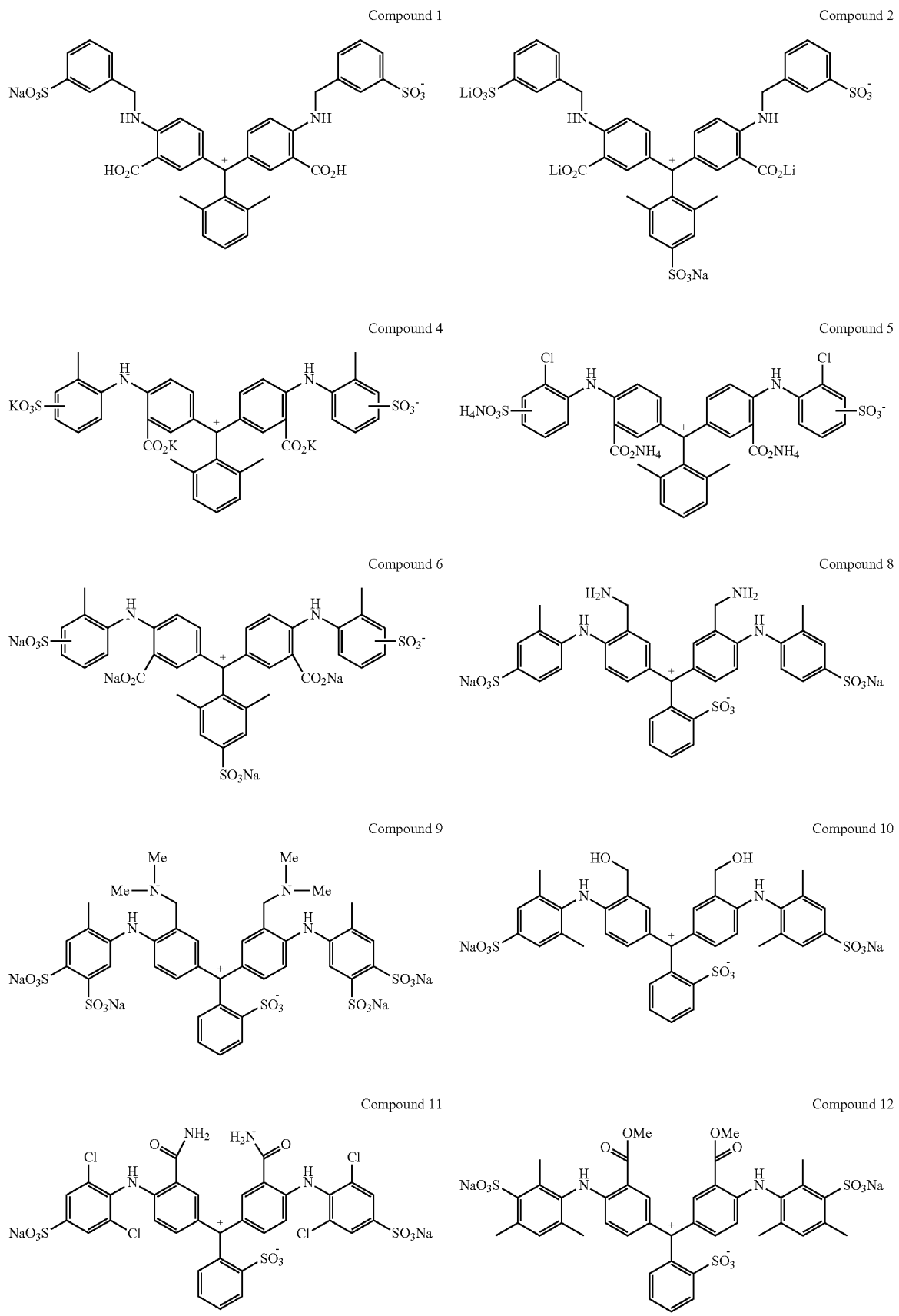

-continued
Compound 13
Compound 14
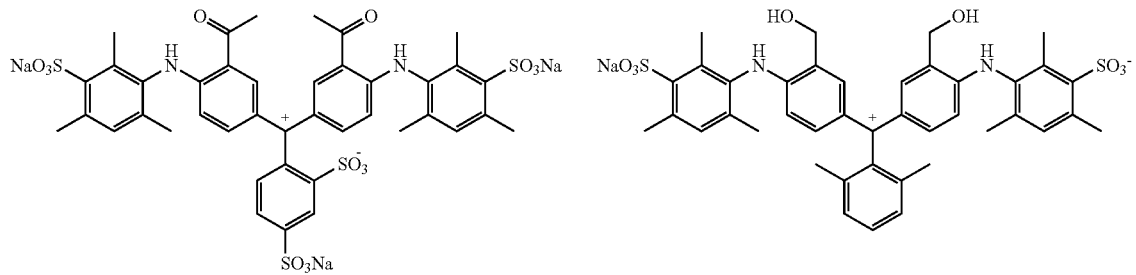
Compound 15
Compound 16
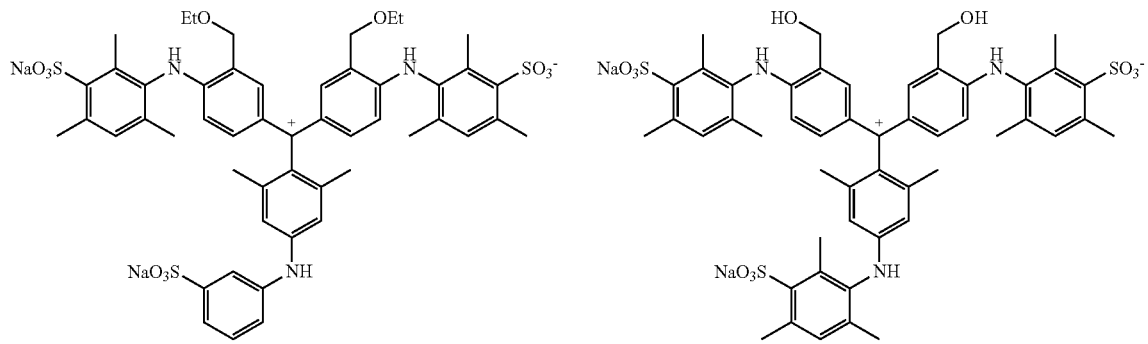
Compound 17
Compound 18
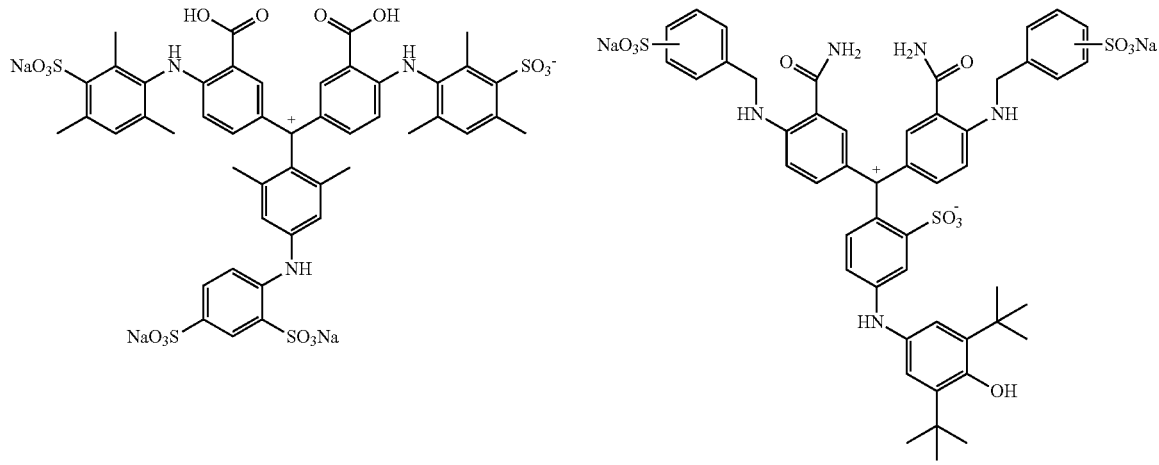
Compound 19
Compound 20
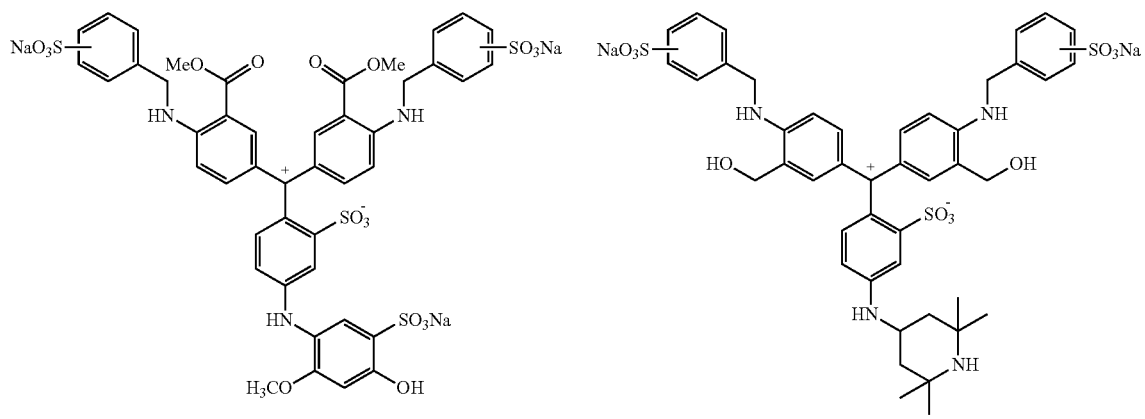

Compound 21
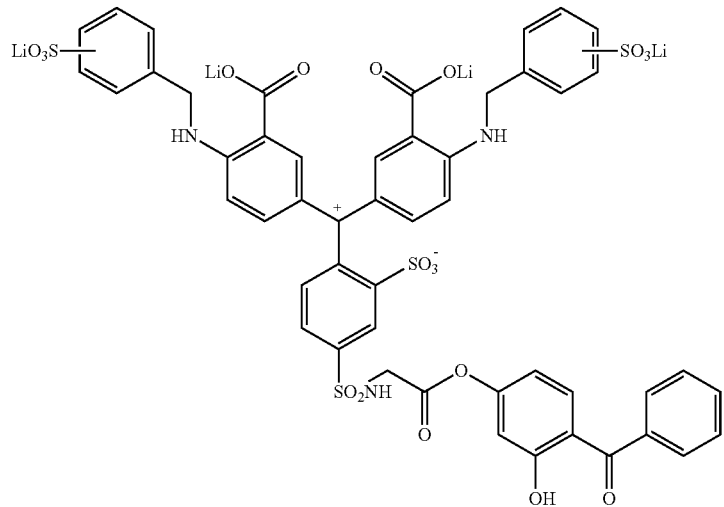
Compound 22
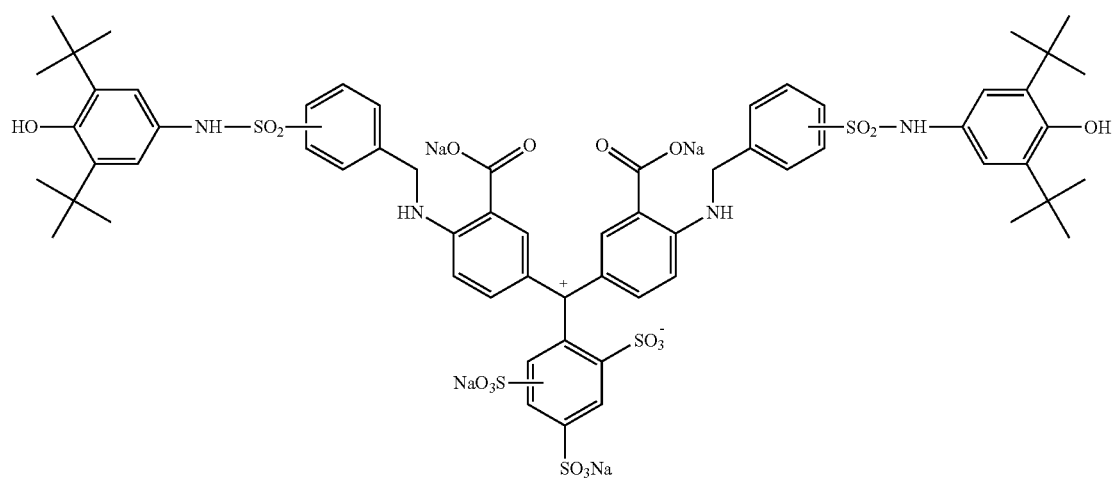
Compound 23
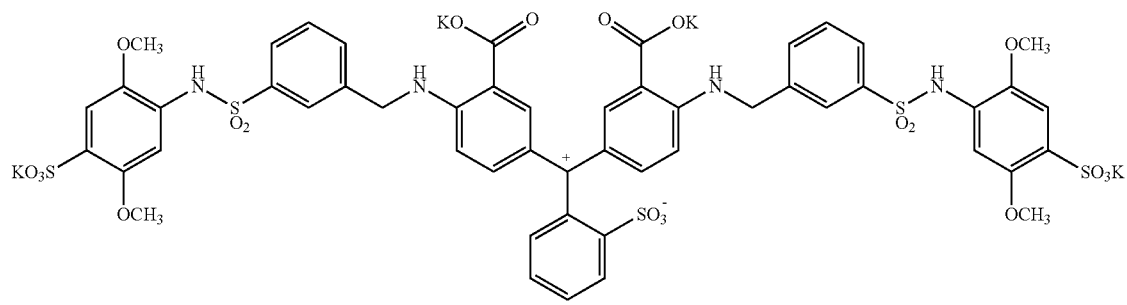

Compound 24
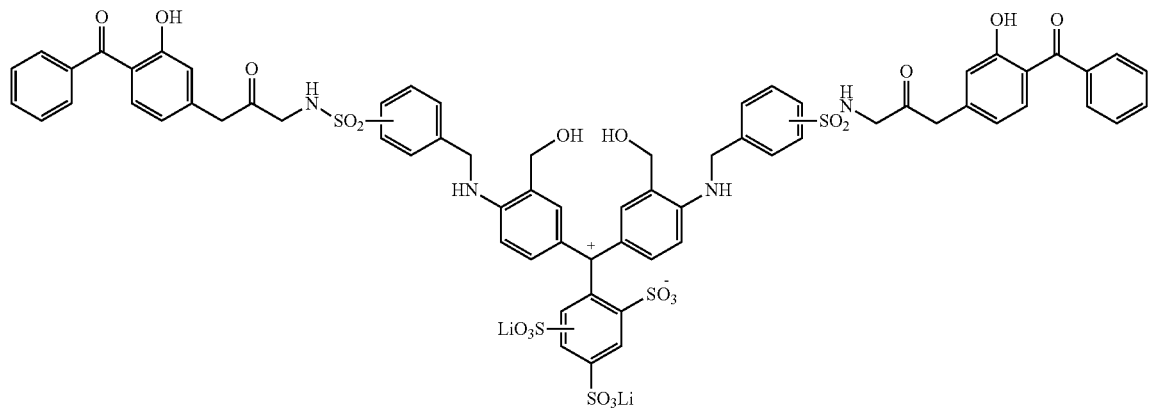
Compound 25
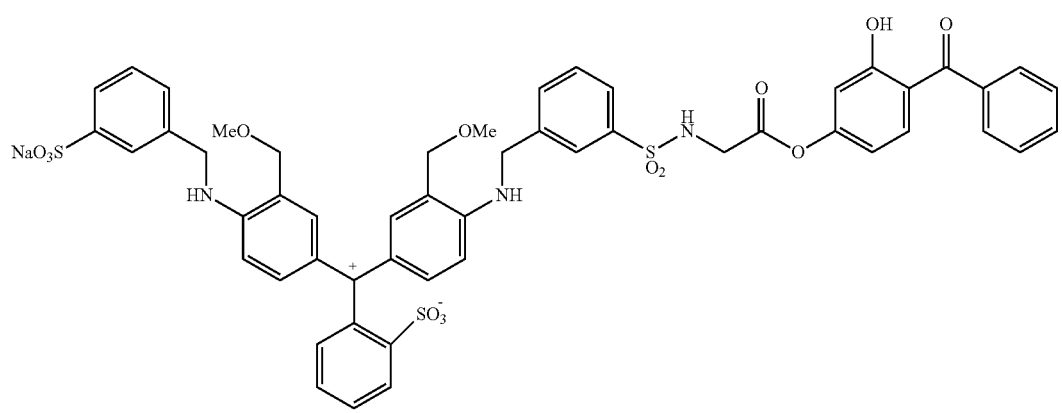
Compound 26
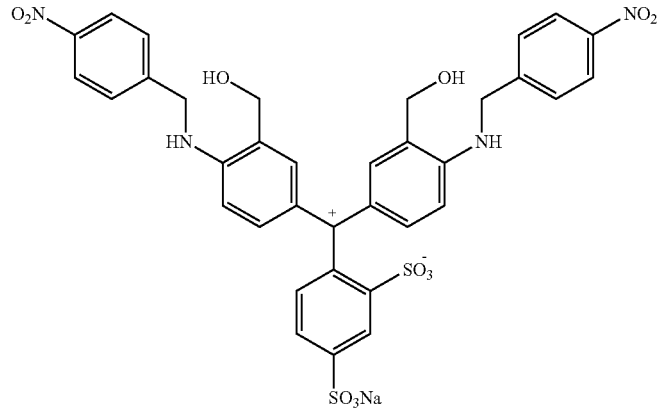
Compound 27
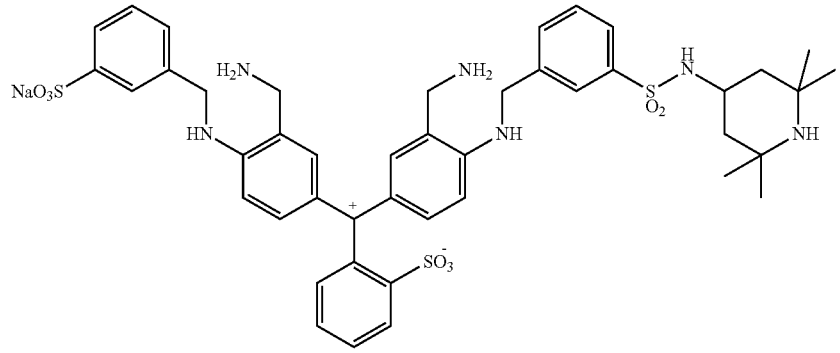

-continued
Compound 28
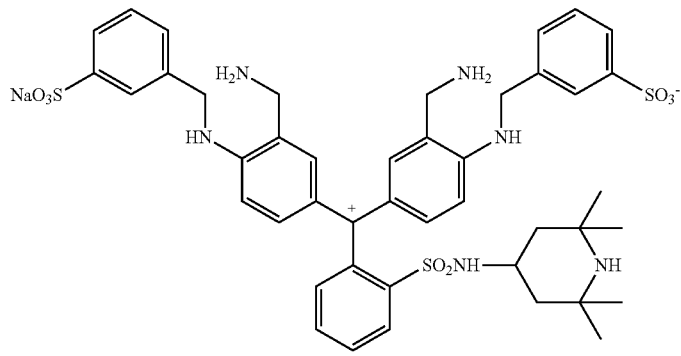
Compound 29
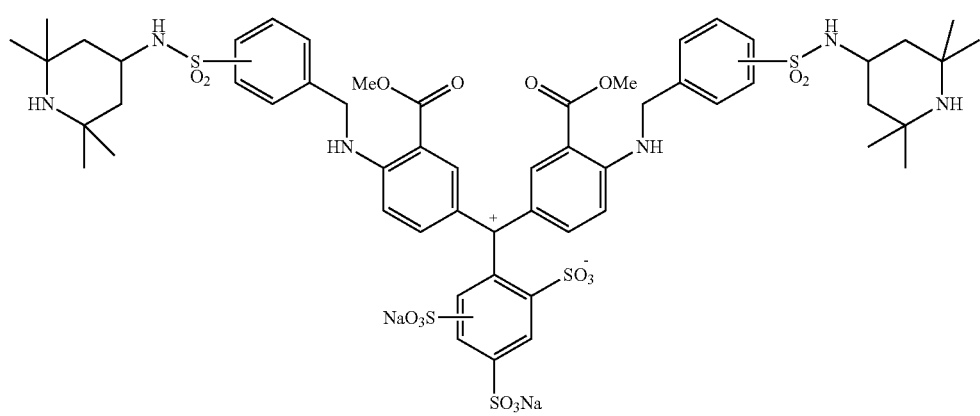
Compound 30
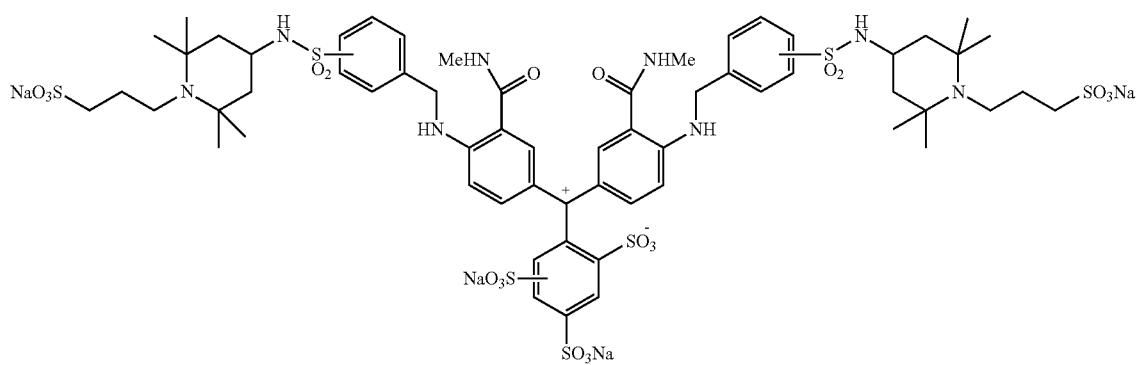
Compound 31
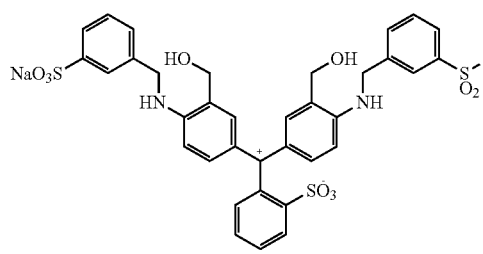
Compound 32
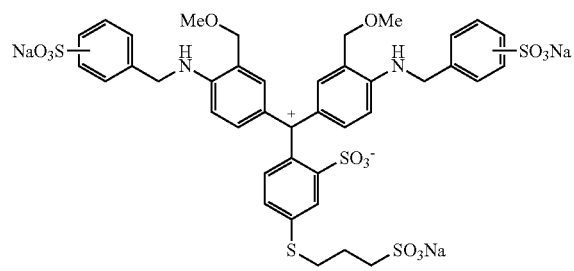

Compound 33
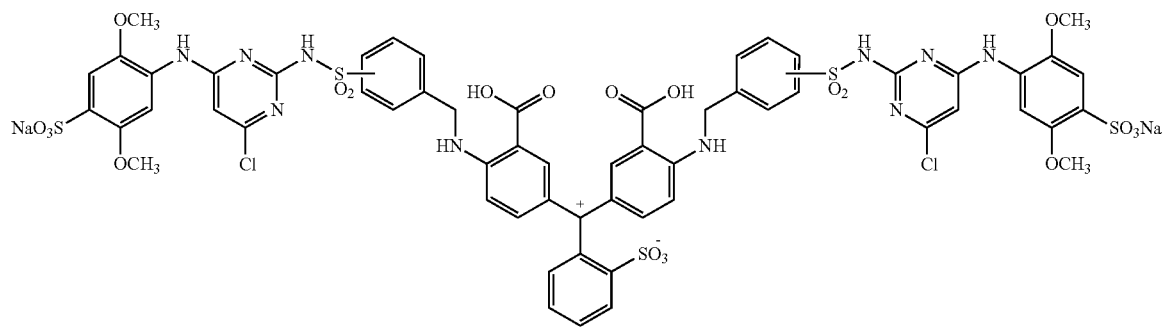
Compound 34
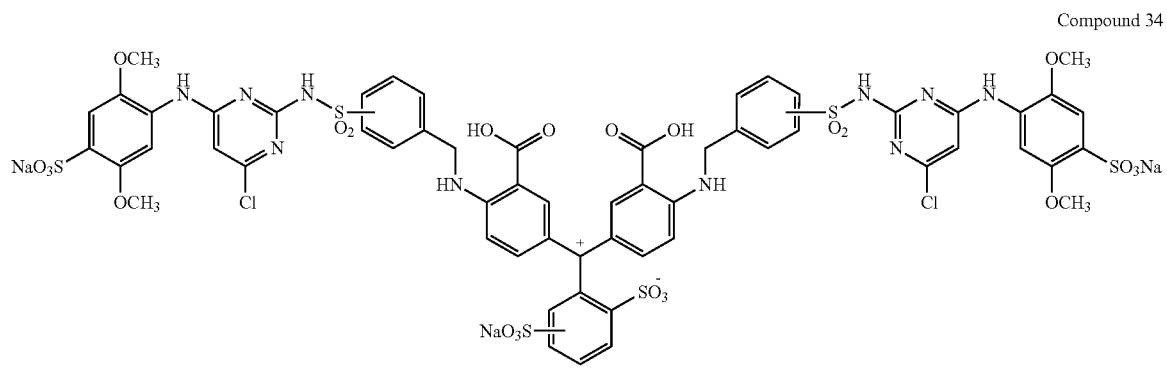
Compound 35 Compound 36
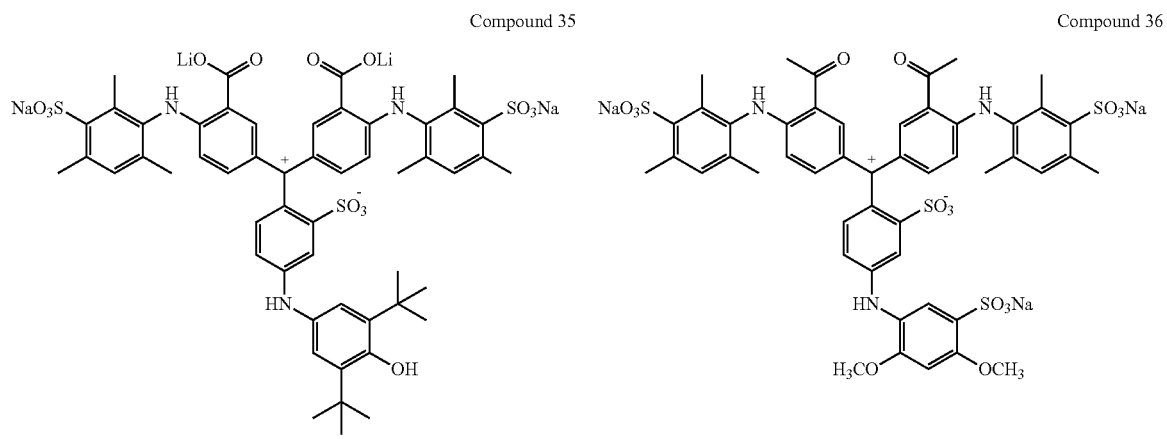
Compound 37 Compound 38
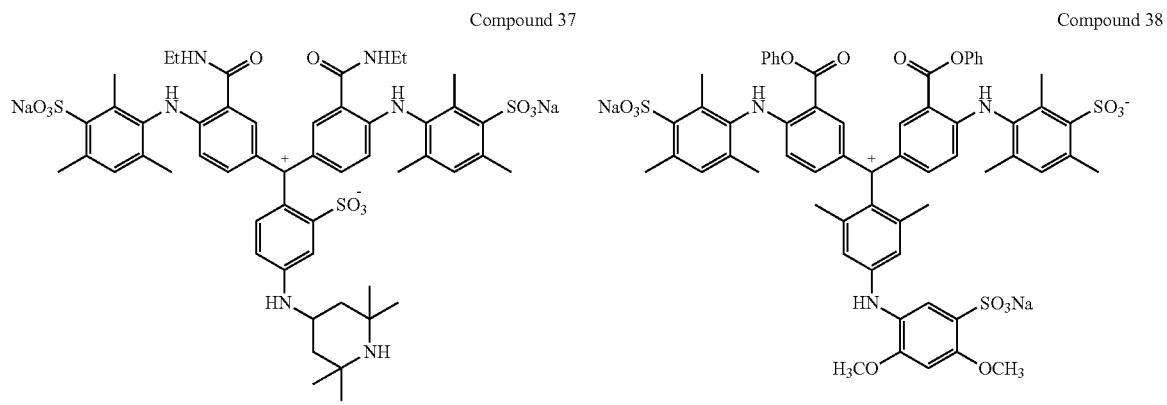

-continued
Compound 50
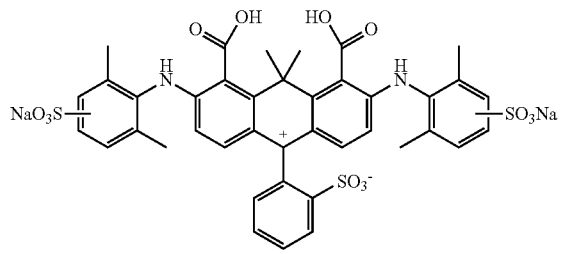
Compound 51
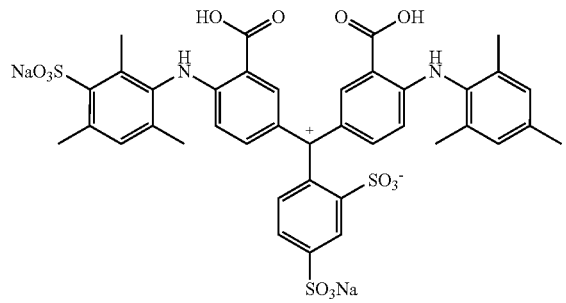
Compound 52
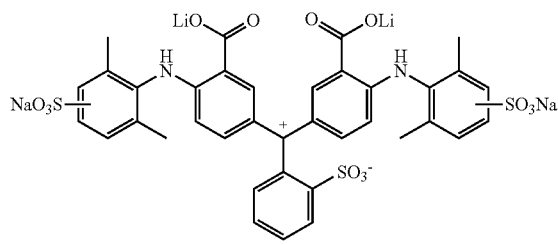
Compound 53
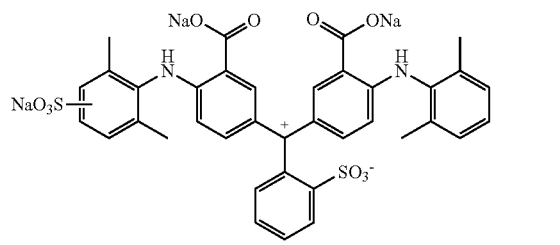
Compound 54
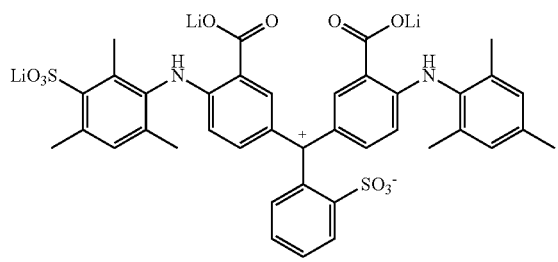
Compound 55
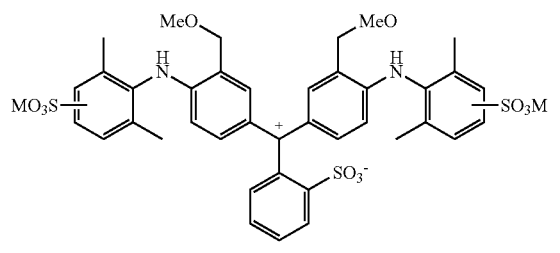
M: Na/K = 80/20
Compound 56
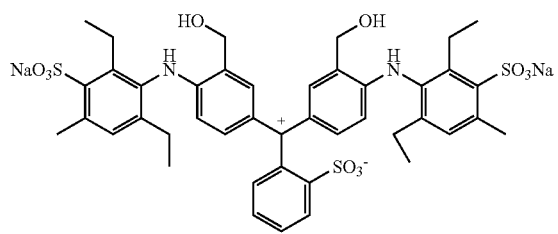
Compound 57
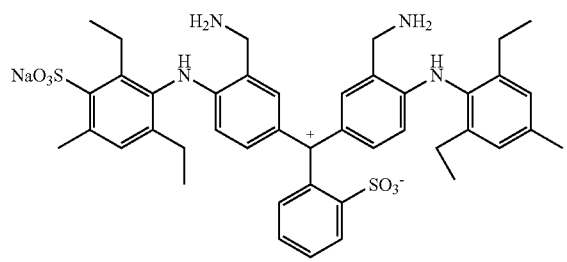
Compound 58
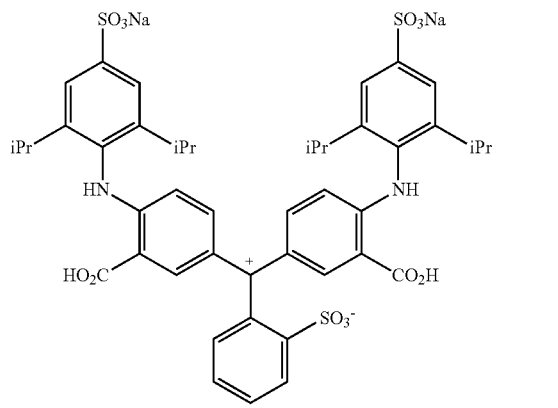
Compound 59
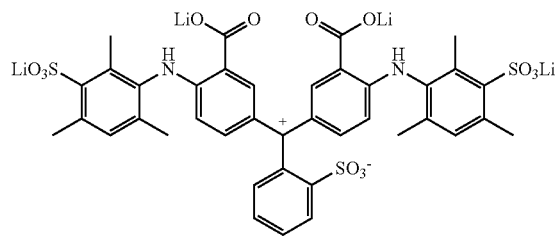

-continued
Compound 60
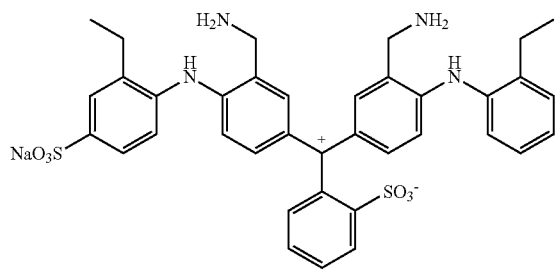
Compound 61
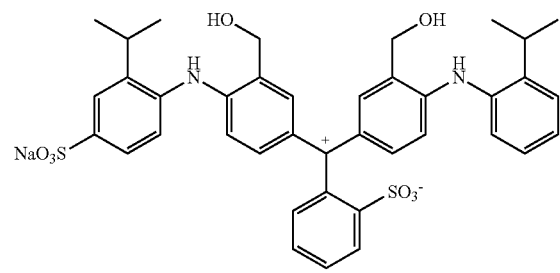
Compound 62
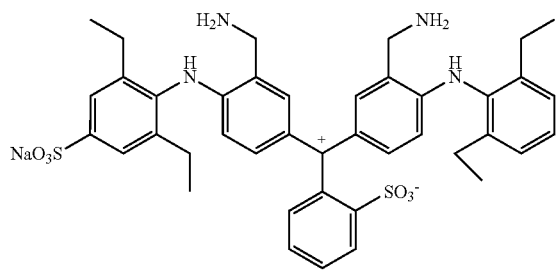
Compound 63
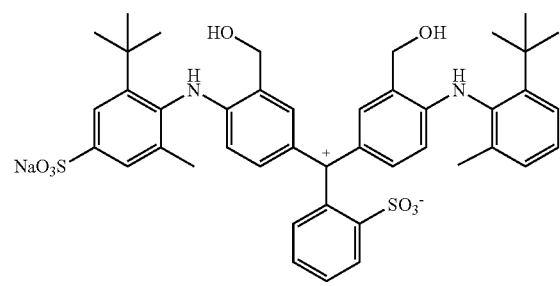
Compound 64
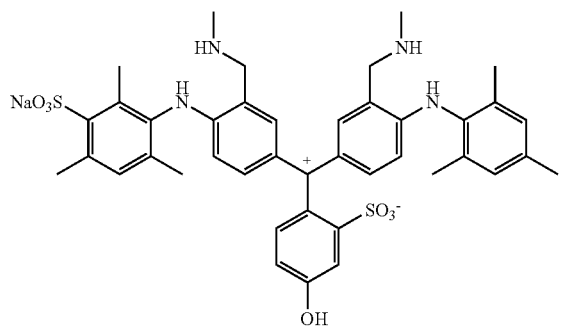
Compound 65
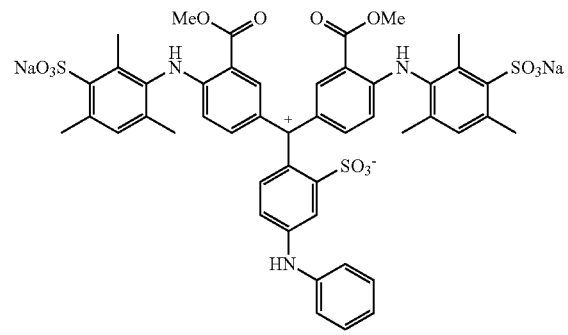
Compound 66
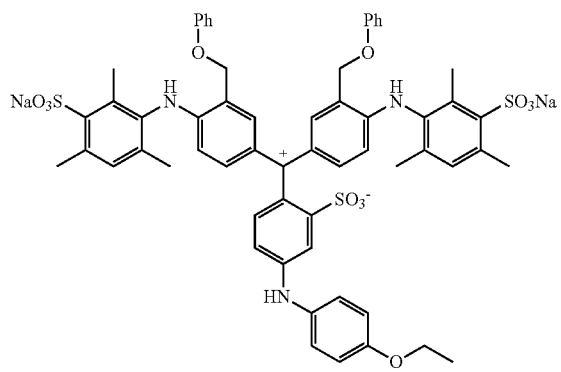
Compound 67
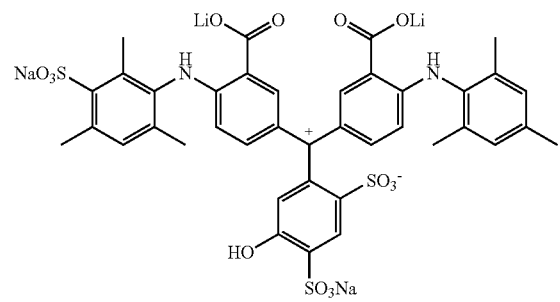

-continued
Compound 68
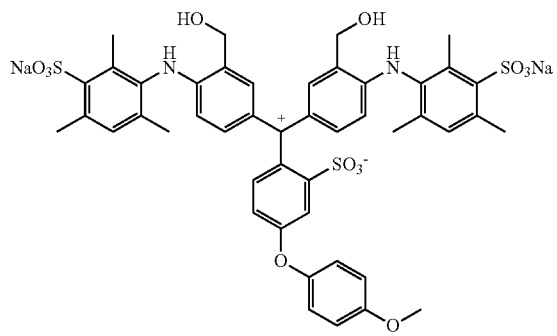
Compound 69
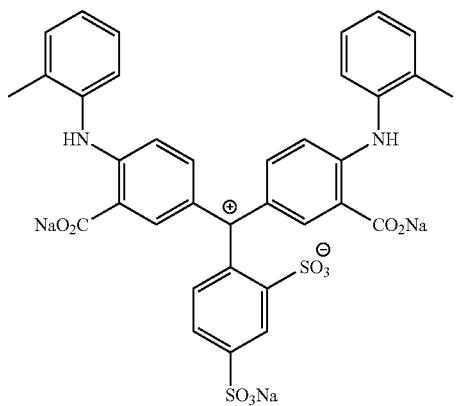
Compound 70
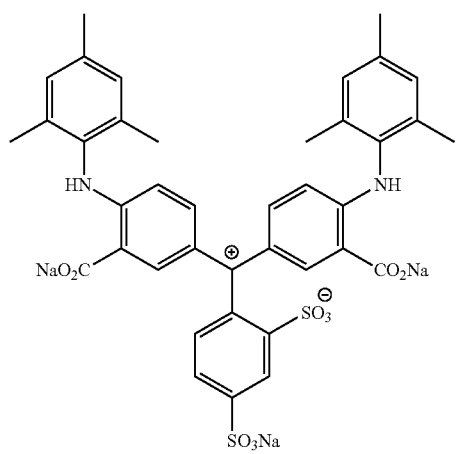
Compound 71
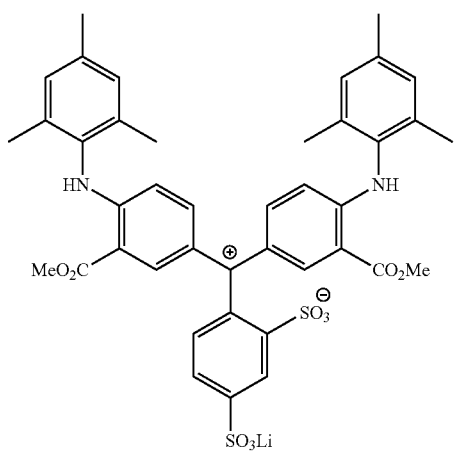
Compound 72
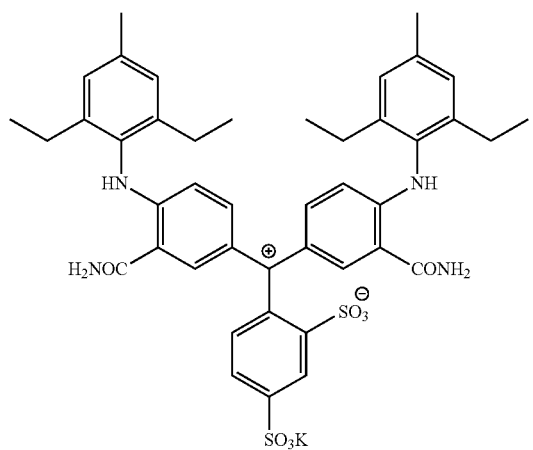
Compound 73
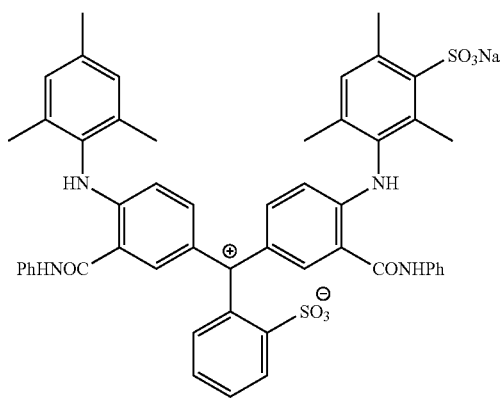

-continued
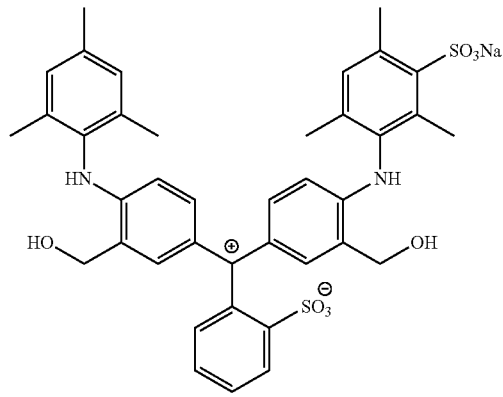
Compound 74
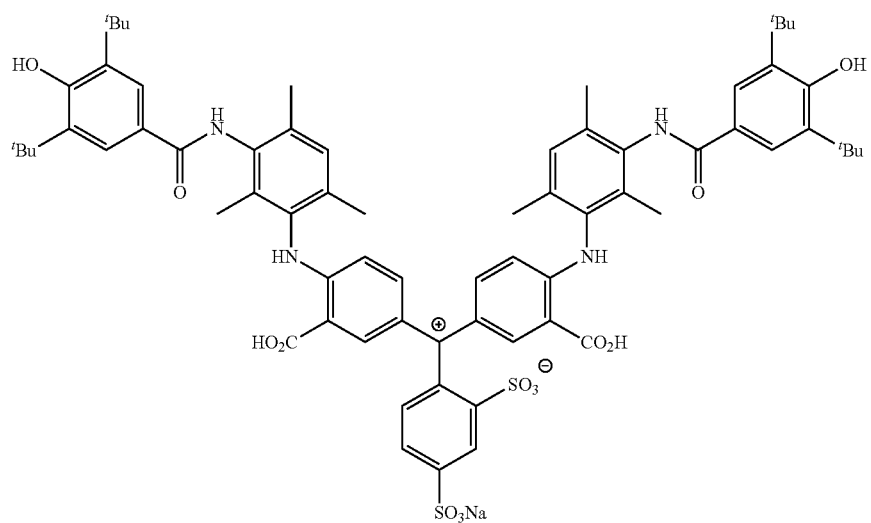
Compound 101
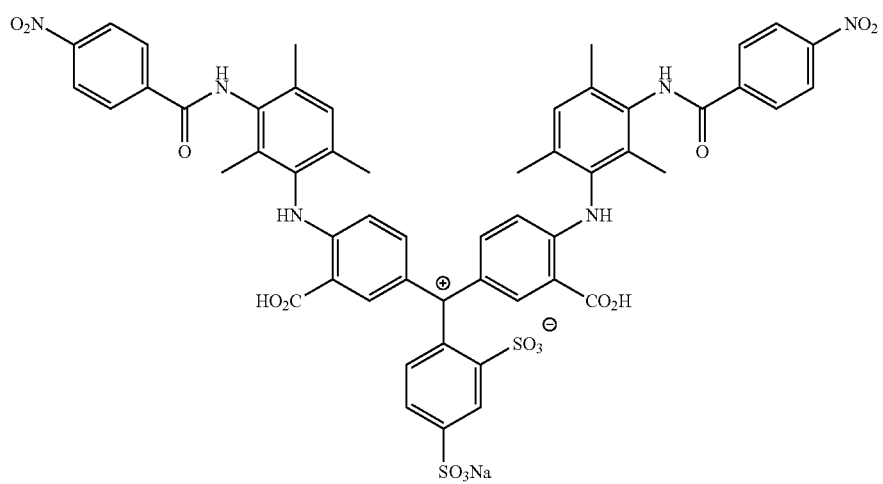
Compound 102

Compound 103
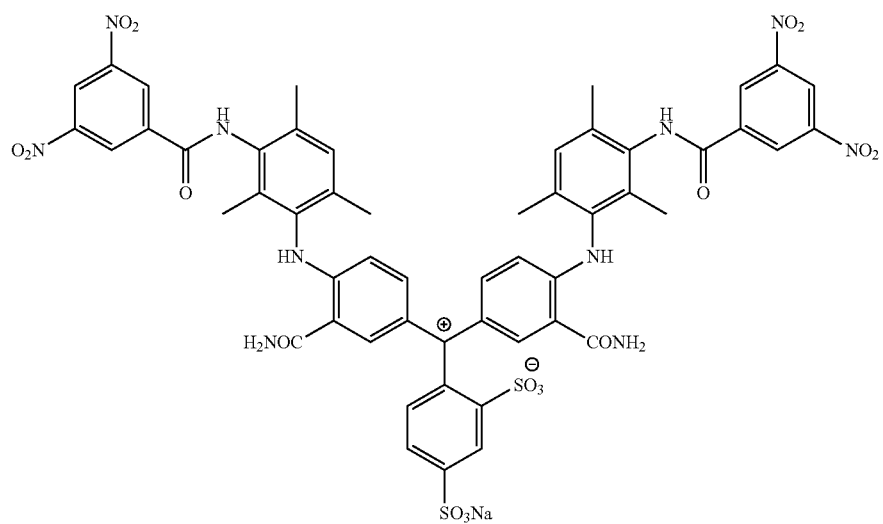
Compound 104
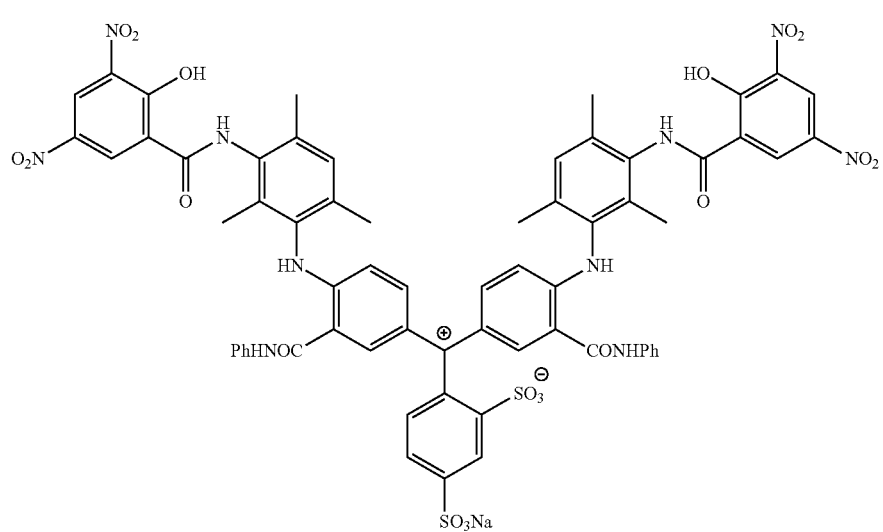
Compound 105
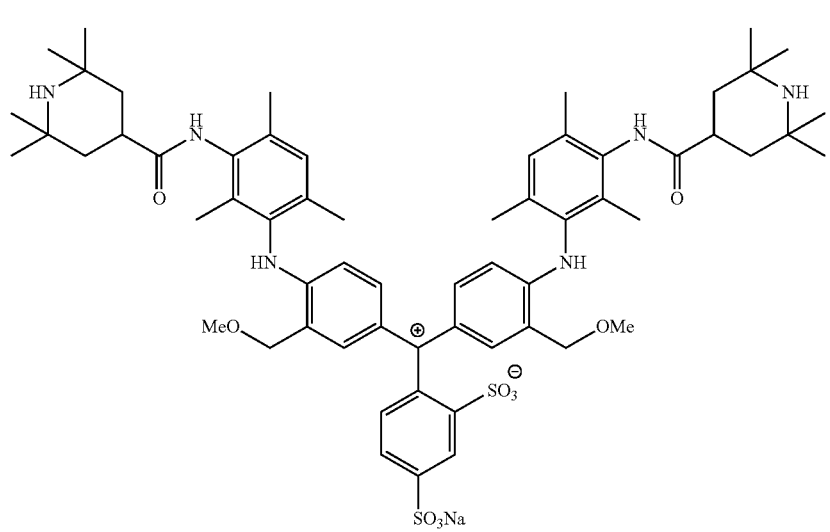

-continued
Compound 106
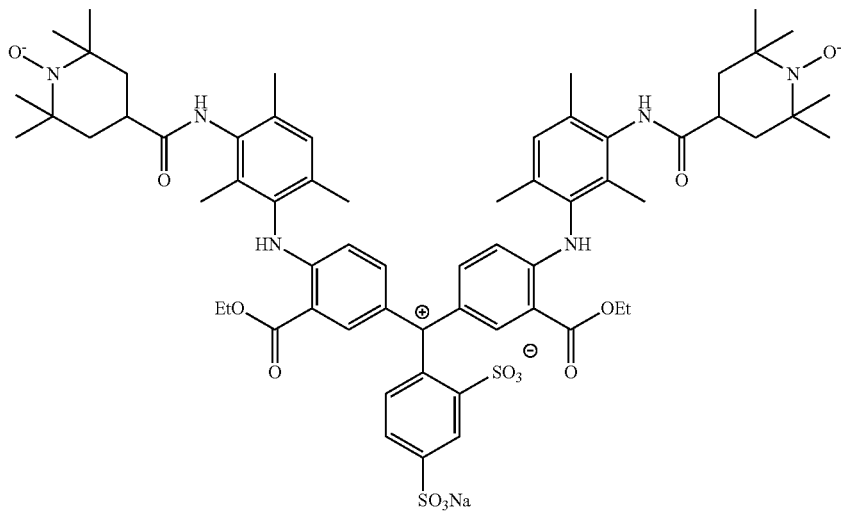
Compound 107
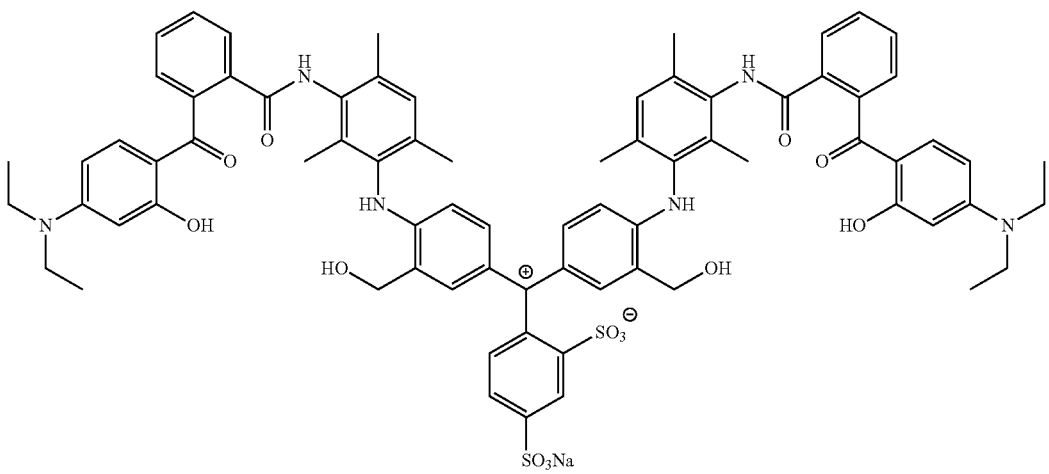
Compound 108
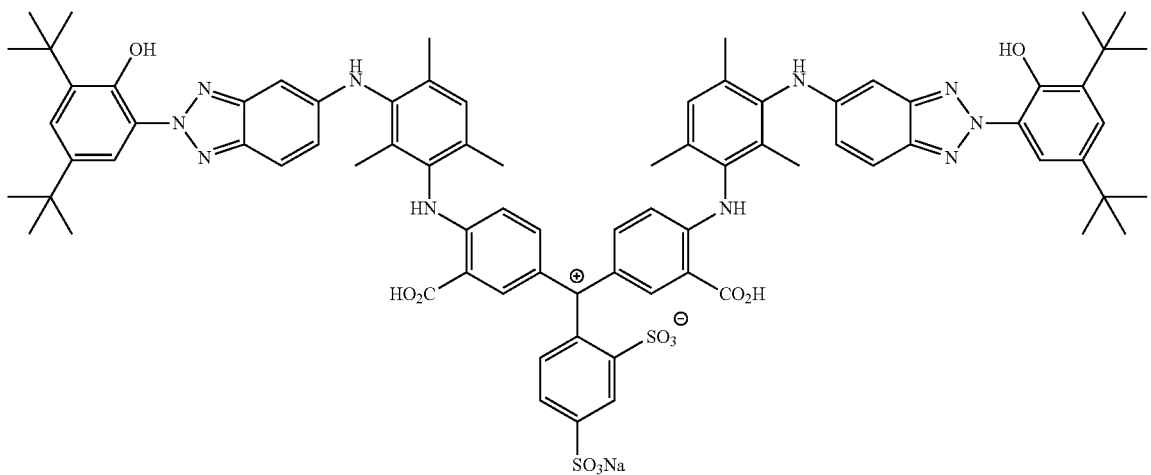

Compound 109
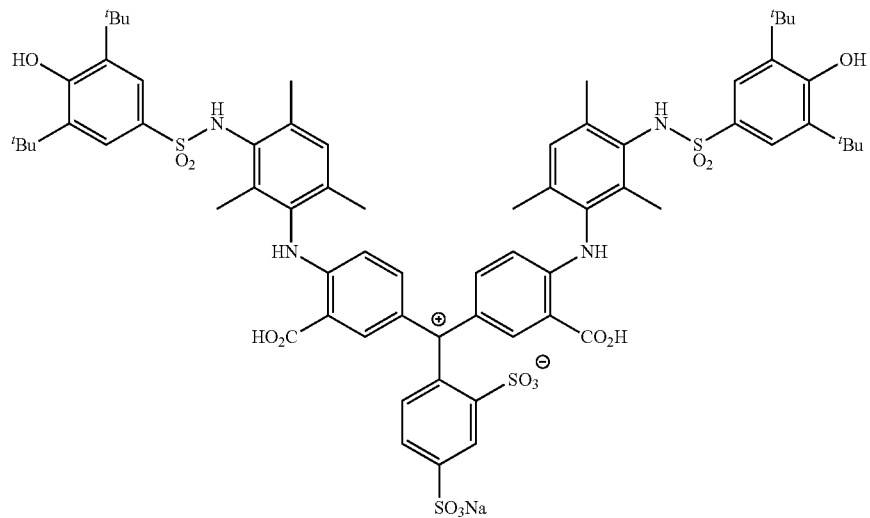
Compound 110
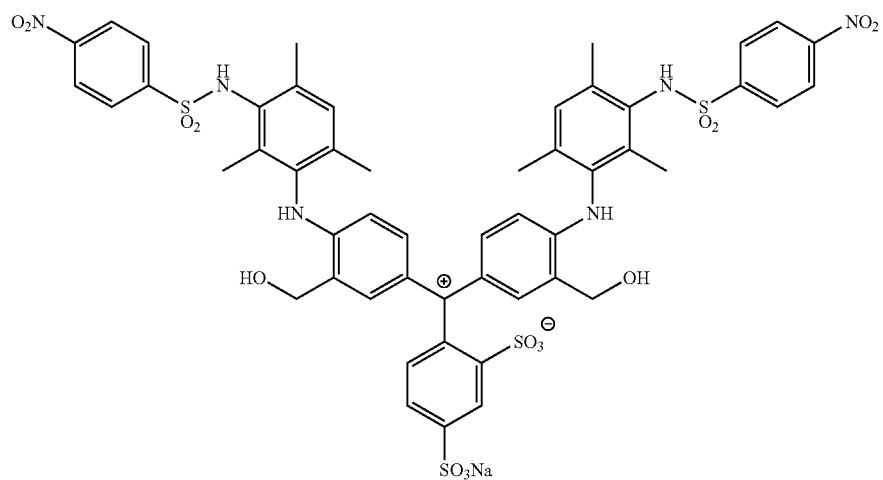
Compound 111
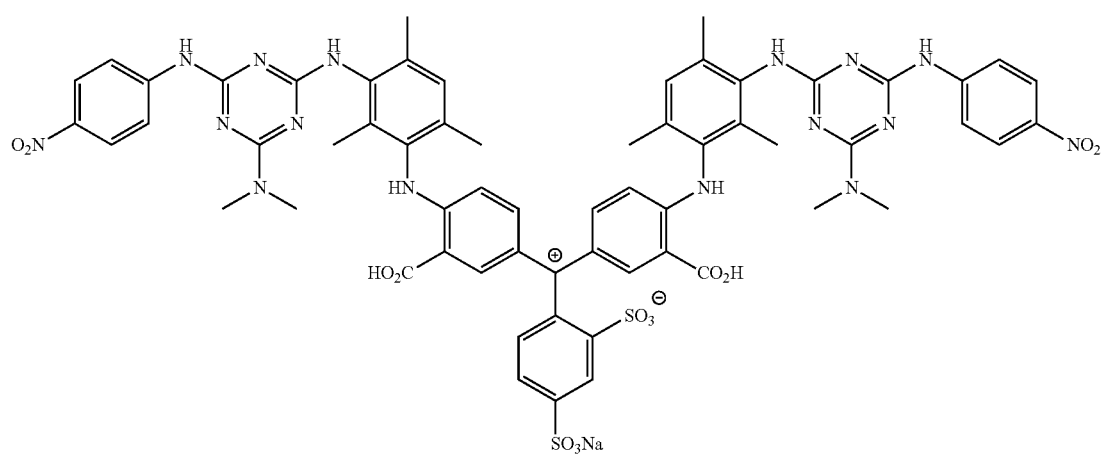

Compound 112
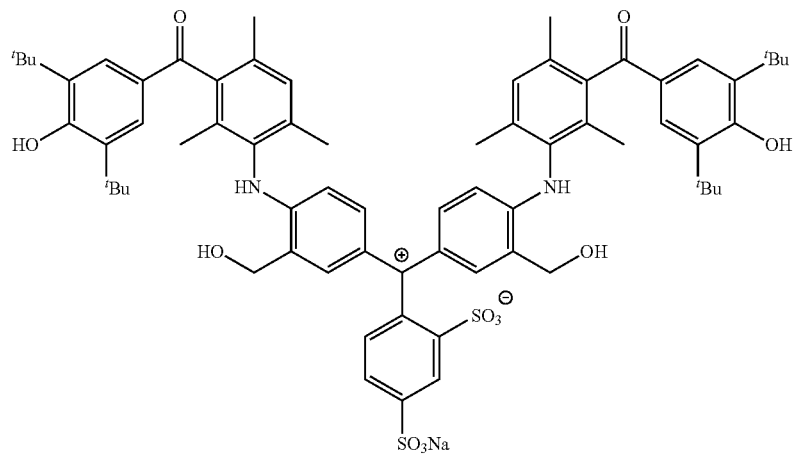
Compound 113
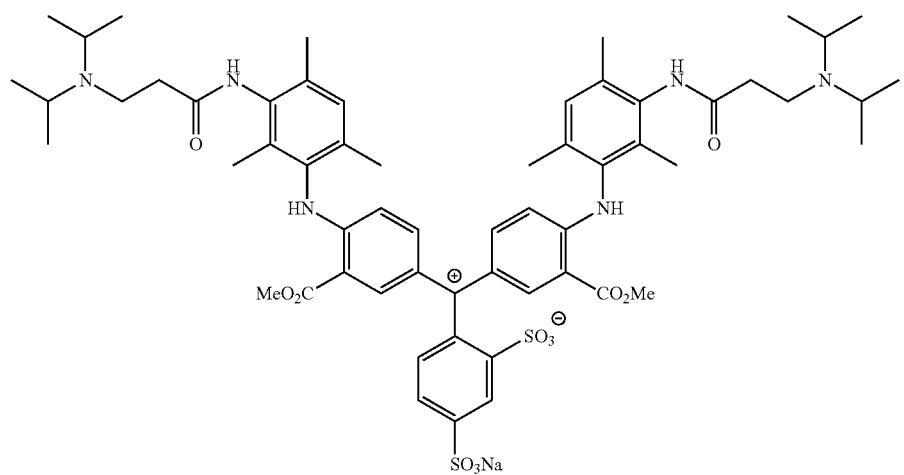
Compound 114
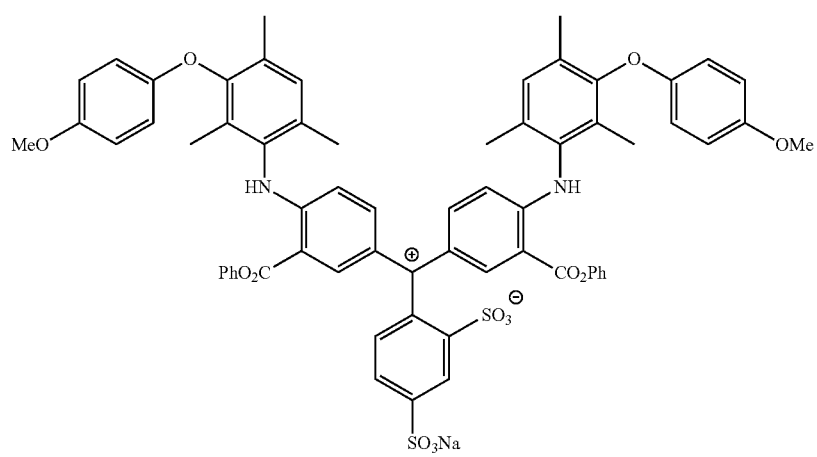

Compound 150
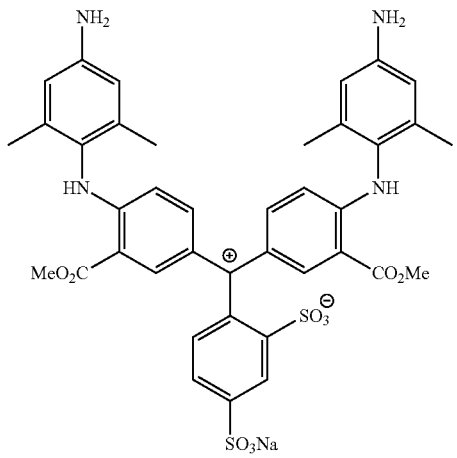
Compound 151
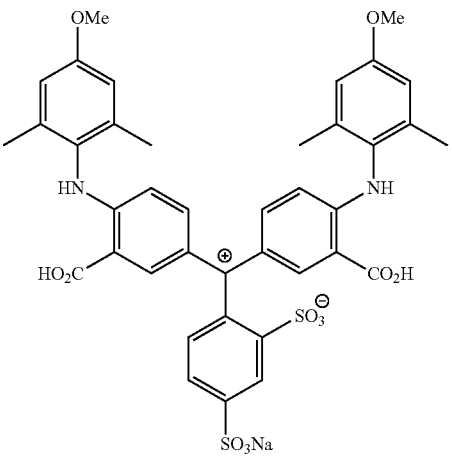
Compound 152
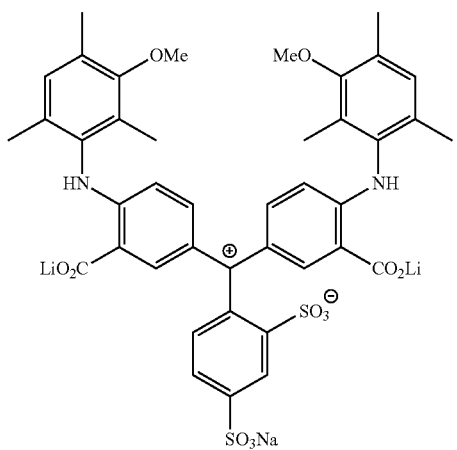
Compound 153
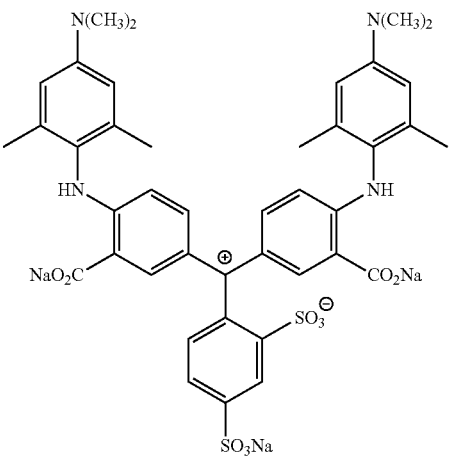
Compound 154
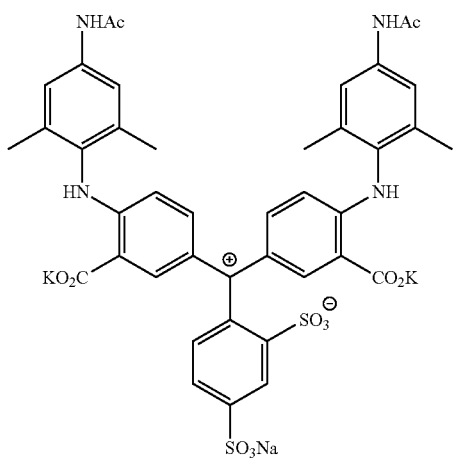
Compound 155
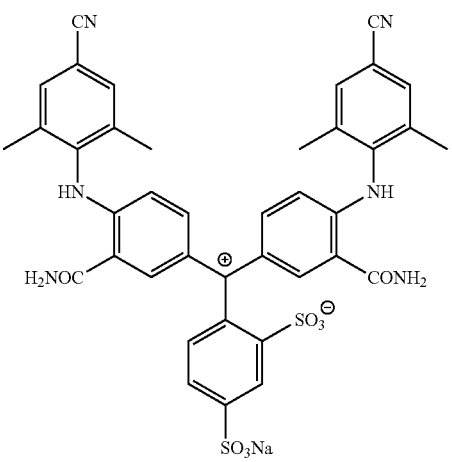

-continued
Compound 156
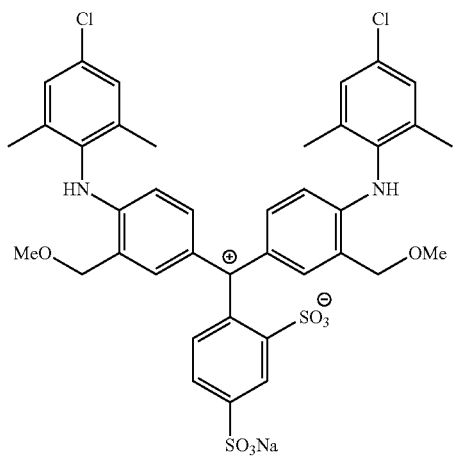
Compound 157
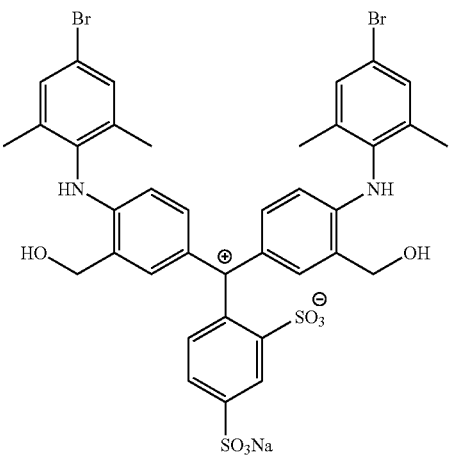
Compound 158
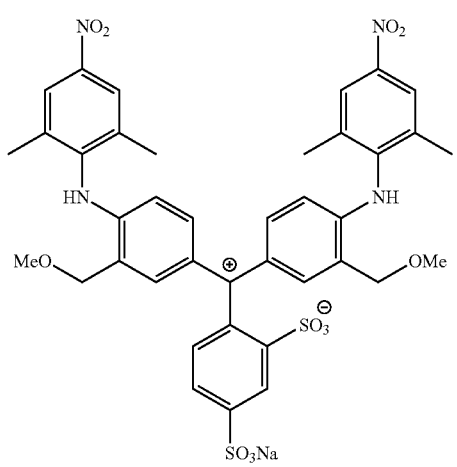
Compound 159
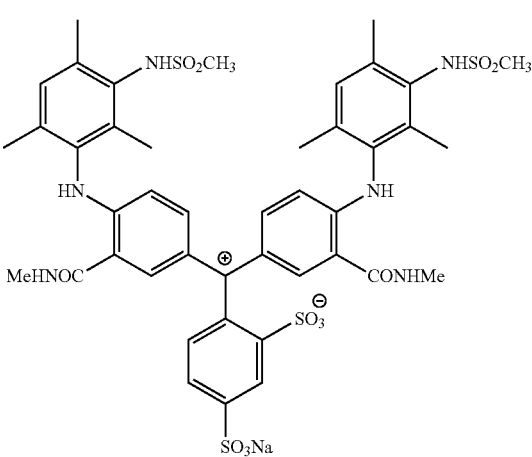
Compound 160
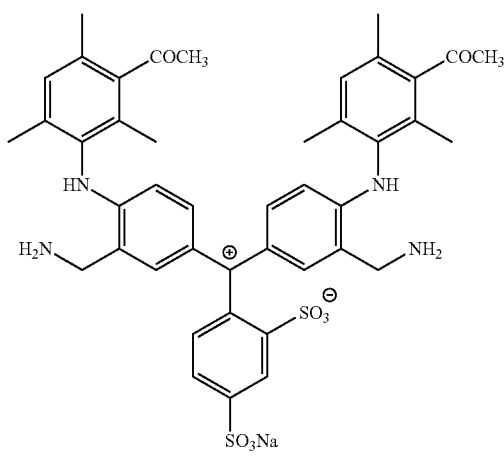
Compound 161
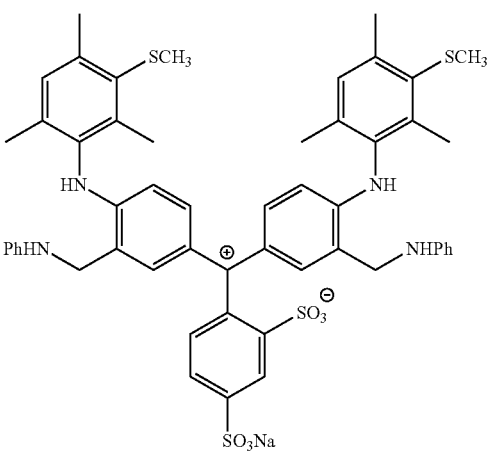

-continued
Compound 162
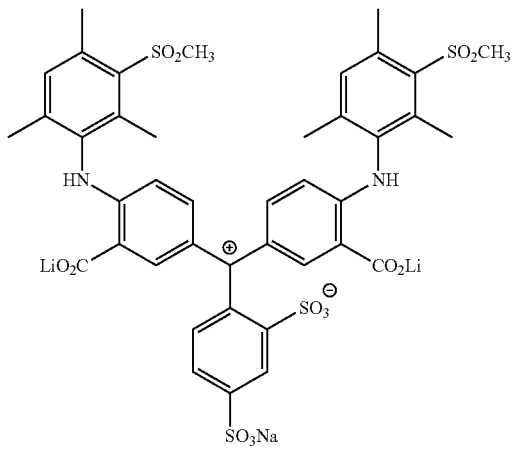
Compound 163
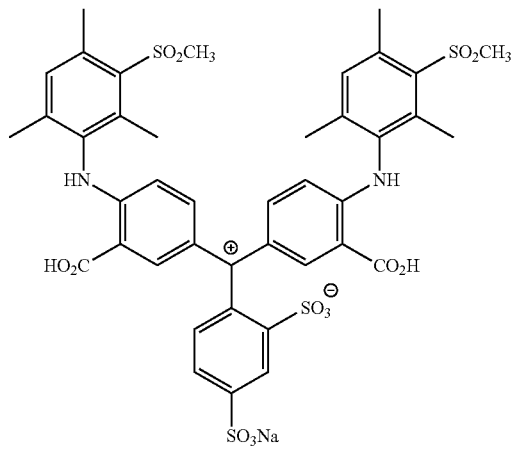
Compound 164
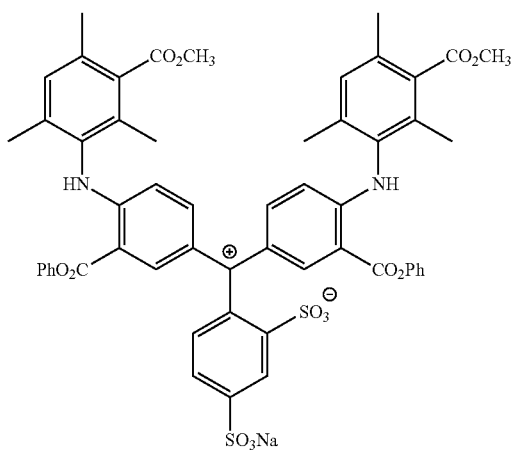
Compound 165
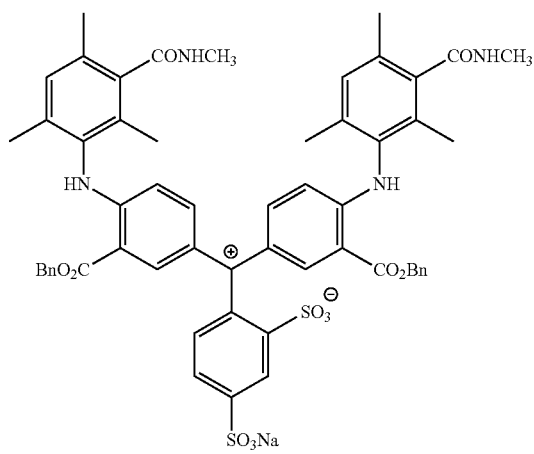
Compound 201
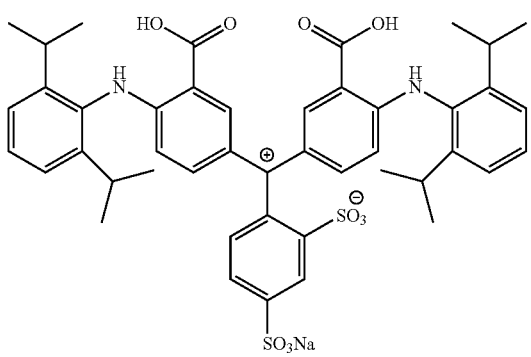
Compound 202
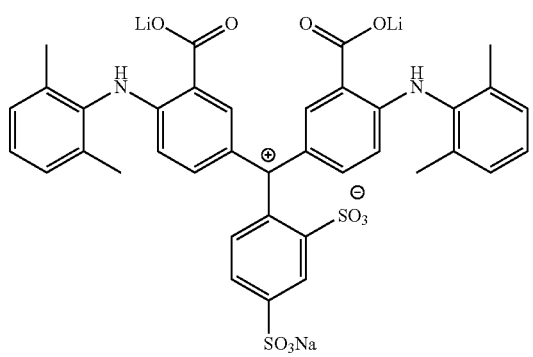
Compound 203
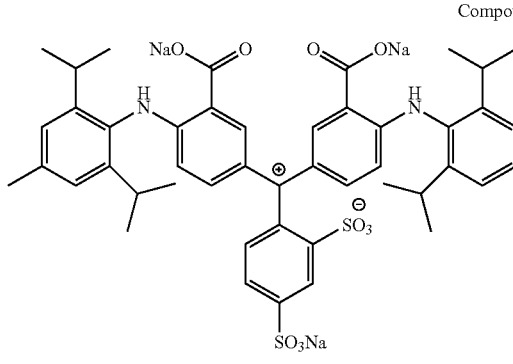
Compound 204
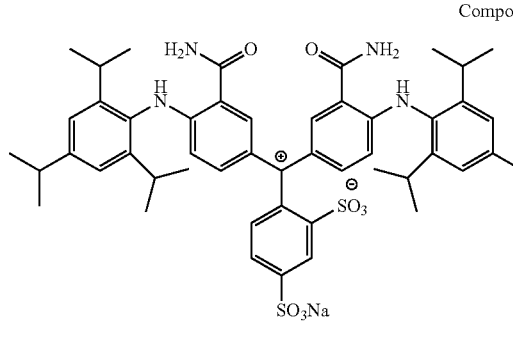

[Synthesis Method]

A method of synthesizing the compound represented by any one of Formulae (1) to (3) will be described.

The compound represented by any one of Formulae (1) to (3) can be synthesized using a well-known method of synthesizing a triarylmethane dye of the related art. For example, the compound represented by Formula (1) or (2) can be obtained by causing a condensation reaction to occur using two equivalents of an aniline derivative and one equivalent of a benzaldehyde derivative and then oxidizing the obtained condensate. The compound represented by Formula (3) may be synthesized as described above by condensing an aniline derivative into which a substituent is introduced in advance and/or a benzaldehyde derivative, or may be synthesized by synthesizing a triarylmethane compound using a well-known synthesis method and then introducing a substituent thereinto through an addition reaction or the like.

The method of manufacturing the compound represented by any one of Formulae (1) to (3) is not limited to the above-described methods because the compound represented by any one of Formulae (1) to (3) can be synthesized using a well-known manufacturing method.

Examples of a reaction scheme will be shown below.

<General Method of Synthesizing Compound Represented by Formula (1)>

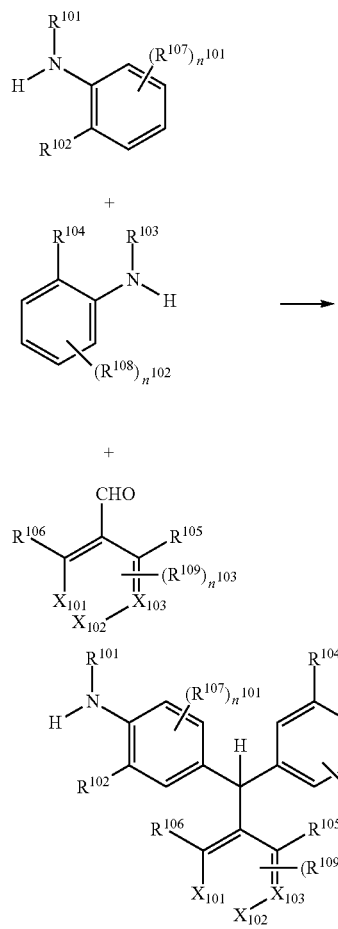

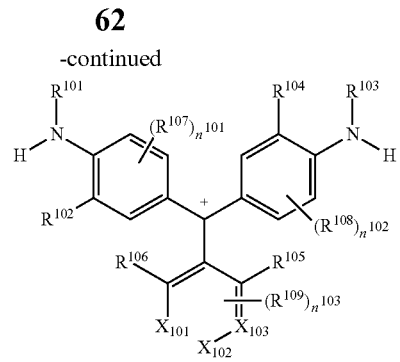

<General Method of Synthesizing Compound Represented by Formula (2)>

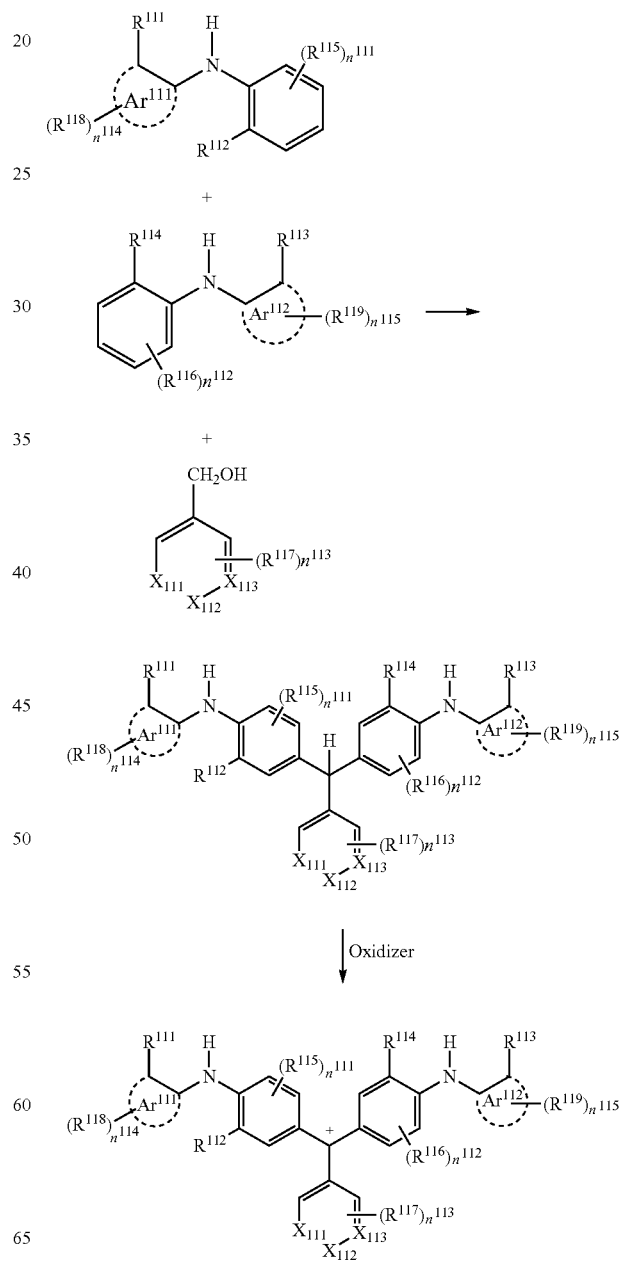

<General Method of Synthesizing Compound Represented by Formula (3)>

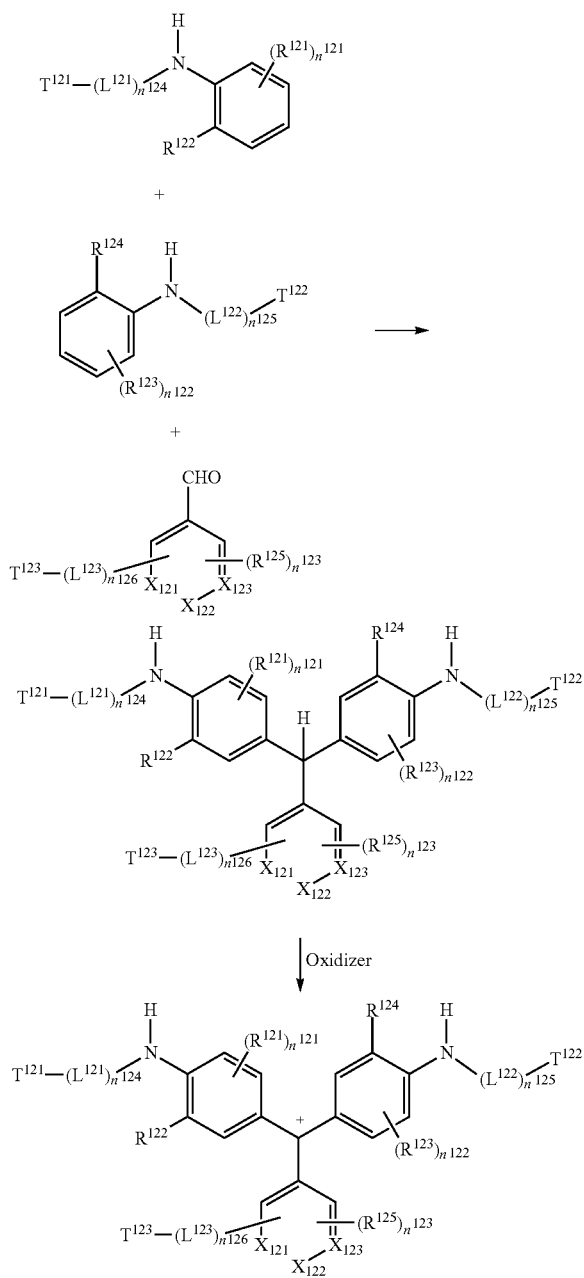

[Coloring Composition]

A coloring composition including at least one of the compounds represented by any one of Formulae (1) to (3) will be described.

The coloring composition may include one compound or a plurality of compounds among the compounds represented by Formulae (1) to (3). Among these compounds represented by the formulae, one kind may be used alone, or two or more kinds may be used in combination.

The coloring composition according to the present invention may consist of only the compound represented by any one of Formulae (1) to (3) as the colorant but may further include other colorants within a range where the effects of the present invention do not deteriorate. Examples of the other colorants which may be used in combination with the compound represented by Formulae (1) or the salt thereof include well-known colorants, for example, dyes described in pp. 33 to 121 and pigments described in pp. 124 to 130 of "Dyeing Note" (Vol. 24, published by Shikisensha Co., Ltd.; hereinafter, the same shall be applied).

The content of the compound represented by any one of Formulae (1) to (3) in the coloring composition is preferably 1 to 20 mass % and more preferably 1 to 10 mass %. By adjusting the content of the compound represented by any one of Formulae (1) to (3) in the coloring composition to be 1 mass % or higher, the printing density of ink on a recording medium during printing can be improved, and a required image density can be secured. In addition, by adjusting the total content of the compound represented by any one of Formulae (1) to (3) in the coloring composition to be 20 mass % or lower, in a case where the coloring composition is used in an ink jet method, the jettability is excellent, and an effect of preventing the clogging or the like of an ink jet nozzle can be obtained.

In general, the coloring composition includes a solvent in addition to the compound represented by any one of Formulae (1) to (3). The kind and amount of the solvent may vary depending on the kind, dyeing concentration, and dyeing method of the compound represented by any one of Formulae (1) to (3). However, the content of the solvent in the coloring composition is preferably 40 mass % or higher with respect to the total mass of the coloring composition. It is preferable that the solvent includes water, and the content of water in the solvent is preferably 50 mass % or higher with respect to the total mass of the solvent. In addition, the content of water in the coloring composition is preferably 30 mass % or higher with respect to the total mass of the coloring composition.

Examples of the recording medium for printing the coloring composition thereon include various fabrics, papers, coated papers on which an ink absorbing layer is formed, and plastic films, and an ink which is suitable for performing ink jet recording on each of the recording media has been performed.

The coloring composition can be used for, for example, a coloring composition for dyeing or textile printing on fabric, an ink jet recording ink for forming an image on paper, a color toner, or a resist for a color filter. In particular, the coloring composition according to the present invention is suitable as a coloring composition for dyeing or textile printing on fabric.

[Coloring Composition for Dyeing or Textile Printing, and Dyeing or Textile Printing Method]

The coloring composition for dyeing or textile printing according to the present invention is not limited in the form of use as long as it is a coloring composition for dyeing a fiber. A method of dyeing a fiber is roughly classified into a dip dyeing method and a textile printing method. Dip dyeing is a process of dipping fabric to be dyed or yarn to be dyed in a dye solution, which is obtained by dissolving or dispersing a dye in a solvent, such that the dye is uniformly adsorbed on a surface of a fiber, is diffused into the fiber, and is fixed on the fiber by bonding. Textile printing is a dyeing method of producing a dyed material having a pattern by applying a dye or a pigment to fabric to be dyed to form a pattern thereon and fixing the dye or pigment on the fabric, and an effect of forming a pattern on the fabric using one color or multiple colors can be exhibited. Industrially, screen printing and roller printing in which a plate is used, transfer printing in which transfer paper is used, or ink jet textile printing in which a plate-making step is unnecessary is performed.

[[Coloring Composition for Dip Dyeing and Method using the Same]]

Dip dyeing includes: a step of dipping fabric or yarn in a dye solution such that a dye is fixed on the fabric or the yarn; a washing step of washing off a portion of the dye which is not fixed on the fiber; and a drying step. In a case where the coloring composition according to the present invention is used for dip dyeing, the coloring composition can be used in the form of a dye solution in which fabric or yarn can be dipped. In this case, the dye solution may include not only a dye but also a solvent, a level dyeing agent, a pH adjuster, an inorganic neutral salt, or a dispersant. As the solvent, in general, water is used. As the additives such as a level dyeing agent, well-known additives can be used, and examples thereof include a wetting agent and a penetrant described in pp. 134 to 145 of "Dyeing Note", a metal ion binding agent described in pp. 147 to 154 of "Dyeing Note", a dispersant described in pp. 216 to 222 of "Dyeing Note", a level dyeing agent described in pp. 230 to 255 of "Dyeing Note", a resisting agent described in pp. 285 and 286 of "Dyeing Note", a migration inhibitor described in pp. 279 to 284 of "Dyeing Note", a dye fixing agent and a color fastness improving agent described in pp. 304 to 321 of "Dyeing Note", and a pH adjuster described in pp. 322 to 334 of "Dyeing Note". For uniform dyeing of a dye with high concentration, in addition to a method of using additives, a method of controlling dye concentration, dye-bath pH, salt concentration, dyeing temperature, dyeing time, pressure, and liquid current can be used.

In the washing step, water or warm water is used in a temperature range of normal temperature to 100° C. Water for washing may include a soaping agent. By completely removing a non-fixed portion of a coloring material, satisfactory results can be obtained in various kinds of water fastness, for example, washing fastness or perspiration fastness.

In the drying step, specifically, washed fabric is squeezed or dehydrated and then is hung out to dry or dried using a heat roll, an iron, or the like.

[[Coloring Composition for Screen Printing, Roller Printing, or Transfer Printing, and Textile Printing Method using the Same]]

In a case where the coloring composition according to the present invention is used for screen printing, roller printing, or transfer printing, the coloring composition is used in the form of a color paste which is printed on fabric through a plate or transfer paper.

The textile printing method according to the present invention includes at least the following steps (1) to (4):

(1) a step of preparing a color paste by adding the coloring composition for dyeing or textile printing according to the present invention to a solution including at least a polymer compound and water;

(2) a step of printing the color paste of (1) on fabric;

(3) a step of applying steam to the printed fabric; and (4) a step of washing the printed fabric with water and drying the washed fabric.

It is preferable that the fabric includes polyamide.

The color paste is required to satisfy the following suitabilities: printing suitability for printing the color paste on a plate; and dyeing suitability for a printed material in fixing and water washing treatments.

Therefore, in order to impart the printing suitability and the dyeing suitability, the color paste may include not only a dye but also a paste, a solvent, dyeing auxiliaries, and the like.

The paste is a medium of the coloring composition, and a water-soluble polymer is used. Examples of the water-soluble polymer include a well-known water-soluble polymer such as a starch, a seaweed, a natural gum, a cellulose derivative, sodium alginate, a protein material, a tannin material, or a lignin material. In addition, a well-known synthetic polymer such as a polyvinyl alcohol compound, a polyethylene oxide compound, an acrylic acid aqueous polymer, a styrene aqueous polymer, or a maleic anhydride aqueous polymer can also be used as the paste. For example, a paste for textile printing described in pp. 349 to 361 of "Dyeing Note" can also be used. In addition, the paste can be used in combination with a printing paste improving agent described in pp. 367 to 369 of "Dyeing Note". A mixture of two or more kinds of pastes may be used. As the solvent, a water-soluble solvent is preferably used, and a solvent including at least water is most preferably used.

Examples of the dyeing auxiliaries include a color former such as an acid or an alkali, a dye solubilizer, a wetting agent, a moisture absorbent, a deep dyeing agent, an anti-reducing agent, a metal ion binding agent, an ultraviolet absorber, a dispersant, a resisting agent, a discharge agent, a preservative, a fungicide, an antioxidant, a migration inhibitor, a dye fixing agent, and an antifoaming agent.

As the dyeing auxiliaries, well-known dyeing auxiliaries can be used, and examples thereof include a solubilizer and a solubilizing agent described in pp. 336 to 338 of "Dyeing Note", a deep dyeing agent, a level dyeing agent, and a penetrant described in pp. 339 to 345 of "Dyeing Note", a defoaming agent described in pp. 346 to 348 of "Dyeing Note", a metal ion binding agent described in pp. 147 to 154 of "Dyeing Note", a dispersant described in pp. 216 to 222 of "Dyeing Note", a resisting agent described in pp. 370 to 374 of "Dyeing Note", a discharge agent described in pp. 375 to 381 of "Dyeing Note", a preservative and a fungicide described in pp. 362 to 363 of "Dyeing Note", a migration inhibitor described in pp. 279 to 284 of "Dyeing Note", a dye fixing agent described in pp. 426 to 429 of "Dyeing Note", a wet fastness improving agent described in JP1994-166969A (JP-H6-166969A), and a light fastness improving agent described in U.S. Pat. No. 5,336,443A.

Dyeing auxiliaries are added to a paste solution obtained by dissolving or dispersing a paste in a solvent, a dye solution obtained by dissolving or dispersing a dye in a solvent is added to the paste solution, and the components are stirred. As a result, a color paste is prepared (a step of preparing a color paste).

In the textile printing method, unlike the dip dyeing method, after printing the color paste on fabric (a step of printing the color paste on fabric), a treatment of fixing the coloring material, which is printed on the fabric, on the fiber is performed. This treatment is called a color developing step, and a method using heated air or a method using normal pressure saturated steam or superheated steam can be performed for the treatment. In particular, a method using normal pressure saturated steam is preferable. In the present invention, a step of applying steam to the printed fabric is performed. In the step of applying steam to the printed fabric, the temperature and time in the steam treatment vary depending on the kind of the coloring composition and the kind of the fabric. For example, the temperature is preferably 90° C. to 140° C. and more preferably 100° C. to 108° C., and the time is preferably 1 to 60 minutes and more preferably 1 to 30 minutes. After the step of applying steam to the printed fabric, as in the case of dip dyeing, a washing step and a drying step are performed to obtain a printed material. It is preferable that the fabric includes polyamide.

[[Coloring Composition for Ink Jet Textile Printing and Method using the Same]]

In a case where the coloring composition according to the present invention is used for ink jet textile printing, the coloring composition is used in the form of an ink for ink jet textile printing. An ink jet textile printing method has advantageous effects in that, compared to a textile printing method of the related art, an image having excellent tone characteristics can be rapidly formed. Therefore, there are merits in that, for example, the delivery time can be reduced, many kinds in small quantities can be produced, and a plate-making step is unnecessary. Further, in ink jet textile printing, only an amount of ink required for forming an image is used. Therefore, it can be said that ink jet textile printing is an image forming method having excellent environmental friendliness in that, for example, the amount of waste liquid is less than that in a method of the related art.

The ink jet ink causes nozzle clogging of an ink jet head in a case where the viscosity thereof increases due to evaporation of water, an aqueous organic solvent, or the like from a nozzle tip or a case where a dye as a solid component is deposited. Therefore, it is required that the ink for ink jet textile printing has more satisfactory color developing properties than that used in textile printing of the related art. In addition, it is required that ink suitability such as ink storage stability or jetting stability, dyeing suitability such as bleeding prevention or contamination prevention, and image fastness such as light fastness, water fastness, or chlorine fastness are also imparted to the ink for ink jet textile printing.

"Ink jet ink" is ink that is used in a printer (ink jet printer) having a mechanism of jetting the ink from an ink jet nozzle to form an image. In particular, ink jet ink used for textile printing using an ink jet method will be called ink for ink jet textile printing.

An ink jet textile printing method according to the present invention includes the following steps (11) to (14):

(11) a step of applying a paste including at least a polymer compound and water to fabric;

(12) a step of printing the ink jet ink according to the present invention on the fabric using an ink jet method;

(13) a step of applying steam to the printed fabric; and

(14) a step of washing the printed fabric with water and drying the washed fabric.

It is preferable that the fabric includes polyamide.

In a case where a color paste used in a textile printing method of the related art is used in the ink jet textile printing method, nozzle clogging occurs. Therefore, in the ink jet textile printing method, a pre-treatment step of applying a paste to fabric in advance (the step of applying a paste including at least a polymer compound and water to fabric) is necessary. By performing the pre-treatment step, fabric handleability is improved. Specifically, pre-treated fabric is obtained by applying a paste solution including a paste, a solvent, and a hydrotropy agent to fabric and drying the fabric. It is preferable that the fabric includes polyamide.

As the paste, the same paste as that used for screen printing or the like can be used. As the solvent, a water-soluble solvent is preferably used, and a solvent including at least water is most preferably used.

In general, the hydrotropy agent serves to increase the color optical density of an image when fabric to which an ink composition is applied is heated by steam. For example, typically, urea, alkyl urea, ethylene urea, propylene urea, thiourea, guanidine hydrochloride, or tetraalkyl ammonium halide is used. In addition, a well-known hydrotropy agent can be used, and examples thereof include a dye fixing agent described in pp. 426 to 429 of "Dyeing Note". The content of the hydrotropy agent is preferably 0.01 mass % to 20 mass % with respect to the total solid content of the paste solution.

Optionally, the paste solution further includes, for example, a pH adjuster, an aqueous (water-soluble) metal salt, a water repellant, a surfactant, a migration inhibitor, or a micropore forming agent. As these additives, well-known additives can be used, and examples thereof include a solubilizer and a solubilizing agent described in pp. 336 to 338 of "Dyeing Note", a deep dyeing agent, a level dyeing agent, and a penetrant described in pp. 339 to 345 of "Dyeing Note", a metal ion binding agent described in pp. 147 to 154 of "Dyeing Note", a resisting agent described in pp. 370 to 374 of "Dyeing Note", a discharge agent described in pp. 375 to 381 of "Dyeing Note", a preservative and a fungicide described in pp. 362 to 363 of "Dyeing Note", a migration inhibitor described in pp. 279 to 284 of "Dyeing Note", a micropore forming agent described in JP1995-316991A (JP-H7-316991A), a wet fastness improving agent described in JP1994-166969A (JP-H6-166969A), and a light fastness improving agent described in U.S. Pat. No. 5,336,443A. In addition, an additive described in paragraphs "0096" to "0101" of JP2013-209786A can also be used.

In the pre-treatment, the paste solution is padded at a squeezing rate of 5% to 150% and preferably 10% to 130%.

In the pre-treatment, a method of applying the respective paste solutions to fabric is not particularly limited, and examples thereof include methods which are typically performed, for example, a padding method, a coating method, a screening method, a spraying method, a transfer method, and an ink jet method.

Next, the pre-treated fabric is printed using the ink jet ink. The ink for ink jet textile printing can be prepared by dissolving and/or dispersing the compound (which may be a mixture) represented by any one of Formulae (1) to (3) according to the present invention in a lipophilic medium or an aqueous medium. It is preferable that an aqueous medium is used to prepare the ink for ink jet textile printing. Therefore, in order to impart ink suitability, dyeing suitability, and image fastness, the ink for ink jet textile printing can include a solvent and a surfactant in addition to the dye.

The solvent is determined based on, for example, the kind of the substituent used in any one of Formulae (1) to (3), the kind of the solvent component used for producing the coloring composition, and the kind of fabric to be dyed. As the solvent, an aqueous medium is preferably used, and water or a water-soluble organic solvent is more preferably used. The ink for ink jet textile printing can be prepared by using a lipophilic solvent or a water-soluble solvent and the solvent and dissolving and/or dispersing the compound represented by any one of Formulae (1) to (3) according to the present invention therein.

It is preferable that an organic solvent which may be included in the ink composition according to the present invention is an aqueous organic solvent, and examples thereof include a polyhydric alcohol such as diethylene glycol or glycerin, an amine, a monohydric alcohol, and a polyhydric alcohol alkyl ether. In addition, each compound which is described as an example of a water-miscible organic solvent in paragraph "0076" of JP2002-371079A is preferable.

The content of the organic solvent in the ink composition according to the present invention is preferably 10 mass % to 60 mass % with respect to the total mass of the ink jet ink composition.

As the surfactant, any one of a cationic surfactant, an anionic surfactant, an amphoteric surfactant, and a nonionic surfactant can be used. Examples of the cationic surfactant include an aliphatic amine salt and an aliphatic quaternary ammonium salt. Examples of the anionic surfactant include a fatty acid soap and an N-acyl-N-methylglycine salt. Examples of the amphoteric surfactant include carboxy betaine, sulfo betaine, aminocarboxylate, and imidazolinium betaine. Examples of the nonionic surfactant include polyoxyethylene alkyl ether, acetylenic glycol, and acetylene alcohol. A surfactant which is described as an example of a surface tension adjuster in paragraph "0073" of JP2002-371079A, or a surfactant which is described in JP2008-266466A or JP1999-2693929A (JP-H11-2693929A) is preferably used. In addition, the ink jet ink according to the present invention optionally includes other additives within a range where the effects of the present invention do not deteriorate. Examples of the other additives include well-known additives such as an anti-drying agent (wetting agent), an antifading agent, an emulsion stabilizer, a penetration enhancer, an ultraviolet absorber, an infrared absorber, a preservative, a fungicide, a pH adjuster, a surface tension adjuster, an antifoaming agent, a viscosity adjuster, a dispersant, a dispersion stabilizer, a rust inhibitor, a chelating agent, an anti-reducing agent, an antioxidant, an antistatic agent, and a fluorescence brightening agent. In the case of a water-soluble ink, these various additives are directly added to the ink solution. In a case where an oil-soluble dye is used in the form of a dispersion, in general, the additives are added to a dye dispersion after the preparation of the dispersion. However, the additives may be added in the foiui of an oil phase or a water phase during the preparation. In a case where an oil-soluble dye is used in the form of a dispersion, a dispersant can be used. As the dispersant, for example, a dispersant described in pp. 216 to 222 of "Dyeing Note" can be used. As the anti-drying agent, the antifading agent, the ultraviolet absorber, the fungicide, the pH adjuster, the surface tension adjuster, the antifoaming agent, and the chelating agent, those described in paragraphs "0224" to "0231" of JP2014-5462A can be used. In addition, the ink for ink jet textile printing according to the present invention may also include a wet fastness improving agent described in JP1994-166969A (JP-H6-166969A) and a light fastness improving agent described in U.S. Pat. No. 5,336,443A. The penetration enhancer is used in order to enhance the penetration of the ink jet ink into the fiber and the fixing of the ink thereon. As the penetration enhancer, a well-known additive can be used. For example, a wetting agent, a penetrant, a level dyeing agent, a retarding agent, and an alcohol such as ethanol, isopropanol, butanol, di(tri)ethylene glycol monobutyl ether, or 1,2-hexanediol described in pp. 223 to 255 of "Dyeing Note"; sodium lauryl sulfate, sodium oleate, a nonionic surfactant; or a branched polyhydric alcohol described in WO10/109867A or JP1994-57644A (JP-H6-57644A) can be used. Typically, these penetration enhancers function in a case where the addition thereof is 5 to 35 mass %. It is preferable that the penetration enhancer is used in an addition amount range where bleeding does not occur after dyeing and where ink leakage from a back surface does not occur.

In a case where the compound according to the present invention is dispersed in an aqueous medium, the compound can be dispersed using a method described in paragraphs "0232" and "0233" of JP2014-5462A.

In the present invention, the content of the compound represented by any one of Formulae (1) to (3) in the coloring composition is determined based on, for example, the kind of the substituent used in any one of Formulae (1) to (3), and the kind of the solvent component used for manufacturing the coloring composition. The content of the compound represented by any one of Formulae (1) to (3) in the coloring composition is preferably 1 to 20 mass % and more preferably 1 to 10 mass % with respect to the total mass of the coloring composition.

The viscosity of the ink jet recording ink according to the present invention is preferably 30 mPa·s or lower. In addition, the surface tension of the ink for ink jet textile printing according to the present invention is preferably 25 mN/m to 70 mN/m. The viscosity and the surface tension can be adjusted by adding various additives such as a viscosity adjuster, a surface tension adjuster, a specific resistance adjuster, a film conditioner, an ultraviolet absorber, an antioxidant, an antifading agent, a fungicide, a rust inhibitor, a dispersant, and a surfactant.

The ink jet ink according to the present invention can be used not only for forming a monochromic image but also forming a full color image. In order to form a full-color image, a magenta ink, a cyan ink, and a yellow ink can be used. In addition, in order to adjust the color, a black ink may be further used. As the dye, a dye described in paragraphs "0237" to "0240" of JP2014-5462A can be used.

After drying, fabric which is printed using an ink jet method undergoes the color developing step, the washing step, and the drying step to obtain a printed material as in the case of other textile printing methods. A preferable method for performing the color developing step to the drying step is the same as in screen printing or the like.

The fabric used in the present invention is optionally pre-treated. The treatment may be performed before or after applying the paste to the fabric in the ink jet textile printing method. In addition, a pre-treatment agent may be added to the paste solution which is applied before dyeing. Specific examples of a pre-treatment method include methods described in JP2002-339268A, JP2000-54277A, JP1995-150482A (JP-H7-150482A), JP2008-174865A, JP2012-154006A, JP2012-12730A, JP1990-68372A (JP-H2-68372A), JP1988-31594B (JP-S63-31594B), JP2002-275769A, JP2001-81680A, JP2004-68208A, JP1999-43873A (JP-H11-43873A), JP2007-217829A, JP2006-83495A, JP2005-154936A, JP2002-105875A, JP2002-348786A, JP1999-81163A (JP-H11-81163A), JP1990-61183A (JP-H2-61183A), JP2001-295186A, JP2004-60073A, JP2003-113583A, JP1996-100379A (JP-H8-100379A), JP1990-53976A (JP-H2-53976A), JP2000-226781A, JP2004-292989A, JP2002-249991A, JP2002-363872A, JP1994-341070A (JP-H6-341070A), JP2004-197237A, JP2008-223192A, and JP2011-179130A.

On the dyed fabric according to the present invention, optionally, a flame-retardant treatment described in JP1987-257464A (JP-S62-257464A), a plasma treatment described in JP1990-47378A (JP-H2-47378A), or a treatment for improving fastness such as light fastness, wet fastness, or chlorine fastness described in JP1985-94678A (JP-S60-94678A), JP2002-266236A, JP2007-321247A, JP1991-287873A (JP-H3-287873A), or JP2004-131919A is performed. These treatments may be performed before or after dyeing.

A method for ink jet textile printing in which the ink according to the present invention is used is not particularly limited as long as it includes a step of jetting the ink on fabric using an ink jet device. For example, methods for ink jet textile printing described in JP1997-296379A (JP-H9-296379A), JP1999-43873A (JP-H11-43873A), JP1995-70953A (JP-H7-70953A), JP1995-197384A (JP-H7-197384A), JP1995-70950A (JP-H7-70950A), JP1991-104977A (JP-H3-104977A), JP2007-303046A, JP2007-313717A, and JP2008-248437A are known.

In addition, as a device for ink jet textile printing, an arbitrary ink jet device can be used. For example, methods described in JP1991-45774A (JP-H3-45774A), JP2001-277656A, JP2000-290882A, JP2001-18390A, JP2010-83040A, and JP2011-31418A are known.

[Form of Coloring Compound and Fabric to be Dyed]

The compound according to the present invention represented by any one of Formulae (1) to (3) is used as a dye for dyeing or printing on fabric. By changing the kind of the substituent of the compound represented by any one of Formulae (1) to (3), various kinds of dyes can be prepared. In a case where the compound represented by any one of Formulae (1) to (3) includes at least one acidic group such as a sulfo group or a carboxyl group, an acid dye is prepared such that a protein fiber such as silk or wool or a polyamide fiber such as 6 nylon or 66 nylon can be dyed. In a case where the compound represented by any one of Formulae (1) to (3) is an oil-soluble compound which is insoluble in water, a dispersed dye is prepared such that a hydrophobic fiber such as polyester can be generally dyed but an acrylic fiber or a polyamide fiber can also be dyed. In a case where the compound represented by any one of Formulae (1) to (3) includes at least one basic group such as an amino group, a cationic dye is prepared such that an acrylic fiber can be dyed. In a case where the compound represented by any one of Formulae (1) to (3) includes at least one group which is reactive with a fiber, a reactive dye is prepared such that a cellulose fiber such as cotton, or a polyamide fiber can be dyed with this compound. Specific examples of the group which is reactive with a fiber include a chlorotriazinyl group, a chloropyrimidyl group, a vinylsulfonyl group, a chloroethylsulfonyl group, a sulfatoethylsulfonyl group, and a thiosulfatoethylsulfonyl group.

As the fabric, fabric made of one fiber may be used, or a composite fiber made of two or more fibers may be used.

It is preferable that the compound represented by any one of Formulae (1) to (3) according to the present invention is an acid dye. In particular, when a polyamide fiber is dyed with this acid dye, excellent fixing properties can be obtained, and various performances of dyed fabric such as light fastness, water fastness, and chlorine fastness can be improved.

A polyamide fiber which is preferable for fabric to be dyed is not particularly limited as long as it includes a polyamide fiber. Fabric made of only polyamide may be used, fabric made of a composite fiber may be used. Examples of the composite fiber include fibers described in JP2008-202210A, JP2006-322131A, and JP2007-100270A. Among these polyamide fibers, fibers including 6 nylon and 66 nylon are preferable.

As the fiber to be used, fabric is preferable. However, even in a case where yarn is dyed, the same effects can be obtained.

EXAMPLES

Hereinafter, the present invention will be described using examples, but the present invention is not limited to these examples. Unless specified otherwise, "%" and "part(s)" represent "mass %" and "part(s) by mass".

Synthesis Examples (Synthesis of Compound 69)

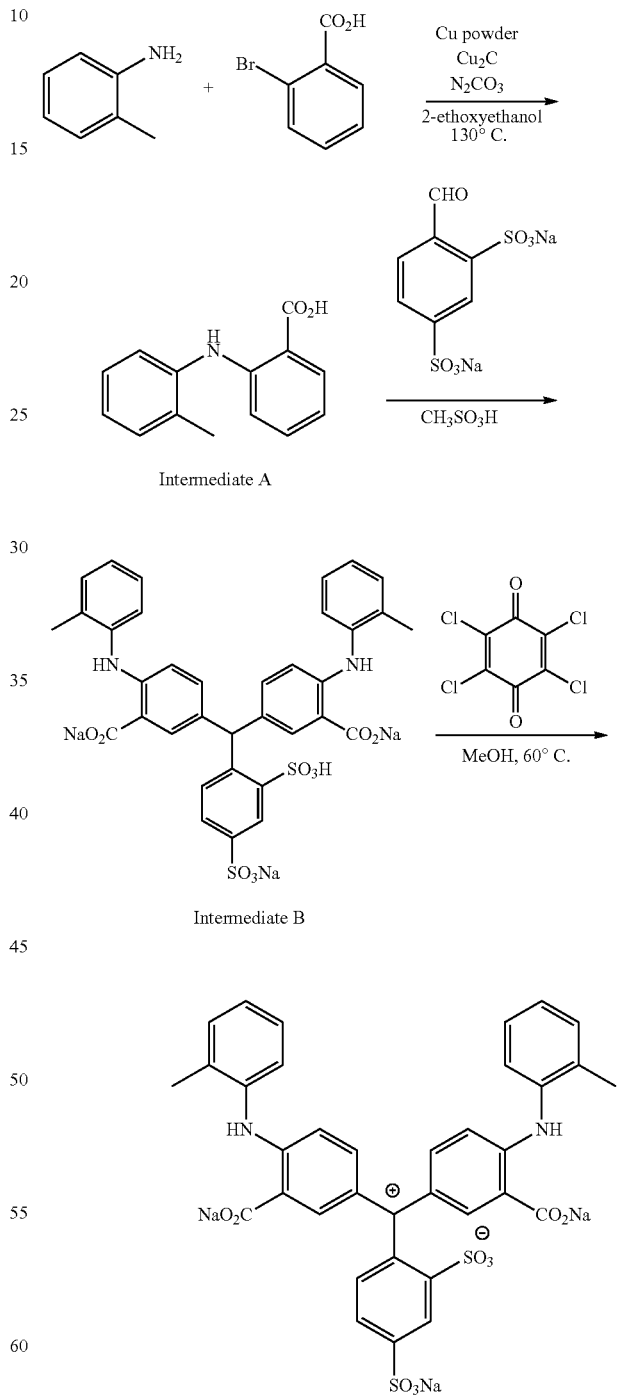

13.3 g of o-toluidine, 25 g of 2-bromobenzoate, 0.8 g of copper powder, 0.9 g of copper (I) oxide, 17.2 g of t-butoxy potassium, and 42 mL of ethoxyethanol were put into a flask and were sufficiently stirred in a nitrogen stream. Next, the reaction solution was heated to 130° C. and was stirred for 4 hours. The obtained reaction solution was cooled and poured into 400 mL of water to which 50 g of activated carbon was added, and was filtered through celite. The obtained filtrate was extracted with ethyl acetate, and the organic phase was dried with sodium sulfate and concentrated. As a result, 20 g of Intermediate A was obtained.

8.8 g of Intermediate A, 6 g of disodium 4-formylbenzene-1,3-disulfonate, and 80 mL of methanesulfonic acid were put into a flask and were stirred at 50° C. for 5 hours. The obtained reaction solution was poured into 500 mL of iced water, and the obtained crystals of Intermediate B were separated by filtration (11 g). 9 g of Intermediate B, 3.4 g of chloranil, and 200 mL of methanol were mixed with each other, and the mixture was stirred at 50° C. for 10 hours. After returning the temperature to room temperature, the obtained crystals were separated by filtration. As a result, a coarse body of Compound 69 was obtained. The coarse body was dissolved in methanol, and the solution was neutralized with sodium acetate and was purified by column chromatography (filler: SEPHADEX, developing solution: methanol). As a result, 4 g of Compound 69 was obtained. Solution absorbance spectrum of Compound 69: λmax=613 nm (aqueous solution)

(Synthesis of Compound 70)

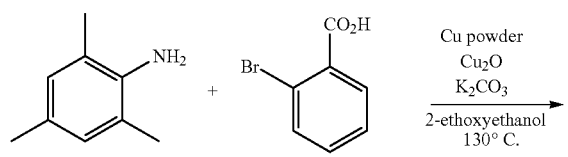

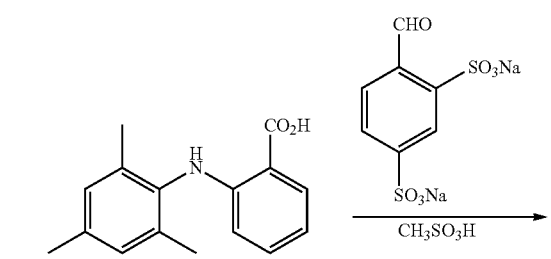

Intermediate C

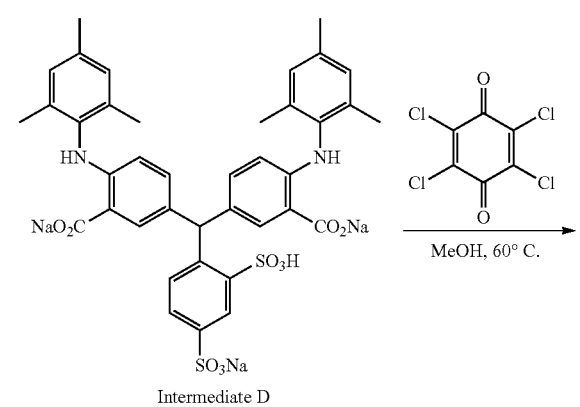

Intermediate D

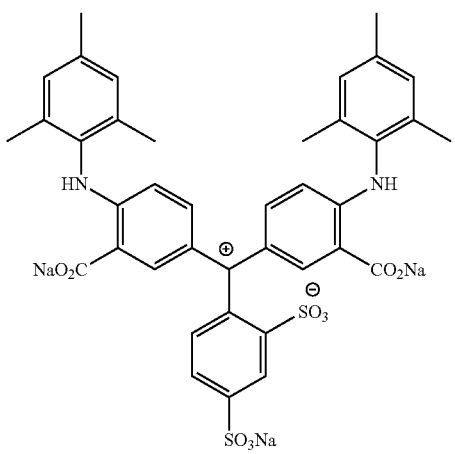

Compound 70

Intermediate C was obtained using the same method as the method of synthesizing Intermediate A, except that the reaction was performed using 2,4,6-trimethylaniline instead of o-toluidine.

Intermediate D was obtained using the same method as the method of synthesizing Intermediate B, except that the reaction was performed using Intermediate C instead of Intermediate A.

Compound 70 was obtained using the same method as the method of synthesizing Compound 69, except that the reaction was performed using Intermediate D instead of Intermediate B.

Solution absorbance spectrum of Compound 70: λmax=616 nm (aqueous solution)

(Synthesis of Compound 71)

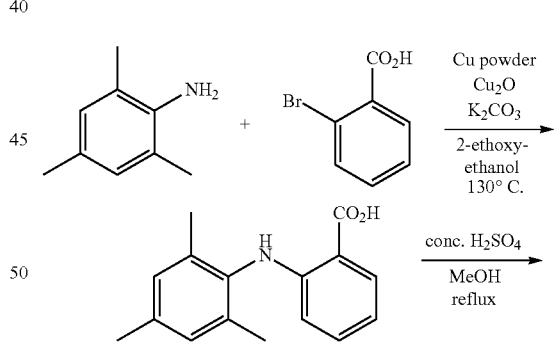

Intermediate C

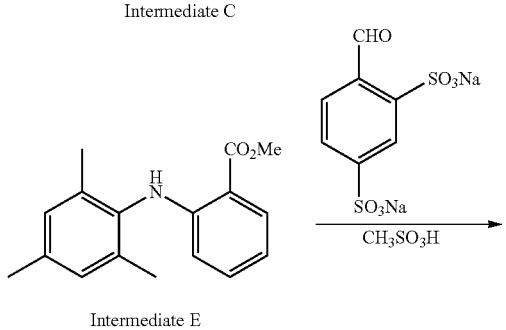

Intermediate E

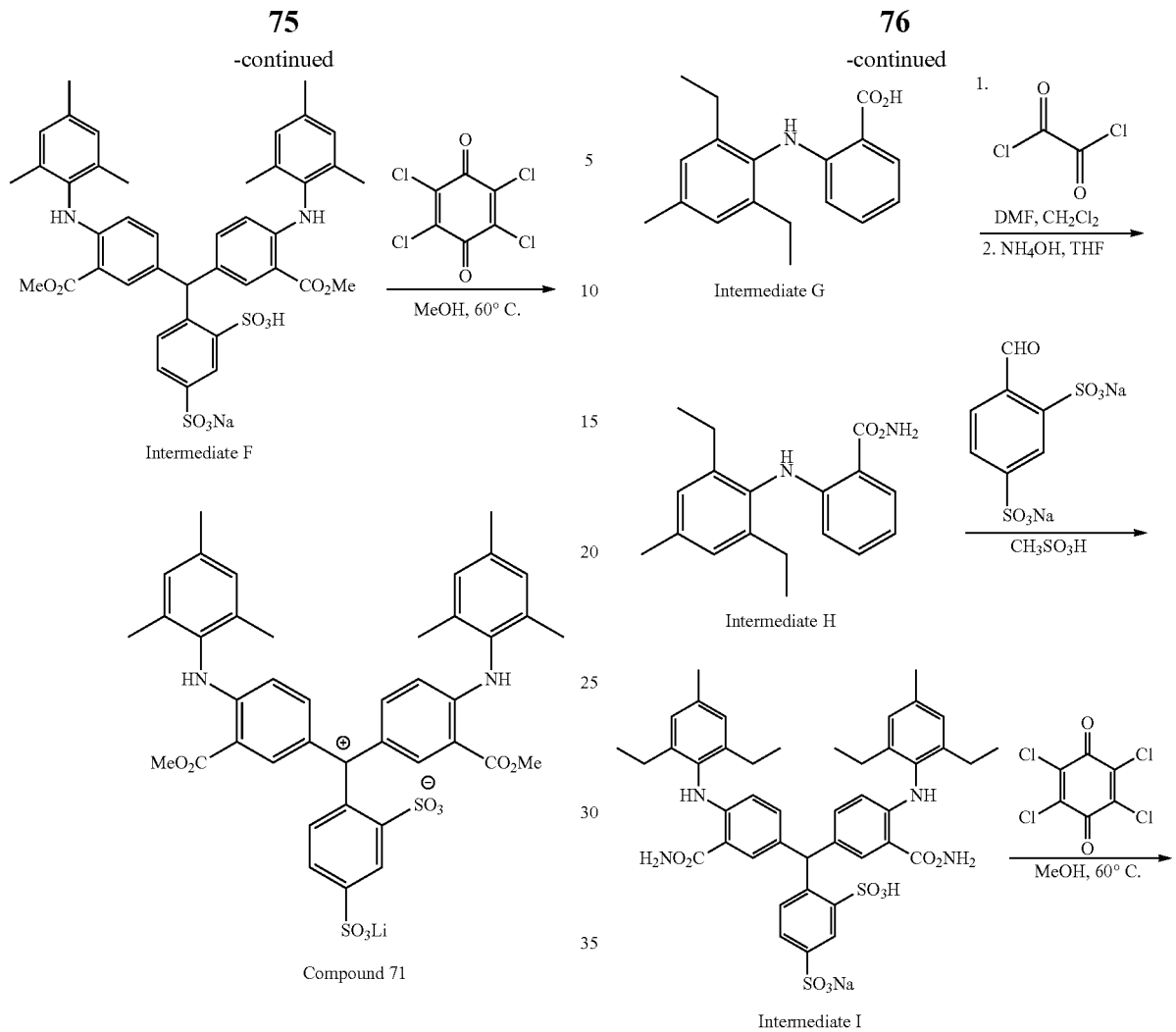

15 g of Synthetic Intermediate C of Compound 70 was heated to reflux in 300 mL of methanol and 30 mL of concentrated sulfuric acid for 24 hours. As a result, 14 g of Intermediate E was obtained.

Intermediate F was obtained using the same method as the method of synthesizing Intermediate B, except that the reaction was performed using Intermediate E instead of Intermediate A.

Compound 71 was obtained using the same method as the method of synthesizing Compound 69, except that the reaction was performed using Intermediate F instead of Intermediate B.

Solution absorbance spectrum of Compound 71: $\lambda_{max}$=620 nm (aqueous solution)

(Synthesis of Compound 72)

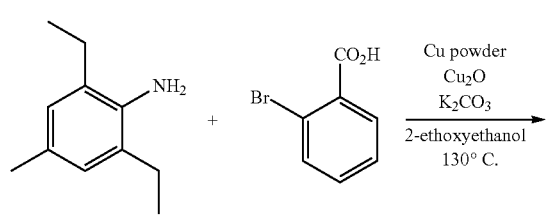

Intermediate G was obtained using the same method as the method of synthesizing Intermediate A, except that the reaction was performed using 2,6-diethyl-4-methylaniline instead of o-toluidine.

20 g of Intermediate G was dissolved in 400 mL of dichloromethane, and 1.0 mL of N,N-dimethylformamide (DMF) was added. The reaction solution was cooled to 0° C., 13.4 g of oxalyl chloride was added dropwise for 45 minutes, and the solution was stirred for 1 hour. Next, ammonium hydroxide (a mixed solution of water and tetrahydrofuran (THF)) was added, and the solution was stirred for 1 hour. After extraction with ethyl acetate, the organic phase was dried with sodium sulfate and concentrated. Then, 13 g of Intermediate H was obtained by silica gel chromatography.

Intermediate I was obtained using the same method as the method of synthesizing Intermediate B, except that the reaction was performed using Intermediate H instead of Intermediate A.

Compound 72 was obtained using the same method as the method of synthesizing Compound 69, except that the reaction was performed using Intermediate I instead of Intermediate B.

Solution absorbance spectrum of Compound 72: λmax=622 nm (aqueous solution)

(Synthesis of Compound 73)

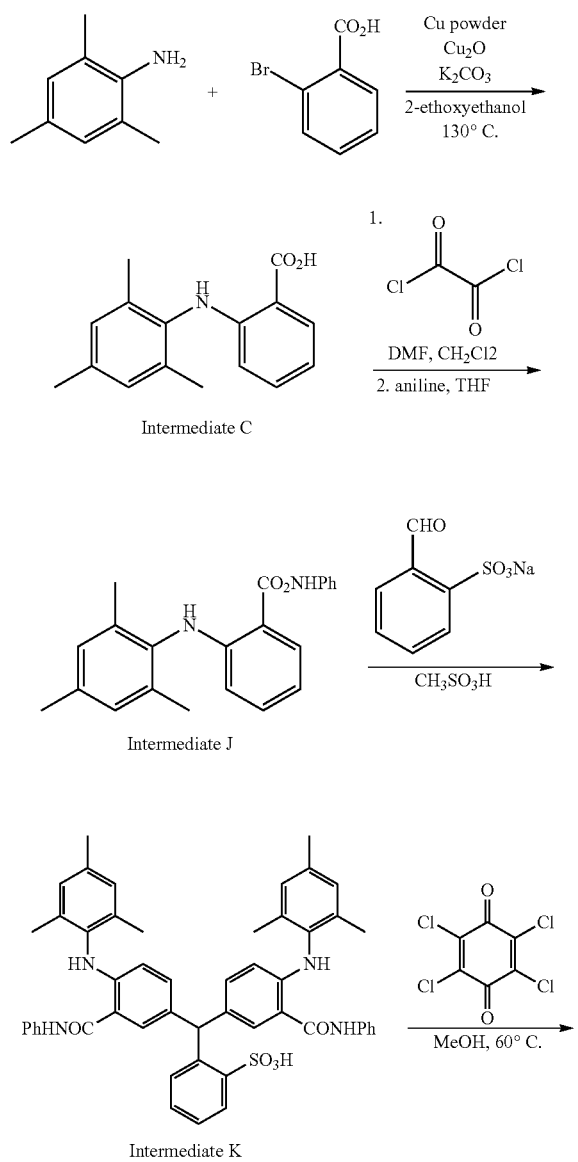

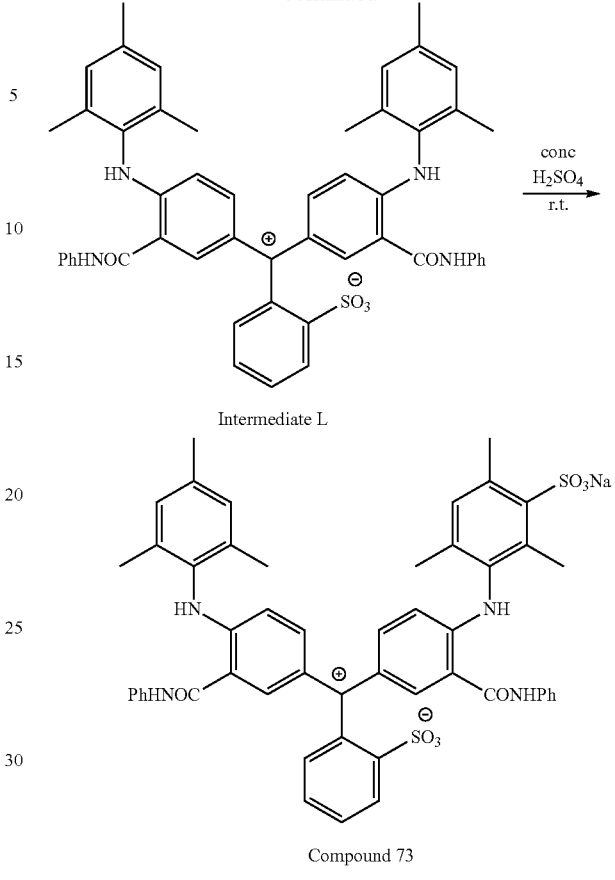

15 g of Synthetic Intermediate C of Compound 70 was dissolved in 300 mL of dichloromethane, and 1.0 mL of DMF was added. The reaction solution was cooled to 0° C., 10.1 g of oxalyl chloride was added dropwise for 30 minutes, and the solution was stirred for 1 hour. Next, aniline (a mixed solution of water and THF) was added, and the solution was stirred for 1 hour. After extraction with ethyl acetate, the organic phase was dried with sodium sulfate and concentrated. Then, 10 g of Intermediate J was obtained by silica gel chromatography.

Intermediate K was obtained using the same method as the method of synthesizing Intermediate B, except that the reaction was performed using Intermediate J instead of Intermediate A and using disodium 2-formyl benzenesulfonate instead of disodium 4-formylbenzene-1,3-disulfonate.

Intermediate L was obtained using the same method as the method of synthesizing Compound 69, except that the reaction was performed using Intermediate K instead of Intermediate B.

5 g of Intermediate L and 25 mL of sulfuric acid were put into a flask, and the solution was stirred for 4 hours. The reaction solution was poured into 80 g of ice, and the precipitated crystals were separated by filtration. The crystals were dissolved in methanol, and the solution was neutralized with sodium acetate and was purified by column chromatography (filler: SEPHADEX, developing solution: methanol). As a result, 2 g of Compound 73 was obtained. Solution absorbance spectrum of Compound 73: λmax=621 nm (aqueous solution)

(Synthesis of Compound 74)

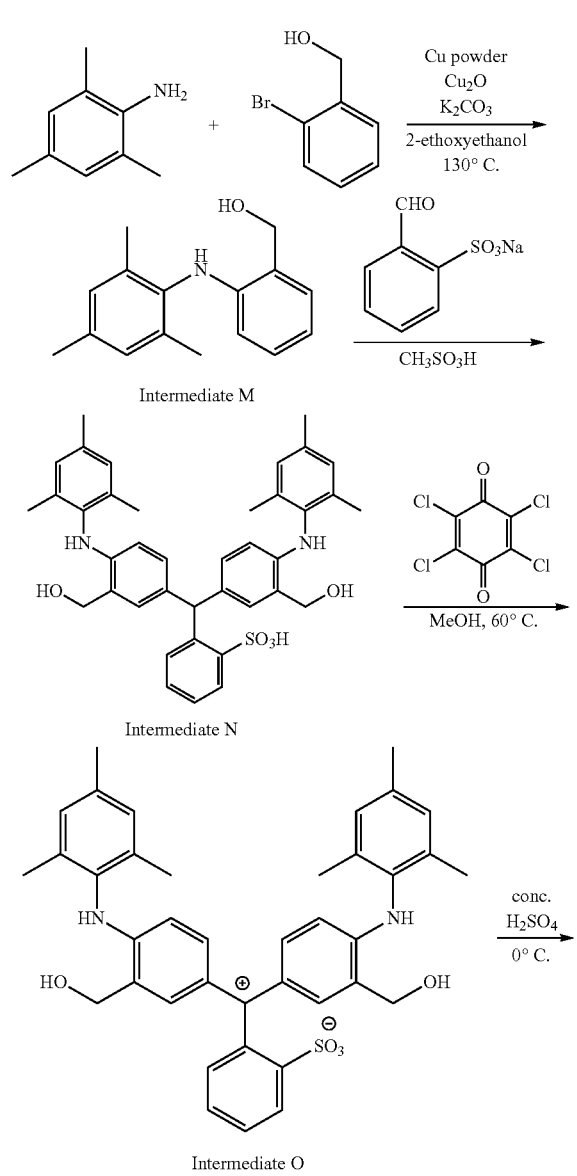

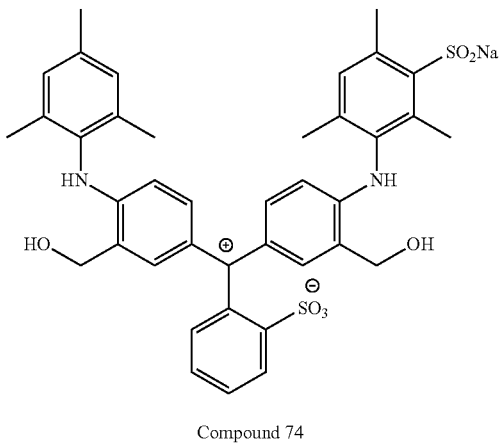

Compound 74

Intermediate M was obtained using the same method as the method of synthesizing Intermediate A, except that the reaction was performed using 2-bromobenzyl alcohol instead of 2-bromobenzoate.

Intermediate N was obtained using the same method as the method of synthesizing Intermediate K, except that the reaction was performed using Intermediate M instead of Intermediate J.

Intermediate O was obtained using the same method as the method of synthesizing Intermediate L, except that the reaction was performed using Intermediate N instead of Intermediate K.

Compound 74 was obtained using the same method as the method of synthesizing Compound 73, except that the reaction was performed using Intermediate O instead of Intermediate L. Solution absorbance spectrum of Compound 74: λmax=616 nm (aqueous solution)

(Synthesis of Compound 101)

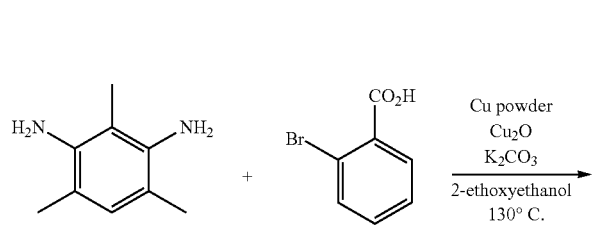

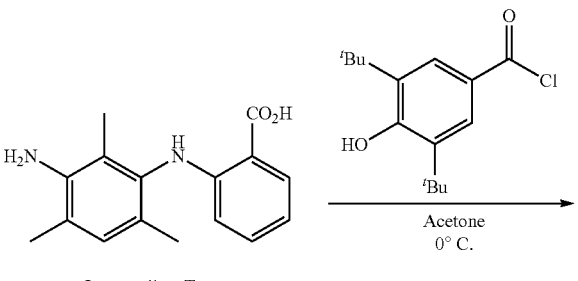

Intermediate T

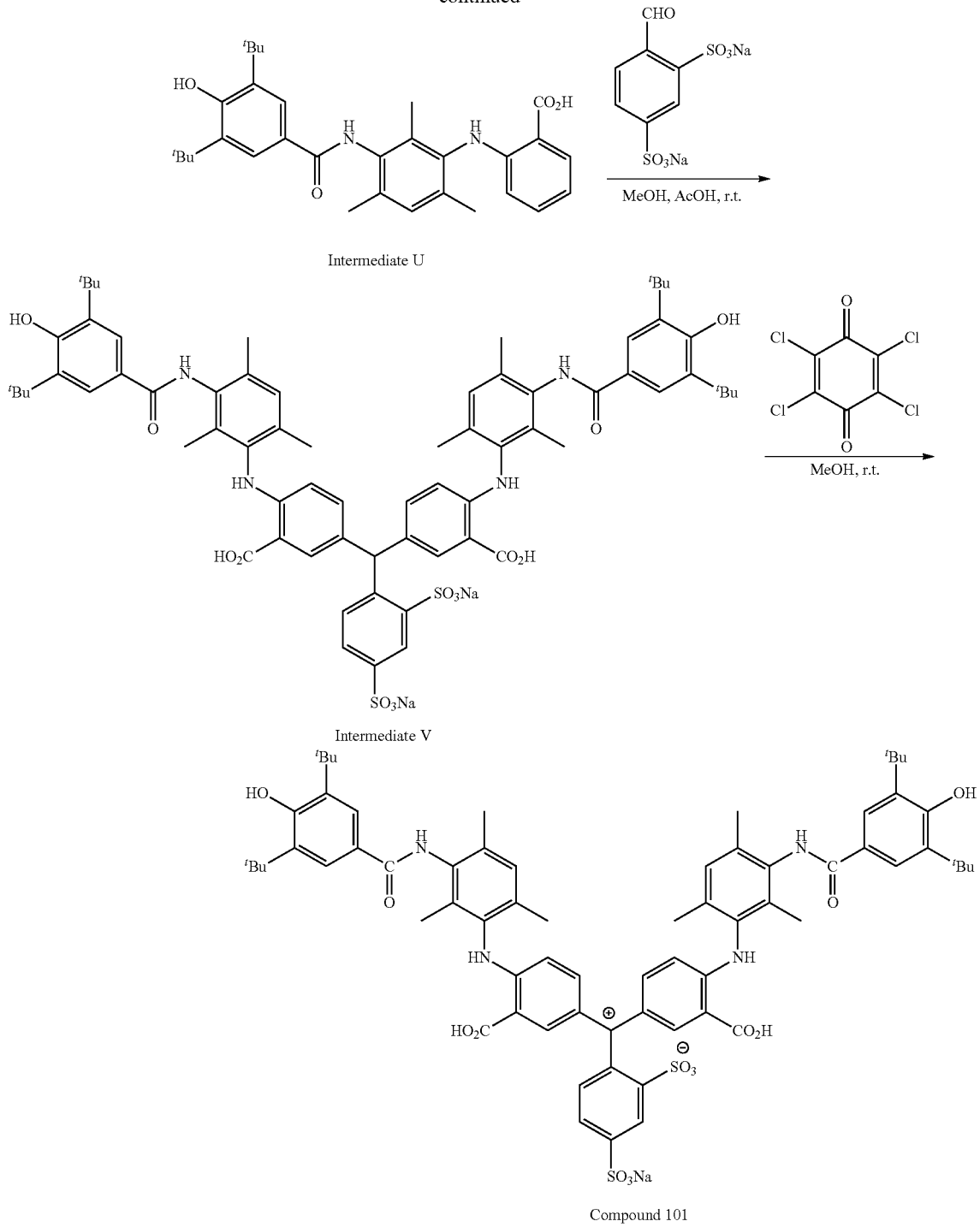

Intermediate T was obtained using the same method as the method of synthesizing Intermediate A, except that the reaction was performed using 2,4,6-trimethyl-1,3-phenylenediamine instead of o-toluidine.

6.0 g of Intermediate T was dissolved in 240 mL of acetone, and the solution was cooled to 0° C. Next, 7.2 g of 3,5-di-tert-butyl-4-hydroxybenzoyl chloride was dividedly added to the solution. The reaction solution was stirred for 30 minutes and then was concentrated, and column chromatography was performed. As a result, 8.5 g of Intermediate U was obtained.

Intermediate V was obtained using the same method as the method of synthesizing Intermediate B, except that the reaction was performed using Intermediate U instead of Intermediate A.

Compound 101 was obtained using the same method as the method of synthesizing Compound 69, except that the reaction was performed using Intermediate V instead of Intermediate B.

Solution absorbance spectrum of Compound 101: λmax=617 nm (aqueous solution)

(Synthesis of Compound 102)
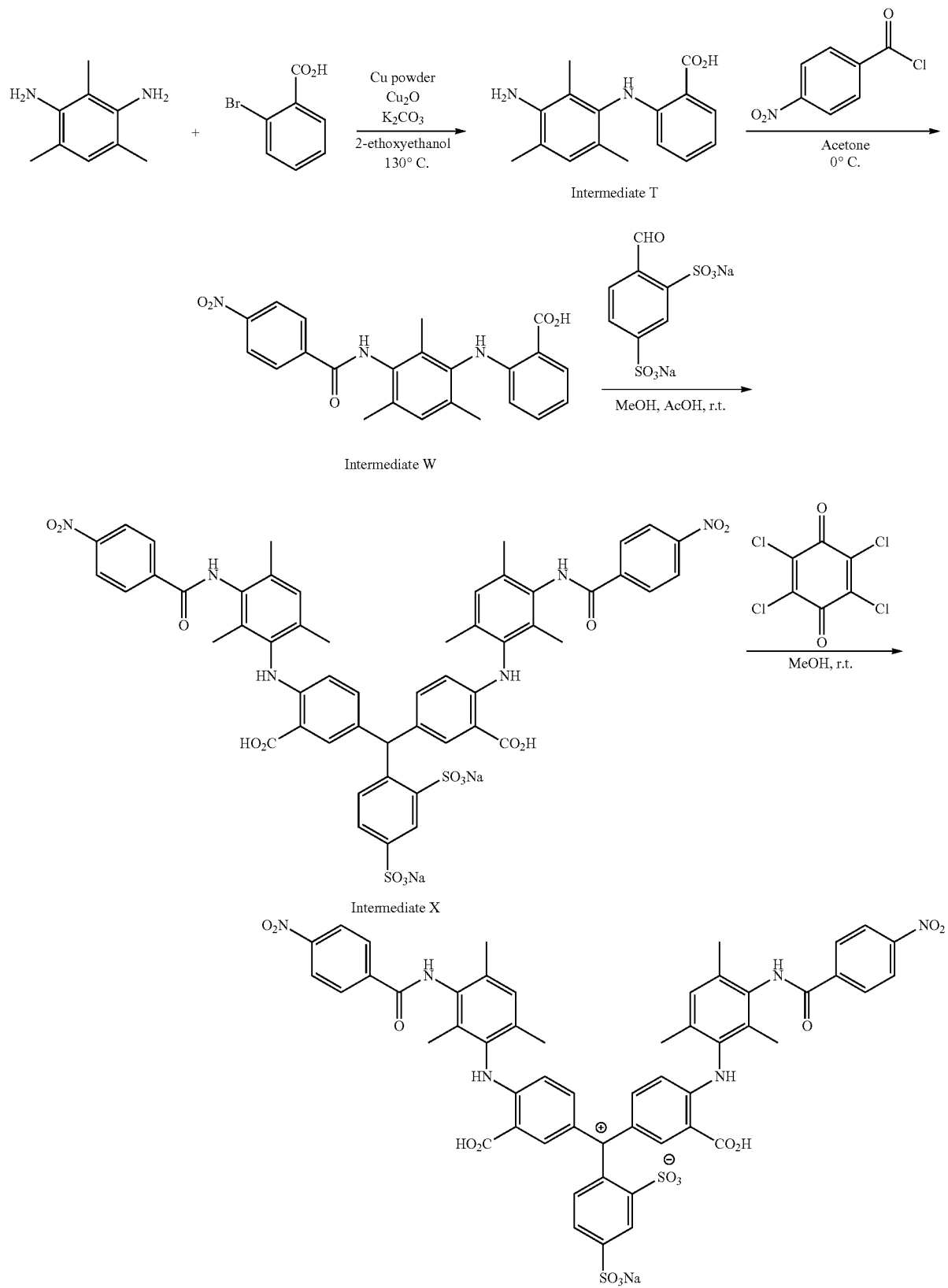

Intermediate W was obtained using the same method of synthesizing Intermediate U, except that the reaction was performed using 4-nitrobenzoyl chloride instead of 3,5-di-tert-butyl-4-hydroxybenzoyl chloride.

Intermediate X was obtained using the same method as the method of synthesizing Intermediate B, except that the reaction was performed using Intermediate W instead of Intermediate A.

Compound 102 was obtained using the same method as the method of synthesizing Compound 69, except that the reaction was performed using Intermediate X instead of Intermediate B.

Solution absorbance spectrum of Compound 102: λmax=613 nm (aqueous solution)

[Dip Dyeing Evaluation]

Nylon 6 jersey (manufactured by Shikisensha Co., Ltd.; fabric described below was manufactured by Shikisensha Co., Ltd.) as fabric was dipped in 150 g of a dye bath including 1.5 g of a dye, 0.2 g of acetic acid, and water as shown in Table 1, was heated to 98° C. for 40 minutes, and was dyed at the same temperature for 30 minutes. After dyeing, the nylon 6 jersey was slowly cooled to 60° C. and was washed with water. Using the dyed fabric, a dyed material which was dyed in one of colors including cyan to blue with a high density without color loss even after water washing was obtained. The evaluation results of the obtained dyed material are shown in Table 1.

[Evaluation Method]

1. Light Fastness Evaluation

Using XENON FADE-OMETER, dyed samples prepared according to ISO 105-B02 were irradiated with xenon light for 6 hours.

Before and after the irradiation of the xenon light, the lightness value L* and the chroma values a* and b* of each of the samples in the CIE L*a*b* color space (International Commission on Illumination (1976)/or JIS Z8781-4:2013) were measured using spectrodensitometer ("X-rite 938", manufactured by X-rite Inc.), and ΔEab as a color difference between two samples was obtained based on ΔL*, Δa*, and Δb* which were differences between coordinate values L*, a*, and b* in the L*a*b* color space. A lower value represents that the behavior before and after the light irradiation is small and excellent. An ΔEab value of 40 or lower was set as an allowable range.

Color Difference $\Delta Eab = (\Delta L^{*2} + \Delta a^{*2} + \Delta b^{*2})^{0.5}$ 2. Washing Fastness Evaluation The dyed samples prepared as described above were evaluated using a test method described in JIS-L0844 (2011) and was evaluated using an evaluation method described in this test method.

The higher the grade number, the better.

3. Perspiration Fastness Evaluation

The dyed samples prepared as described above were evaluated using a test method described in JIS-L0848 (2004) and was evaluated using an evaluation method described in this test method.

The higher the grade number, the better.

TABLE 1

|  | Dye | Light Fastness ΔEab | Washing Fastness | Perspiration Fastness Alkali/Acid |
|---|---|---|---|---|
| Comparative Example 1 | Comparative Compound 1 | 51 | Grade 4 and 5 | Grade 4 and 5/Grade 4 and 5 |
| Comparative Example 2 | Comparative Compound 2 | 45 | Grade 2 and 3 | Grade 3 and 4/Grade 4 and 5 |
| Example 1 | Compound 69 | 37 | Grade 4 and 5 | Grade 4 and 5/Grade 4 and 5 |
| Example 2 | Compound 70 | 35 | Grade 4 and 5 | Grade 4 and 5/Grade 4 and 5 |
| Example 3 | Compound 71 | 37 | Grade 4 | Grade 4/Grade 4 and 5 |
| Example 4 | Compound 72 | 37 | Grade 4 | Grade 4/Grade 4 and 5 |
| Example 5 | Compound 73 | 36 | Grade 4 | Grade 4/Grade 4 and 5 |
| Example 6 | Compound 74 | 36 | Grade 4 | Grade 4/Grade 4 and 5 |
| Example 7 | Compound 101 | 26 | Grade 4 and 5 | Grade 4 and 5/Grade 4 and 5 |
| Example 8 | Compound 102 | 27 | Grade 4 and 5 | Grade 4 and 5/Grade 4 and 5 |

[Textile Printing Evaluation]

A solid image was printed on the nylon 6 jersey as the fabric with a printing paste having the following composition using a screen printing machine.

(Composition of Printing Paste)

Paste: MEYPRO GUM NP [manufactured by Meyhall Chemical AG] 50 g pH adjuster ammonium sulfate [manufactured by Wako Pure Chemical Industries, Ltd.] 5 g Colorant: dye shown in Table 2 2 g Water 43 g The printed fabric was dried and then was treated with saturated steam at 105° C. Next, the fabric was washed with water to wash off a non-fixed portion of the dye. A fixing treatment was perfoniied on the printed fabric in a 200 mL bath including 0.1 g of acetic acid, 0.6 g of ammonium sulfate, and 6 g of SUNLIFE TN (a fixing agent, manufactured by Nicca Chemical Co., Ltd.) at 60° C. for 5 minutes, and the printed fabric was dried. Using the dyed fabric, a dyed material which was dyed in one of colors including cyan to blue with a high density without color loss was obtained. The evaluation results of the dyed material are shown in Table 2.

[Evaluation Method]

The printed solid image was evaluated using the same method as in the dip dyeing evaluation described above.

TABLE 2

|  | Dye | Light Fastness ΔEab | Washing Fastness | Perspiration Fastness Alkali/Acid |
|---|---|---|---|---|
| Comparative Example 11 | Comparative Compound 1 | 50 | Grade 4 and 5 | Grade 4 and 5/Grade 4 and 5 |

TABLE 2-continued

| | Dye | Light Fastness ΔEab | Washing Fastness | Perspiration Fastness Alkali/Acid |
|---|---|---|---|---|
| Comparative Example 12 | Comparative Compound 2 | 43 | Grade 2 and 3 | Grade 3 and 4/Grade 4 and 5 |
| Example 11 | Compound 69 | 37 | Grade 4 and 5 | Grade 4 and 5/Grade 4 and 5 |
| Example 12 | Compound 70 | 35 | Grade 4 and 5 | Grade 4 and 5/Grade 4 and 5 |
| Example 13 | Compound 71 | 37 | Grade 4 | Grade 4/Grade 4 and 5 |
| Example 14 | Compound 72 | 37 | Grade 4 | Grade 4 and 5/Grade 4 and 5 |
| Example 15 | Compound 73 | 36 | Grade 4 | Grade 4/Grade 4 and 5 |
| Example 16 | Compound 74 | 36 | Grade 4 | Grade 4/Grade 4 and 5 |
| Example 17 | Compound 101 | 26 | Grade 4 and 5 | Grade 4 and 5/Grade 4 and 5 |
| Example 18 | Compound 102 | 27 | Grade 4 and 5 | Grade 4 and 5/Grade 4 and 5 |

Separately, by using fabric made of silk, fabric made of wool, or nylon 66 jersey as the fabric instead of the nylon 6 jersey, textile printing was perfoniied using the same method as described above. At this time, a dyed material which was dyed with a high density without color loss even after water washing was obtained, and light fastness, washing fastness, and perspiration fastness were also excellent.

[Ink Jet Textile Printing Evaluation]

Ink jet textile printing was performed using a method described in JP2013-209786A.

<Pre-Treatment Step>

Regarding the nylon 6 jersey as the fabric, the following components were mixed with each other to prepare Pre-Treatment Agent A. The fabric was padded with Pre-Treatment Agent A obtained above at a squeezing rate of 90% and was naturally dried. As a result, pre-treated fabric was obtained.

(Pre-Treatment Agent A)

Paste: guar gum [MFYPRO GUM NP, manufactured by Nissho Corporation] 2 g

Hydrotropy agent: urea [manufactured by Wako Pure Chemical Industries, Ltd.] 5 g pH adjuster: ammonium sulfate [manufactured by Wako Pure Chemical Industries, Ltd.] 4 g Water 89 g <Printing Step>

Next, an ink composition having the following composition was stirred for 1 hour while heated at 30° C. to 40° C. The obtained solution was filtered under reduced pressure through a microfilter having an average pore size of 0.5 μm. As a result, an ink for ink jet textile printing was prepared.

Dye shown in Table 3 5 mass %

Glycerin (manufactured by Wako Pure Chemical Industries, Ltd.; aqueous organic solvent) 10 mass %

Diethylene glycol (manufactured by Wako Pure Chemical Industries, Ltd.; aqueous organic solvent) 10 mass %

Olefin E1010 (acetylenic glycol surfactant; manufactured by Nissin Chemical Co., Ltd.) 1 mass %

Water 74 mass %

After setting each of the obtained inks for ink jet textile printing in an ink jet printer (DMP-2381, manufactured by Dimatix Inc.), a solid image was printed on the pre-treated fabric.

<Post-Treatment Step>

After drying the printed fabric, saturated steam was applied to the printed fabric at 100° C. for 30 minutes in a steam process such that the dye was fixed on the fiber of the fabric. Next, the fabric was washed with cold water for 10 minutes, was washed with warm water at 60° C. for 5 minutes, and then was naturally dried. Using the dyed fabric, a dyed material which was dyed in one of colors including cyan to blue with a high density without color loss was obtained.

[Evaluation Method]

The printed solid image was evaluated using the same method as in the dip dyeing evaluation described above.

TABLE 3

| | Dye | Light Fastness ΔEab | Washing Fastness | Perspiration Fastness Alkali/Acid |
|---|---|---|---|---|
| Comparative Example 21 | Comparative Compound 1 | 49 | Grade 4 and 5 | Grade 4 and 5/Grade 4 and 5 |
| Comparative Example 22 | Comparative Compound 2 | 41 | Grade 2 and 3 | Grade 3 and 4/Grade 4 and 5 |
| Example 21 | Compound 69 | 36 | Grade 4 and 5 | Grade 4 and 5/Grade 4 and 5 |
| Example 22 | Compound 70 | 34 | Grade 4 and 5 | Grade 4 and 5/Grade 4 and 5 |
| Example 23 | Compound 71 | 36 | Grade 4 | Grade 4/Grade 4 and 5 |
| Example 24 | Compound 72 | 35 | Grade 4 | Grade 4/Grade 4 and 5 |
| Example 25 | Compound 73 | 35 | Grade 4 | Grade 4/Grade 4 and 5 |
| Example 26 | Compound 74 | 35 | Grade 4 | Grade 4/Grade 4 and 5 |
| Example 27 | Compound 101 | 25 | Grade 4 and 5 | Grade 4 and 5/Grade 4 and 5 |
| Example 28 | Compound 102 | 26 | Grade 4 and 5 | Grade 4 and 5/Grade 4 and 5 |

Compounds used in Comparative Examples will be shown below.

Comparative Compound 1

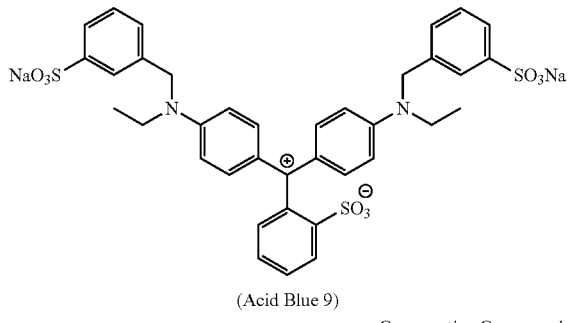

(Acid Blue 9)

Comparative Compound 2

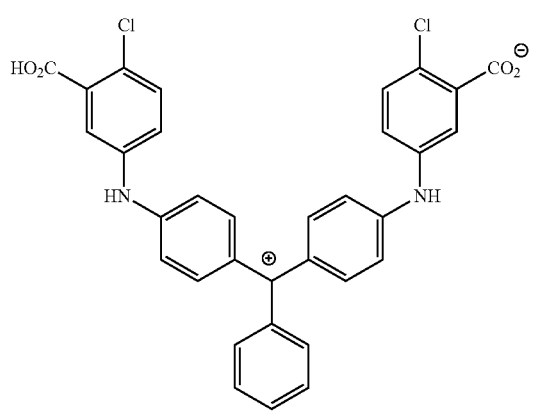

In the compound according to the present invention, the coloring composition for dyeing or textile printing including the compound, the ink for ink jet textile printing, the method of printing on fabric, and the dyed or printed fabric, light fastness, washing fastness, and perspiration fastness were excellent.

The present invention has been described in detail with reference to the specific embodiment. However, it is obvious to those skilled in the art that various modifications and changes can be made within a range not departing from the scope of the present invention.

What is claimed is:

1. A compound represented by any one of the following Formulae (1) to (3),

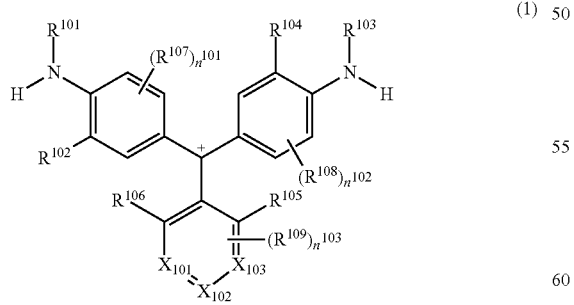 (1)

in Formula (1), $R^{101}$ and $R^{103}$ each independently represent a hydrogen atom, an alkyl group, an aryl group, or a heterocyclic group, $R^{102}$ and $R^{104}$ each independently represent a substituent represented by any one of the following Formulae (X1) to (X4), $R^{105}$ and $R^{106}$ each independently represent an alkyl group, a cyano group, a nitro group, an alkoxy group, an acyloxy group, a carbamoyloxy group, an alkoxycarbonyloxy group, an amino group, an acylamino group, an aminocarbonylamino group, an alkoxycarbonylamino group, a sulfamoylamino group, an alkylsulfonylamino group, an alkylthio group, a sulfamoyl group, an alkylsulfinyl group, an alkylsulfonyl group, an acyl group, an alkoxycarbonyl group, a carbamoyl group, an imido group, or a sulfo group, $R^{107}$, $R^{108}$, and $R^{109}$ each independently represent a substituent, $X_{101}$, $X_{102}$, and $X_{103}$ each independently represent CH or a nitrogen atom, at least one of $X_{101}$, $X_{102}$, or $X_{103}$ represents CH, in a case where $X_{101}$ to $X_{103}$ represent CH, $R^{109}$ may be bonded after a hydrogen atom is removed, $n^{101}$, $n^{102}$, and $n^{103}$ each independently represent an integer of 0 to 3, in a case where $n^{101}$, $n^{102}$, and $n^{103}$ each independently represent an integer of 2 or more, plural $R^{107}$'s, $R^{108}$'s, and $R^{109}$∝s may be the same as or different from each other, $R^{107}$ and $R^{108}$ may be bonded to each other to form a ring, and a compound represented by Formula (1) has a counter anion in a molecule,

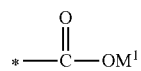 (X1)

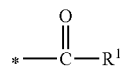 (X2)

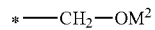 (X3)

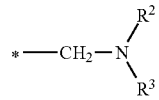 (X4)

$M^1$ represents a hydrogen atom, an alkyl group, an aryl group, or a cation, $M^2$ represents a hydrogen atom, an alkyl group, or an aryl group, $R^1$ represents an alkyl group, an aryl group, or $NR^4R^5$, $R^4$ and $R^5$ each independently represent a hydrogen atom, an alkyl group, or an aryl group, $R^2$ and $R^3$ each independently represent a hydrogen atom, an alkyl group, or an aryl group, and * represents a direct bond to a carbon atom,

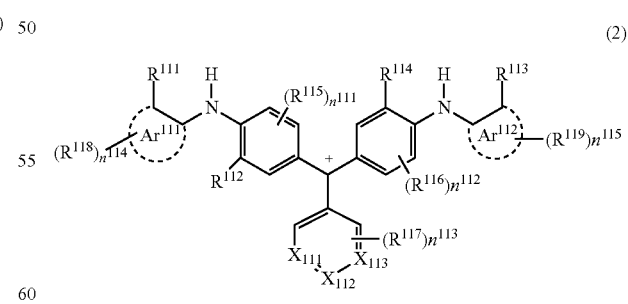 (2)

in Formula (2), $R^{111}$ and $R^{113}$ each independently represent a halogen atom, an alkyl group, a cyano group, a nitro group, an alkoxy group, an acyloxy group, a carbamoyloxy group, an alkoxycarbonyloxy group, an amino group, an acylamino group, an aminocarbonylamino group, an alkoxycarbonylamino group, a sulfamoylamino group, an alkylsulfonylamino group, an alkylthio group, a sulfamoyl group, an alkylsulfinyl group, an alkylsulfonyl group, an acyl group, an alkoxycarbonyl group, a carbamoyl group, an imido group, or a sulfo group, $R^{112}$ and $R^{114}$ each independently represent a substituent represented by any one of the following Formulae (X1) to (X4), $R^{115}$, $R^{116}$, $R^{117}$, $R^{118}$, and $R^{119}$ each independently represent a substituent, $X_{111}$, $X_{112}$, and $X_{113}$ each independently represent CH or a nitrogen atom, at least one of $X_{111}$, $X_{112}$, or $X_{113}$ represents CH, in a case where $X_{111}$ to $X_{113}$ represent CH, $R^{117}$ may be bonded after a hydrogen atom is removed $Ar^{111}$ and $Ar^{112}$ each independently represent a benzene ring, a naphthalene ring, or a heterocycle, $n^{111}$ and $n^{112}$ each independently represent an integer of 0 to 3, $n^{113}$ represents an integer of 0 to 5, $n^{114}$ and $n^{115}$ each independently represent an integer of 0 or more, in a case where $n^{111}$, $n^{112}$, $n^{113}$, $n^{114}$, and $n^{115}$ each independently represent an integer of 2 or more, plural $R^{115}$'s $R^{116}$'s $R^{117}$'s $R^{118}$'s, and $R^{119}$'s may be the same as or different from each other, $R^{115}$ and $R^{116}$ may be bonded to each other to form a ring, and a compound represented by Formula (2) has a counter anion in a molecule,

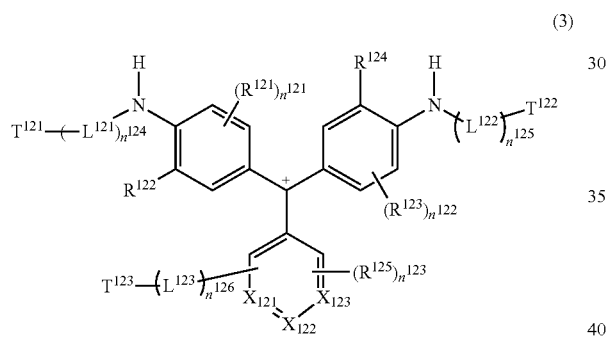

(3)

in Formula (3), $L^{121}$, $L^{122}$, and $L^{123}$ each independently represent a divalent linking group, $T^{121}$, $T^{122}$ and $T^{123}$ each independently represent a hydrogen atom or a group represented by any one of the following Formulae (T-1) to (T-8), at least one of $T^{121}$, $T^{122}$, or $T^{123}$ represents a group represented by any one of Formulae (T-1) to (T-8), $R^{121}$, $R^{123}$, and $R^{125}$ each independently represent a substituent, $R^{122}$ and $R^{124}$ each independently represent a substituent represented by any one of Formulae (X1) to (X4), $X_{121}$, $X_{122}$, and $X_{123}$ each independently represent CH or a nitrogen atom, at least one of $X_{121}$, $X_{122}$, or $X_{123}$ represents CH, in a case where $X_{121}$ to $X_{123}$ represent CH, $R^{125}$ or $(L^{123})n^{126}$-$T^{123}$ may be bonded after a hydrogen atom is removed, $n^{121}$ and $n^{122}$ each independently represent an integer of 0 to 3, $n^{123}$ represents an integer of 0 to 5, $n^{124}$, $n^{125}$, and $n^{126}$ each independently represent 0 or 1, in a case where $n^{121}$, $n^{122}$, and $n^{123}$ each independently represent an integer of 2 or more, plural $R^{121}$'s, $R^{123}$'s, and $R^{125}$'s may be the same as or different from each other, $R^{121}$ and $R^{123}$ may be bonded to each other to form a ring, and a compound represented by Formula (3) has a counter anion in a molecule, and

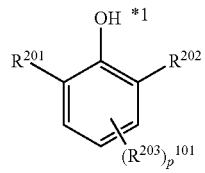
(T-1)

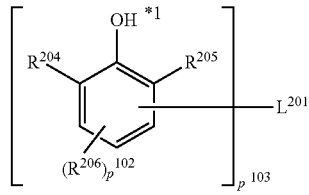
(T-2)

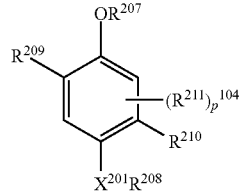
(T-3)

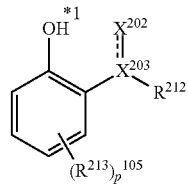
(T-4)

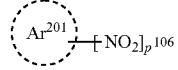
(T-5)

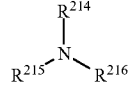
(T-6)

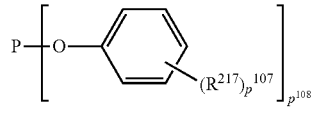
(T-7)

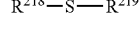
(T-8)

$R^{201}$, $R^{202}$, $R^{204}$, and $R^{207}$ each independently represent an alkyl group, $R^{205}$ and $R^{208}$ each independently represent a hydrogen atom or an alkyl group, $R^{209}$ represents a hydrogen atom, an ionic hydrophilic group, an alkyl group, or an alkoxy group, $R^{210}$ represents a hydrogen atom, an alkyl group, or an alkoxy group, $R^{203}$, $R^{206}$, $R^{211}$, $R^{213}$, and $R^{217}$ each independently represent a substituent, $R^{214}$ represents a hydrogen atom, an oxygen radical, a hydroxy group, an alkyl group, or an alkoxy group, $R^{215}$ and $R^{216}$ each independently represent an alkyl group, $R^{218}$ and $R^{219}$ each independently represent a hydrogen atom, an alkyl group, an aryl group, or a heterocyclic group, $R^{218}$ and $R^{219}$ may be bonded to each other to form a ring, $L^{201}$ represents a $p^{103}$-valent linking group, $X^{202}$ represents an oxygen atom or a nitrogen atom, $X^{203}$ represents a carbon atom or a nitrogen atom, in a case where $X^{203}$ represents a carbon atom, a bond between $X^{202}$ and $X^{203}$ is a double bond, in a case where $X^{203}$ represents a nitrogen atom, a bond between $X^{202}$ and $X^{203}$ is a single bond, $R^{212}$ represents an aryl group, a heterocyclic group, or a group which is linked to $X^{202}$ to form a heterocyclic group, $Ar^{201}$ represents an aryl group or a heterocyclic group, $p^{101}$ represents 0 to 3, $p^{102}$ and $p^{104}$ each independently represent 0 to 2, $p^{103}$ represents 2 or 3, $p^{106}$ represents 1 to 3, $p^{105}$ and $p^{107}$ each independently represent 0 to 4, $p^{108}$ represents 2 or 3, $X^{201}$ represents an oxygen atom or $NR^{220}$, $R^{220}$ represents a hydrogen atom or an alkyl group, in a case where $X^{201}$ represents NH, at least one of $R^{209}$ or $R^{210}$ represents an alkyl group or an alkoxy group, in a case where $p^{101}$, $p^{102}$, $p^{104}$, $p^{105}$, and $p^{107}$ each independently represent a number of 2 or more, plural $R^{203}$'s $R^{206}$'s $R^{211}$'s, $R^{213}$'s, and $R^{217}$'s may be the same as or different from each other, a group represented by any one of Formulae (T-1) to (T-8) is bonded to $L^{121}$, $L^{122}$, or $L^{123}$ after any one of hydrogen atoms in the formula is removed, a hydrogen atom represented by *1 is not removed and bonded, and in a case where $R^{214}$ in Formula (T-6) represents a hydrogen atom, the hydrogen atom is not removed and bonded.

2. The compound according to claim 1,
wherein the compound is a compound represented by any one of Formulae (1) to (3), and
$R^{102}$ and $R^{104}$, $R^{112}$ and $R^{114}$, or $R^{122}$ and $R^{124}$ each independently represent a substituent represented by any one of Formulae (X1) to (X3).

3. The compound according to claim 2,
wherein $M^1$ represents a hydrogen atom, an alkyl group, or an alkali metal ion,
$M^2$ represents a hydrogen atom or an alkyl group,
$R^1$ represents $NR^4R^5$, and
$R^4$ and $R^5$ each independently represent a hydrogen atom, an alkyl group, or an aryl group.

4. The compound according to claim 1,
wherein the compound is a compound represented by Formula (3), and
at least one of $T^{121}$, $T^{122}$, or $T^{123}$ represents a group represented by Formula (T-1), (T-3), (T-4), (T-5), or (T-6).

5. A coloring composition for dyeing or textile printing comprising the compound according to claim 1.

6. An ink for ink jet textile printing comprising the compound according to claim 1.

7. A textile printing method of printing the ink for ink jet textile printing according to claim 6 on fabric using an ink jet method.

8. The textile printing method according to claim 7, wherein the fabric includes polyamide.

9. A fabric which is dyed or printed using the coloring composition for dyeing or textile printing according to claim 5.

10. A fabric which is printed using the method according to claim 7.

* * * * *